US012257684B2

(12) United States Patent
Yoshikane et al.

(10) Patent No.: US 12,257,684 B2
(45) Date of Patent: Mar. 25, 2025

(54) POWER TOOL HAVING HAMMER MECHANISM

(71) Applicant: MAKITA CORPORATION, Anjo (JP)

(72) Inventors: Kiyonobu Yoshikane, Anjo (JP); Yoshitaka Machida, Anjo (JP); Hitoshi Iida, Anjo (JP); Kazuki Nakagawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/986,369

(22) Filed: Nov. 14, 2022

(65) Prior Publication Data

US 2023/0071871 A1 Mar. 9, 2023

Related U.S. Application Data

(62) Division of application No. 17/072,484, filed on Oct. 16, 2020, now Pat. No. 11,529,727.

(30) Foreign Application Priority Data

Oct. 21, 2019 (JP) ................................ 2019-192325
Oct. 21, 2019 (JP) ................................ 2019-192326
(Continued)

(51) Int. Cl.
*B25D 16/00* (2006.01)
*B25D 11/06* (2006.01)
(Continued)

(52) U.S. Cl.
CPC .......... *B25D 16/006* (2013.01); *B25D 11/062* (2013.01); *B25D 11/10* (2013.01);
(Continued)

(58) Field of Classification Search
CPC .... B25D 11/10; B25D 11/102; B25D 16/003; B25D 16/006; B25D 17/24;
(Continued)

(56) References Cited

U.S. PATENT DOCUMENTS

| | | | |
|---|---|---|---|
| 3,203,490 | A | 8/1965 | Mccarty et al. |
| 3,785,443 | A | 1/1974 | Armbruster |

(Continued)

FOREIGN PATENT DOCUMENTS

| | | | |
|---|---|---|---|
| BE | 779394 | A | 5/1972 |
| CN | 1485525 | A | 3/2004 |

(Continued)

OTHER PUBLICATIONS

Extended European Search Report from the European Patent Office dated Mar. 16, 2021 in related application No. EP 20 20 2562.3, including European Search Opinion, European Search Report and examined claims 1-14.

(Continued)

*Primary Examiner* — Thomas M Wittenschlaeger
*Assistant Examiner* — David G Shutty
(74) *Attorney, Agent, or Firm* — J-TEK LAW PLLC; Jeffrey D. Tekanic; Scott T. Wakeman

(57) ABSTRACT

A power tool, such as a rotary hammer, includes a housing, an output shaft for mounting a tool accessary and a motor having a motor shaft that generates a rotational output for rotating and linearly hammering the output shaft. The rotational output of the motor shaft is coupled to the output shaft via a driving mechanism that includes a hammer mechanism. An intervening member is axially movable relative to the motor shaft and is operably coupled between the motor shaft and the hammer mechanism. The hammer mechanism and the output shaft are supported by a movable support that is axially movable relative to the housing. Because the (Continued)

output shaft and the driving mechanism are movable relative to the motor and the housing, which preferably includes handle, via the intervening member and the movable support during hammering operations, vibration generated during hammering operations can be dampened before reaching the housing.

20 Claims, 25 Drawing Sheets

(30) Foreign Application Priority Data

Oct. 21, 2019 (JP) ................................ 2019-192327
Oct. 21, 2019 (JP) ................................ 2019-192328

(51) Int. Cl.
*B25D 11/10* (2006.01)
*B25D 17/24* (2006.01)

(52) U.S. Cl.
CPC .......... *B25D 11/102* (2013.01); *B25D 16/003* (2013.01); *B25D 17/24* (2013.01); *B25D 2211/062* (2013.01); *B25D 2216/0015* (2013.01); *B25D 2216/0038* (2013.01); *B25D 2217/0073* (2013.01)

(58) Field of Classification Search
CPC ...... B25D 2211/062; B25D 2216/0015; B25D 2216/0038; B25D 2217/0073
See application file for complete search history.

(56) References Cited

U.S. PATENT DOCUMENTS 3,808,904 A 5/1974 Gotsch et al.
3,828,863 A 8/1974 Schmid et al.
4,158,313 A 6/1979 Smith ..................... F16H 21/00
4,276,941 A 7/1981 Wanner et al.
4,280,359 A 7/1981 Schmid et al.
4,325,436 A 4/1982 Richter et al.
4,476,941 A * 10/1984 Buck ...................... B25D 17/06 173/133
4,529,044 A 7/1985 Klueber et al.
4,609,054 A * 9/1986 Nilsson .................... B25D 1/12 173/202
4,612,999 A 9/1986 Bergler
4,657,088 A * 4/1987 Grossmann .......... B25D 16/003 173/13
4,712,625 A 12/1987 Kress
4,732,218 A 3/1988 Neumaier et al.
5,036,925 A 8/1991 Wache
5,573,075 A * 11/1996 Henry .................... B25D 17/24 173/162.1
5,901,817 A 5/1999 Gitnes
5,954,457 A 9/1999 Stock et al.
6,000,310 A 12/1999 Shilkrut et al.
6,015,017 A 1/2000 Lauterwald
6,176,321 B1 1/2001 Arakawa et al.
6,192,996 B1 2/2001 Sakaguchi et al.
6,286,217 B1 9/2001 Dassoulas et al.
6,460,627 B1 10/2002 Below et al.
6,666,284 B2 * 12/2003 Stirm ..................... B25D 16/00 173/104
6,732,815 B2 5/2004 Hanke et al.
7,021,401 B2 4/2006 Droste et al.
7,357,194 B2 * 4/2008 Koschel ................. B25D 17/24 173/210
7,707,729 B2 5/2010 Moreno
8,011,445 B2 * 9/2011 Duesselberg ........ B25D 16/003 173/104
8,028,760 B2 * 10/2011 Yoshikane ........... B25D 16/006 173/104
8,230,943 B2 * 7/2012 Felger .................. B25D 16/006 227/118
8,272,453 B2 * 9/2012 Ullrich ................... B25D 17/06 173/133
8,281,873 B2 10/2012 Ullrich et al.
8,292,002 B2 10/2012 Baumann et al.
8,403,075 B2 3/2013 Schlesak et al.
8,413,742 B2 * 4/2013 Ikuta ...................... B25D 17/11 173/90
8,464,805 B2 6/2013 Baumann et al.
8,490,715 B2 7/2013 Engelfried et al.
8,684,105 B2 * 4/2014 Yoshikane ............. B25F 5/001 192/54.5
8,991,517 B2 * 3/2015 Sugiyama ............. B25D 17/24 173/211
9,010,235 B2 4/2015 Drevet
9,321,163 B2 4/2016 Onoda et al.
9,833,850 B2 12/2017 Schmid
9,841,066 B2 * 12/2017 Yoshikane ........... B25D 16/003
9,962,823 B2 * 5/2018 Machida ................. B25F 5/006
10,272,506 B2 4/2019 Doumani et al.
10,391,621 B2 * 8/2019 Wiedner ................ B25D 16/00
10,399,216 B2 * 9/2019 Lauterwald .......... B25D 16/006
11,052,525 B2 7/2021 Furusawa et al.
11,318,596 B2 5/2022 Yoshikane et al.
11,364,611 B2 6/2022 Schallert et al.
2002/0046847 A1 4/2002 Ichijyou et al. .......... E02D 7/02
2003/0230424 A1 * 12/2003 Stirm ..................... B25D 17/06 173/109
2004/0074653 A1 4/2004 Hashimoto et al.
2004/0084850 A1 * 5/2004 Lang ........................ F16J 15/56 264/279
2004/0108123 A1 6/2004 Shibata et al.
2004/0194987 A1 10/2004 Hanke et al.
2004/0231869 A1 * 11/2004 Bernhart ................ B25D 17/06 173/210
2005/0236168 A1 10/2005 Lennartz
2006/0011361 A1 1/2006 Shimma et al.
2006/0108133 A1 5/2006 Yamazaki
2006/0124331 A1 6/2006 Stirm et al.
2006/0266535 A1 11/2006 Droste
2006/0289181 A1 12/2006 Braun
2007/0125563 A1 6/2007 Furusawa et al.
2007/0158088 A1 7/2007 Ikuta
2007/0193756 A1 8/2007 Saur
2007/0289759 A1 12/2007 Hartmann et al.
2008/0017395 A1 1/2008 Sato
2008/0245220 A1 * 10/2008 Duesselberg .......... B25D 17/24 91/234
2008/0245542 A1 10/2008 Furusawa et al.
2008/0277128 A1 11/2008 Satou
2009/0145618 A1 6/2009 Duesselberg et al.
2009/0308626 A1 12/2009 Saur
2010/0000748 A1 1/2010 Machida et al.
2010/0038104 A1 2/2010 Baumann et al.
2010/0038105 A1 2/2010 Kikuchi et al.
2010/0096154 A1 4/2010 Shinma et al.
2010/0270045 A1 10/2010 Ullrich
2011/0011608 A1 1/2011 Saur
2011/0030980 A1 2/2011 Ho
2011/0247848 A1 10/2011 Sieber et al.
2012/0061116 A1 3/2012 Aoki
2012/0289377 A1 11/2012 Aoki
2013/0199810 A1 8/2013 Wyler
2013/0284477 A1 10/2013 Braun
2014/0000923 A1 1/2014 Dietel et al.
2015/0144366 A1 5/2015 Machida
2015/0158169 A1 6/2015 Lauterwald et al.
2016/0136801 A1 5/2016 Furusawa et al.
2016/0151904 A1 * 6/2016 Ookubo ................. B25D 17/26 173/128
2016/0158929 A1 6/2016 Brennenstuhl et al.
2016/0195185 A1 7/2016 Rompel et al.
2016/0311103 A1 * 10/2016 Wiedner .............. B25D 17/245
2017/0043465 A1 2/2017 Schallert et al.
2017/0106517 A1 * 4/2017 Machida ................ B25D 16/00
2017/0129092 A1 5/2017 Kimura
2017/0312902 A1 11/2017 Noguchi et al.

(56) References Cited

U.S. PATENT DOCUMENTS

| | | | |
|---|---|---|---|
| 2017/0320206 | A1 | 11/2017 | Machida et al. |
| 2018/0001463 | A1 | 1/2018 | Furusawa |
| 2018/0015602 | A1 | 1/2018 | Machida |
| 2019/0291255 | A1 | 9/2019 | Yoshikane et al. |
| 2019/0308307 | A1 | 10/2019 | Young et al. |
| 2021/0114193 | A1 | 4/2021 | Yoshikane et al. |
| 2021/0114194 | A1 | 4/2021 | Machida et al. |

FOREIGN PATENT DOCUMENTS

| | | | | |
|---|---|---|---|---|
| CN | 1689763 | A | 11/2005 | |
| CN | 100999059 | A | 7/2007 | ............... B23Q 5/54 |
| CN | 101229637 | A | 7/2008 | ............. B25D 16/00 |
| CN | 101479078 | A | 7/2009 | ............. B25D 11/06 |
| CN | 101657300 | A | 2/2010 | ............. B25D 16/00 |
| CN | 104669219 | A | 6/2015 | ................ B25F 5/00 |
| CN | 105666427 | A | 6/2016 | ................ B25F 5/00 |
| CN | 205600652 | U | 9/2016 | |
| CN | 106457544 | A | 2/2017 | |
| CN | 106944965 | A | 7/2017 | |
| DE | 3241863 | A1 | 5/1984 | |
| DE | 3423919 | A1 | 1/1986 | |
| DE | 102012214938 | A1 | 2/2014 | |
| DE | 102016115812 | A1 | 3/2017 | |
| DE | 102017121720 | A1 | 3/2019 | |
| EP | 0419866 | A2 | 4/1991 | |
| EP | 0419866 | B1 | 10/1993 | |
| EP | 0608083 | A1 | 7/1994 | |
| EP | 2700476 | A1 | 2/2014 | |
| EP | 2700477 | A1 | 2/2014 | |
| EP | 2883661 | A1 | 6/2015 | |
| EP | 2700477 | B1 | 12/2017 | |
| EP | 3456479 | A1 | 3/2019 | |
| EP | 3461594 | A1 | 4/2019 | |
| EP | 3456479 | B1 | 2/2020 | |
| GB | 2160810 | A | 1/1986 | |
| GB | 2410916 | A | 8/2005 | |
| GB | 2414956 | A | 12/2005 | |
| JP | H03117572 | A | 5/1991 | |
| JP | 2002321169 | A | 11/2002 | |
| JP | 4195228 | B2 | 12/2008 | |
| JP | 2012223870 | A | 11/2012 | |
| JP | 2016000447 | A | 1/2016 | |
| JP | 2016137559 | A | 8/2016 | |
| JP | 2017042887 | A | 3/2017 | |
| JP | 2017042889 | A | 3/2017 | |
| JP | 2018008360 | A | 1/2018 | |
| JP | 2019166576 | A | 10/2019 | |
| JP | 2019177459 | A | 10/2019 | |
| WO | WO-2009121431 | A1 * | 10/2009 | ........... B25D 16/003 |
| WO | 2016076377 | A1 | 5/2016 | |

OTHER PUBLICATIONS

Extended European Search Report from the European Patent Office dated Mar. 16, 2021 in related application No. EP 20 20 2569.8, including European Search Opinion, European Search Report and examined claims 1-15.

Office Action mailed Jun. 30, 2022, in related U.S. Appl. No. 17/072,462.

Office Action from the Japanese Patent Office dispatched Jul. 11, 2023 in related application No. 2019192326, and translation thereof.

Office Action from the Japanese Patent Office dispatched Jul. 5, 2023 in related application No. 2019192325, and translation thereof.

Office Action from the Japanese Patent Office dispatched May 30, 2023 in related application No. 2019192327, and translation thereof.

Office Action from the Japanese Patent Office dispatched May 30, 2023 in related application No. 2019192328, and translation thereof.

Office Action and Search Report from the Chinese Patent Office dispatched Apr. 15, 2023 in related application No. 202011119010.9, and translation thereof.

Office Action mailed Jun. 16, 2023, in related U.S. Appl. No. 17/072,462 and examined claims 1-5, 7-11, 14, 17-19, 21-22 and 24-27.

* cited by examiner

POWER TOOL HAVING HAMMER MECHANISM

CROSS-REFERENCE TO RELATED APPLICATIONS

The present application is a divisional application of U.S. patent application Ser. No. 17/072,484, now U.S. Pat. No. 11,529,727, which claims priority to Japanese patent application nos. 2019-192325, 2019-192326, 2019-192327, and 2019-192328, all of which were filed on Oct. 21, 2019. The contents of all of the foregoing applications are hereby fully incorporated herein by reference.

TECHNICAL FIELD

The present disclosure generally relates to power tools having a hammer mechanism, such as a rotary hammer or a hammer drill, which are configured to linearly reciprocally drive (axially hammer) a tool accessory to perform a hammering operation and to rotationally drive the tool accessory to perform a drilling operation.

BACKGROUND ART

A rotary hammer or hammer drill (hammer driver-drill) is configured to axially hammer (linearly reciprocally drive) a tool accessory coupled to a tool holder along a driving axis and to rotationally drive the tool accessory around the driving axis. Typically, the driving mechanism of such a hammer drill is provided with a switching mechanism for switching the state of power transmission according to a selected action mode (operation mode) (see, for example, US Patent Publication No. 2017/0106517).

SUMMARY

In one aspect of the present teachings, a power tool, such as a rotary hammer or hammer drill, includes a motor having a motor shaft, a final output shaft configured to removably hold a tool accessory and having a driving axis, and a driving mechanism configured to selectively rotationally drive the tool accessory around the driving axis using power from the motor. The driving mechanism includes a motion converting mechanism configured to selectively convert rotational motion into reciprocating linear motion that axially drives the tool accessory along the driving axis to perform a hammering operation. A housing houses the motor, the final output shaft and the driving mechanism. A movable support supports the final output shaft and the motion converting mechanism within the housing such that the movable support, the final output shaft and the driving mechanism are movable relative to the housing in parallel with the driving axis while being biased by at least one elastic member. A first intermediate shaft is supported to be immovable in an axial direction of the first intermediate shaft relative to the housing and is configured to rotate around a first axis parallel to the driving axis in response to rotation of the motor shaft and to transmit power to the motion converting mechanism. An intervening member is disposed between the first intermediate shaft and the motion converting mechanism so as to be selectively rotatable relative to the first intermediate shaft around the first axis. The intervening member is immovable relative to the first intermediate shaft along the first axis. A transmitting member (engagement member) is coupled to the first intermediate shaft such that the transmitting member rotates together with the first intermediate shaft. The transmitting member is axially movable relative to the first intermediate shaft along the first axis between an engagement position and a disengagement position. In the engagement position, the transmitting member is engaged with the intervening member to thereby transmit power from the first intermediate shaft to the intervening member. In the disengagement position, the transmitting member is disengaged from the intervening member such that power transmission from the first intermediate shaft to the intervening member is interrupted. The motion converting mechanism includes a first portion that is coupled with the intervening member such that the intervening member and the first portion rotate together, and the motion converting mechanism is movable together with the movable support relative to the intervening member in parallel with the driving axis.

According to such a design, vibration generated during a hammering operation can be dampened (attenuated) to reduce the amount of vibration transmitted to the housing, which preferably includes a handle or other portion for holding the power tool, thereby decreasing discomfort experienced by the power tool user during a hammering operation.

Additional objects, aspects, embodiments and advantages of the present teachings will be readily understandable to a person of ordinary skill in the art upon reading the following detailed description of embodiments of the present teachings in view of the appended drawings and claims.

DETAILED DESCRIPTION OF THE EMBODIMENTS

An embodiment of the present disclosure is now described with reference to the drawings. In this embodiment, a rotary hammer 101 is described as an example of a power tool having a hammer mechanism according to the present teachings. The rotary hammer 101 is a hand-held power tool which may be used for processing operations such as chipping and drilling. The rotary hammer 101 is capable of performing the operation (hereinafter referred to as a hammering operation) of linearly reciprocally driving a tool accessory 91 along a specified driving axis A1. The rotary hammer 101 is also capable of performing the operation (hereinafter referred to as a drilling operation) of rotationally driving the tool accessory 91 around the driving axis A1.

Figure 1:
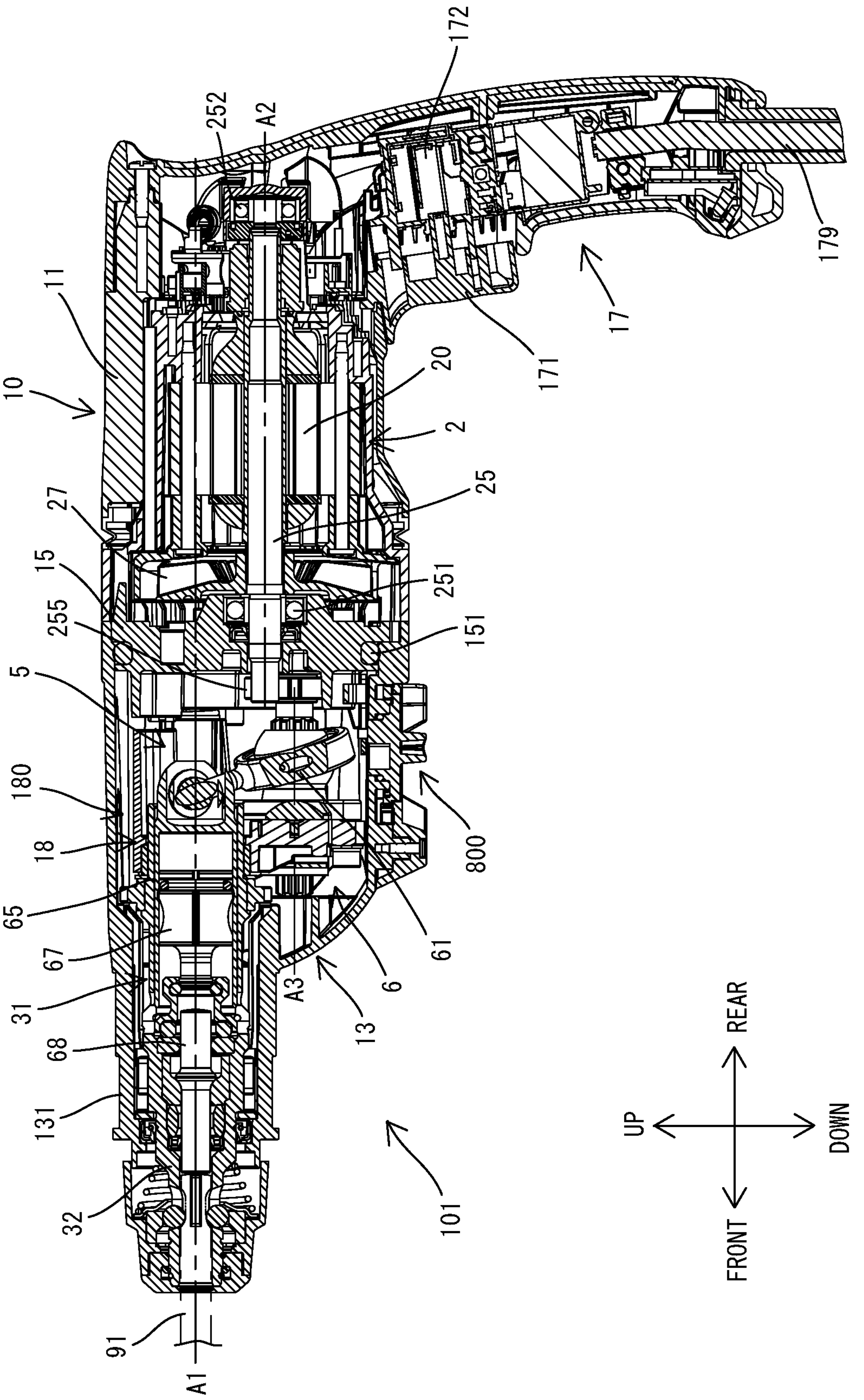
FIG. 1 is a sectional view of a rotary hammer.

First, the general structure of the rotary hammer 101 is described with reference to FIG. 1. As shown in FIG. 1, an outer shell of the rotary hammer 101 is mainly formed by a body housing 10 and a handle 17 connected to the body housing 10.

The body housing 10 is a hollow body which may also be referred to as a tool body or an outer shell housing. The body housing 10 houses a spindle 31, a motor 2 and a driving mechanism 5. The spindle 31 is an elongate circular cylindrical member. An axial end portion of the spindle 31 has a tool holder 32. The tool holder 32 is configured to removably hold the tool accessory 91. A longitudinal axis of the spindle 31 defines a driving axis A1 of the tool accessory 91. The body housing 10 extends along the driving axis A1. The tool holder 32 is disposed within one end portion of the body housing 10 in an extension direction of the driving axis A1 (hereinafter simply referred to as a driving-axis direction).

The handle 17 is an elongate hollow body configured to be held by a user. One axial end portion of the handle 17 is connected to the other end portion (an end portion located on the side opposite to the tool holder 32 side) of the body housing 10 in the driving-axis direction. The handle 17 protrudes from the other end portion of the body housing 10 and extends in a direction crossing (more specifically, substantially orthogonal to) the driving axis A1. Further, in this embodiment, the body housing 10 and the handle 17 are integrally formed by a plurality of components which are connected together with screws or the like. A power cable 179 extends from a protruding end of the handle 17 and can be connected to an external alternate current (AC) power source. The handle 17 has a trigger 171 to be depressed (pulled) by a user, and a switch 172 which is turned ON in response to a depressing operation of the trigger 171.

In the rotary hammer 101, when the switch 172 is turned ON, the motor 2 is energized and the driving mechanism 5 is driven, so that the hammering operation and/or the drilling operation is performed.

The detailed structure of the rotary hammer 101 is now described. In the following description, for convenience sake, the extension direction of the driving axis A1 (the longitudinal direction of the body housing 10) is defined as a front-rear direction of the rotary hammer 101. In the front-rear direction, the side of one end portion of the rotary hammer 101 in which the tool holder 32 is disposed is defined as the front of the rotary hammer 101 and the opposite side (the side to which the handle 17 is connected) is defined as the rear of the rotary hammer 101. The direction that is orthogonal to the driving axis A1 and that corresponds to an axial direction of the handle 17 is defined as an up-down direction of the rotary hammer 101. In the up-down direction, the side of the handle 17 connected to the body housing 10 is defined as an upper side and the protruding end side of the handle 17 is defined as a lower side. Further, the direction that is orthogonal to both the front-rear direction and the up-down direction is defined as a left-right direction.

First, the structure of the body housing 10 is described.

As shown in FIG. 1, the body housing 10 has a circular cylindrical front end portion which is referred to as a barrel part 131. A portion of the body housing 10 other than the barrel part 131 has a generally rectangular box-like shape. The barrel part 131 is configured such that an auxiliary handle (not shown) is removably attachable thereto. Further, when the auxiliary handle is not attached to the barrel part 131, a user can also hold both the barrel part 131 and the handle 17 at the same time.

The internal space of the body housing 10 is partitioned into two volumes by a bearing support 15 which is disposed within the body housing 10. The bearing support 15 is arranged to cross the driving axis A1, is fitted into an inner periphery of the body housing 10 and is fixedly held by the body housing 10 (i.e. so as to be immovable relative to the body housing 10). The volume behind the bearing support 15 is a volume (space) for mainly housing the motor 2. The volume in front of the bearing support 15 is a volume (space) for mainly housing the spindle 31 and the driving mechanism 5. In the following description, the portion of the body housing 10 that corresponds to the volume (space) for housing the motor 2 is referred to as a rear housing 11, and the portion (including the barrel part 131) of the body housing 10 that corresponds to the volume (space) for housing the spindle 31 and the driving mechanism 5 is referred to as a front housing 13.

The rear housing 11 and the front housing 13 are both formed of plastic (synthetic polymer). The rear housing 11 is formed by a plurality of members connected together. The front housing 13 is a single cylindrical member.

In this embodiment, the bearing support 15 is also formed of plastic (synthetic polymer). A vibration-isolating structure described below may be used to reduce transmission of vibration, which is generated in the driving mechanism 5, to the body housing 10 and the bearing support 15 fixedly mounted to the body housing 10. For this reason, the bearing support 15 need not require as much strength as metal. Therefore, the rotary hammer 101 of the present embodiment has a lower weight than an embodiment in which the bearing support 15 is formed of metal. Further, as shown in FIG. 2, the bearing support 15 is fitted into a rear end portion of the front housing 13 such that substantially the whole of its outer peripheral surface is in contact with an inner peripheral surface of the front housing 13.

Figure 3:
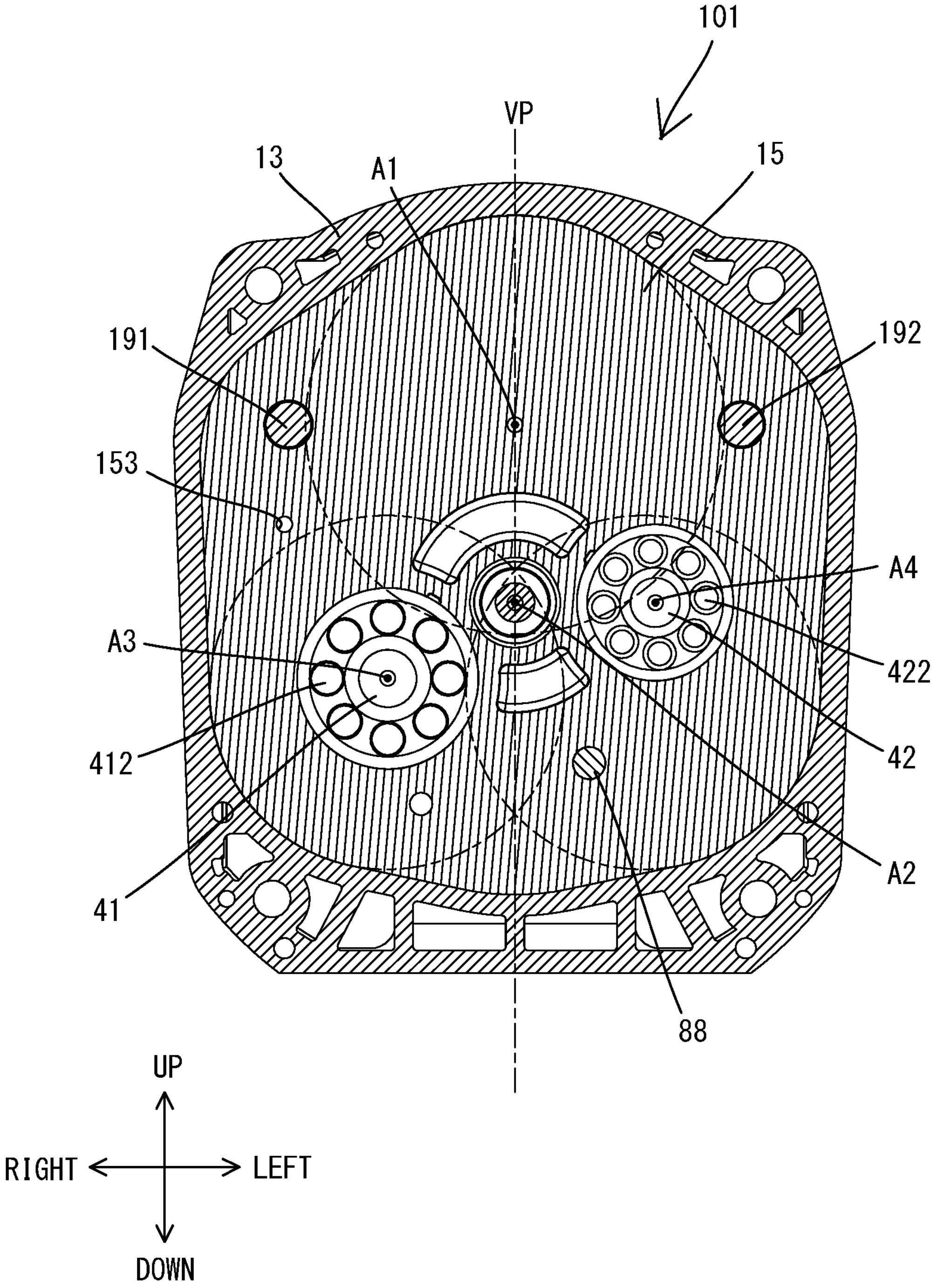
FIG. 3 is a sectional view taken along line III-III in FIG. 2.

The bearing support 15 is a member for supporting bearings of various shafts. Therefore, high dimensional accuracy is required for the outer periphery of the bearing support 15 which is fitted into the body housing 10. For this purpose, if the bearing support 15 is formed of metal (such as aluminum alloy), it may be preferable that the metal bearing support 15 is machined based on a single circle to secure the dimensional accuracy. In this embodiment, however, because the bearing support 15 is made of plastic, the shape of the bearing support 15 can be more freely selected. Specifically, as shown in FIG. 3, the sectional shape of the bearing support 15 taken along a plane orthogonal to the driving axis A1 is based on three circles, rather than a single circle. Therefore, the outer periphery (specifically, the portion that makes contact with the body housing 10) of the bearing support 15 is not on a circumference of a single circle. The outer periphery of the bearing support 15 partially overlaps with the circumferences of the three circles.

Figure 2:
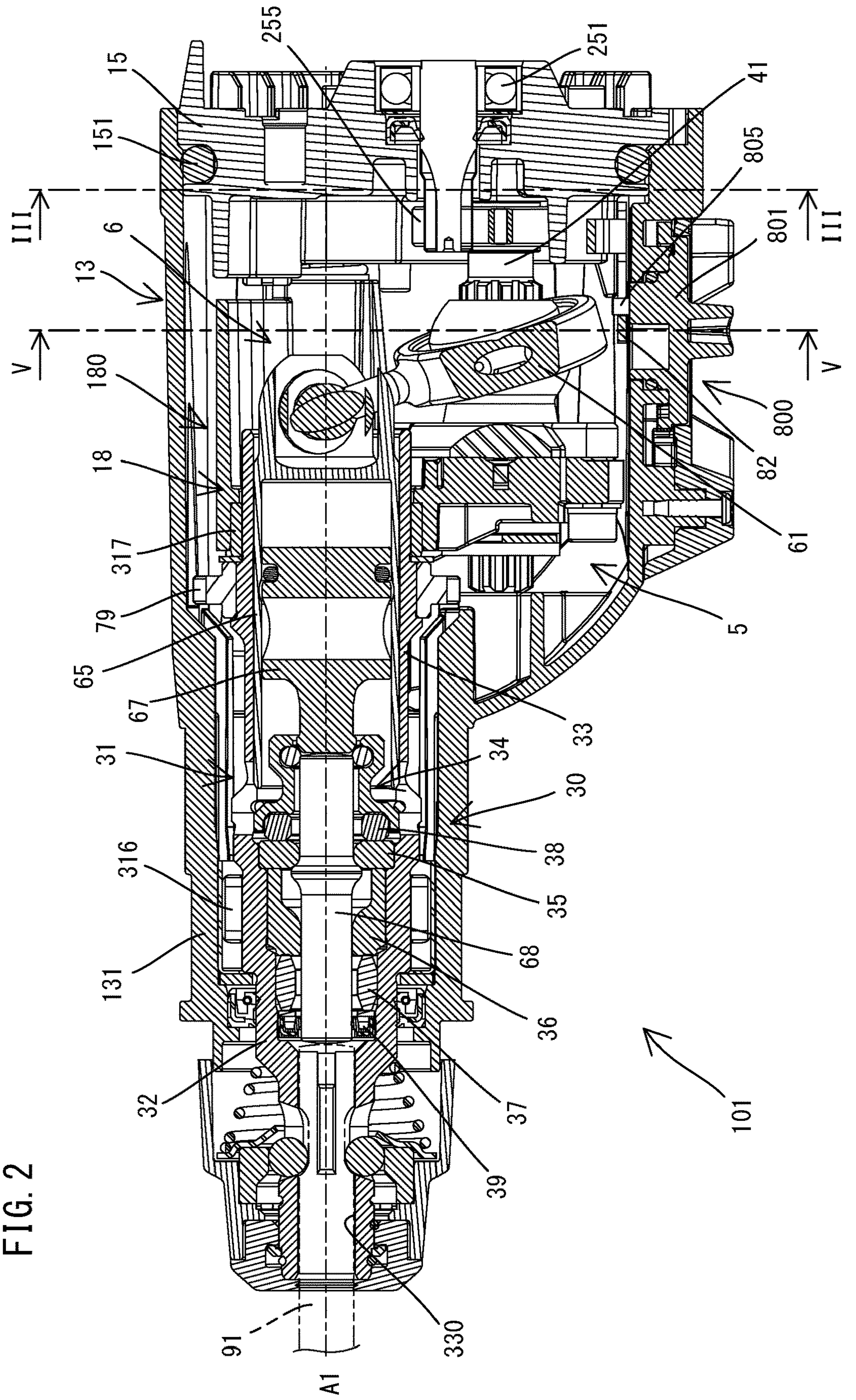
FIG. 2 is a partial, enlarged view of the rotary hammer.
Figure 4:
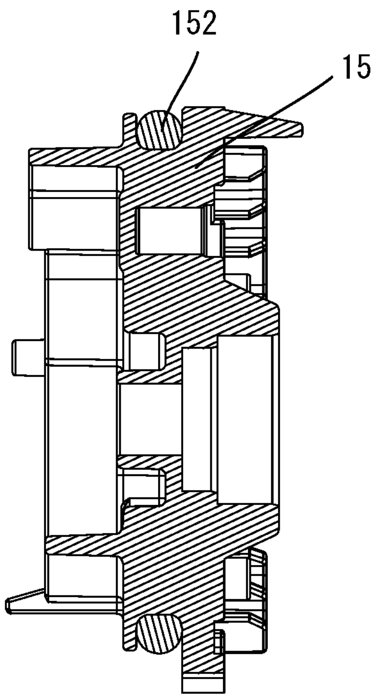
FIG. 4 is a sectional view of a modification of a bearing support.

As shown in FIG. 2, an annular groove is formed in the outer peripheral surface of the bearing support 15 that is in contact with the inner peripheral surface of the body housing 10. A rubber O-ring 151 is fitted in this groove. Lubricant is provided within the front housing 13 in which the driving mechanism 5 is housed. The O-ring 151 serves as a seal member for sealing a gap between the body housing 10 and the bearing support 15. The O-ring 151 can prevent the lubricant from leaking into the rear housing 11 through the gap between the body housing 10 and the bearing support 15. In place of the O-ring 151 separately formed from the bearing support 15, for example, as shown in FIG. 4, an elastic element 152 formed of thermoplastic elastomer may be integrally molded on the outer periphery of the plastic bearing support 15. In this case, the bearing support 15 with the elastic element 152 can be easily assembled in the body housing 10.

Figure 5:
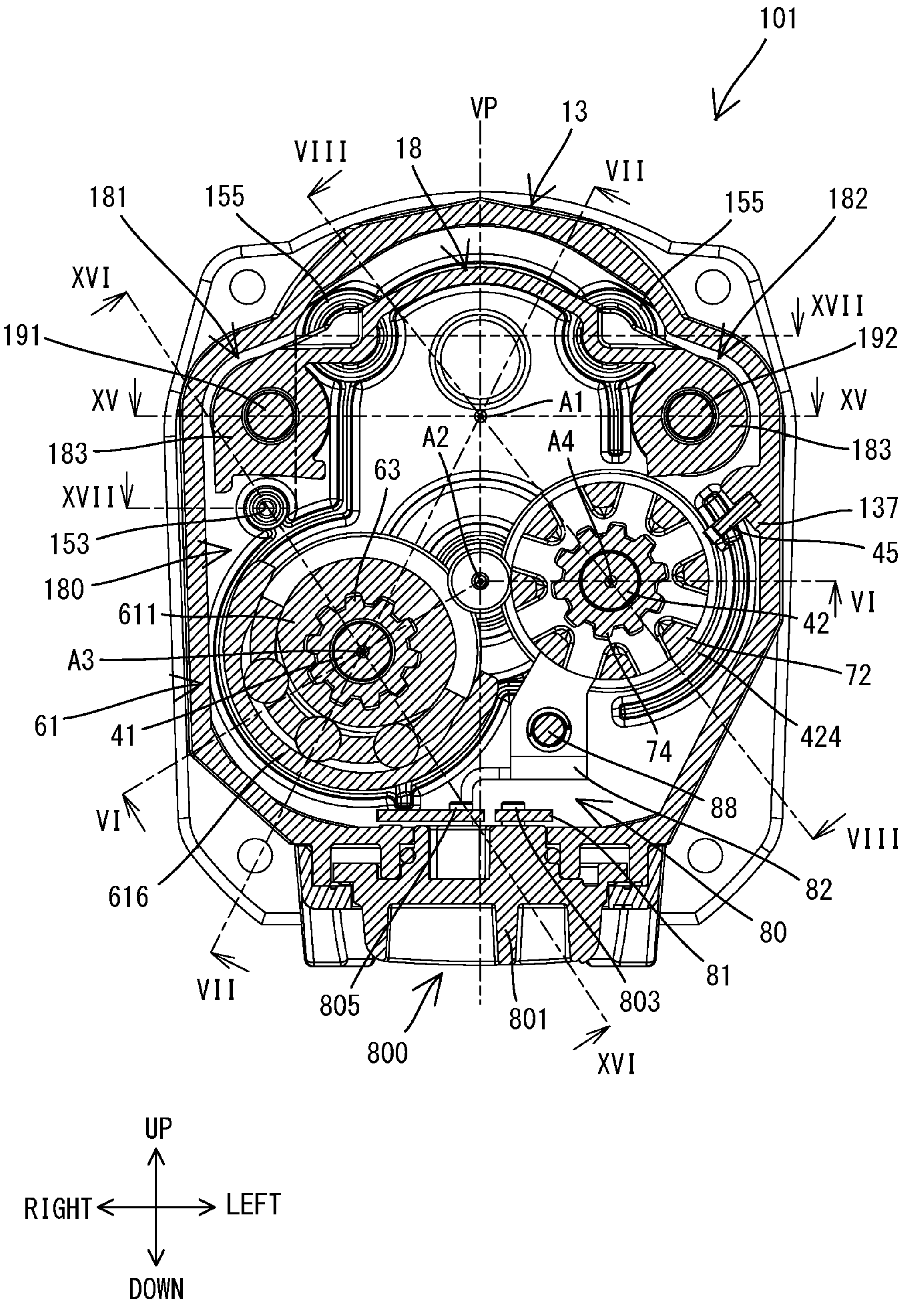
FIG. 5 is a sectional view taken along line V-V in FIG. 2.

As shown in FIGS. 3 and 5, an air vent hole 153 is formed in the bearing support 15 to provide communication between the internal space of the front housing 13 and the internal space of the rear housing 11 so that the internal pressure of the front housing 13 is adjusted to match the internal pressure of the rear housing 11. Further, a filter 154 is fitted in the air vent hole 153 to prevent the lubricant from leaking into the rear housing 11 through the air vent hole 153 (see FIG. 17).

The internal structures of the body housing 10 are now described.

First, the motor 2 is described. In this embodiment, an AC motor, which may be powered by an external AC power source, is employed as the motor 2. As shown in FIG. 1, the motor 2 has a body 20 including a stator and a rotor, and a motor shaft 25 configured to rotate together with the rotor. The stator is fixed to the rear housing 11 by screws. In this embodiment, a rotation axis A2 of the motor shaft 25 extends below the driving axis A1 and in parallel to the driving axis A1. A virtual plane VP (hereinafter referred to as a reference plane VP) (see FIGS. 3 and 5), which contains the driving axis A1 and the rotation axis A2, extends in the up-down direction of the rotary hammer 101.

The motor shaft 25 is supported via two bearings 251 and 252 so as to be rotatable around the rotation axis A2 relative to the body housing 10. The front bearing 251 is held on a rear surface side of the bearing support 15, and the rear bearing 252 is held by the rear housing 11 (specifically, an inner housing which houses the motor 2 within the rear housing 11). A fan 27 for cooling the motor 2 is fixed to a portion of the motor shaft 25 between the body 20 and the front bearing 251. A front end portion of the motor shaft 25 extends through the bearing support 15 and protrudes into the front housing 13. A pinion gear 255 is fixed to this protruding end portion of the motor shaft 25.

Next, power-transmission paths from the motor shaft 25 to the driving mechanism 5 are described.

Figure 6:
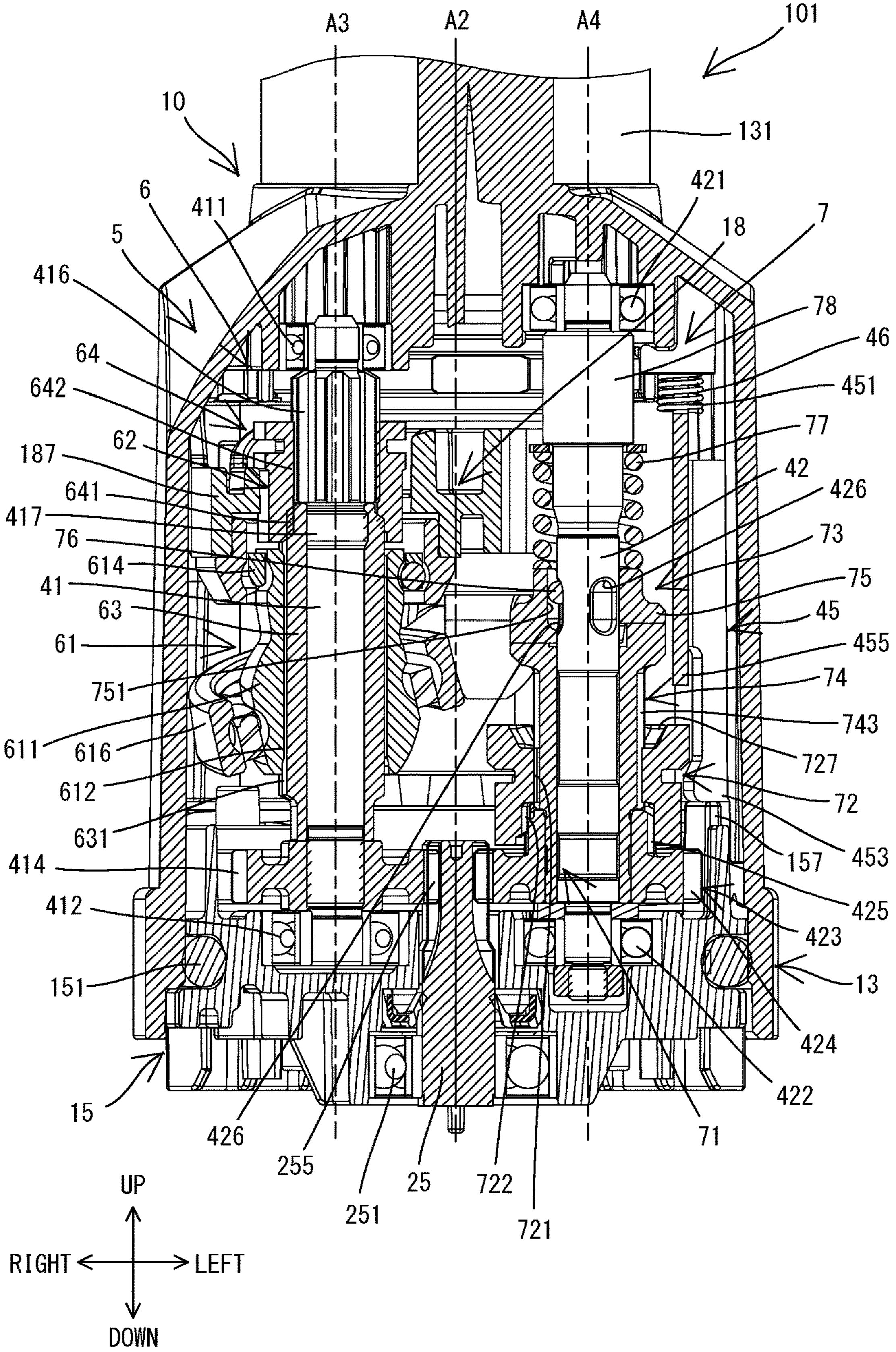
FIG. 6 is a sectional view taken along line VI-VI in FIG. 5.

As shown in FIGS. 5 and 6, in this embodiment, the rotary hammer 101 includes two intermediate shafts, namely a first intermediate shaft 41 and a second intermediate shaft 42. The driving mechanism 5 is configured to perform the hammering operation using power transmitted from (via) the first intermediate shaft 41 and perform the drilling operation using power transmitted from (via) the second intermediate shaft 42. In other words, the first intermediate shaft 41 is a shaft provided exclusively for (dedicated to) power transmission for hammering operations, and the second intermediate shaft 42 is a shaft provided exclusively for (dedicated to) power transmission for drilling operations.

Both of the first intermediate shaft 41 and the second intermediate shaft 42 extend within the front housing 13 in parallel to the driving axis A1 and the rotation axis A2. The first intermediate shaft 41 is supported via two bearings 411 and 412 so as to be rotatable around a rotation axis A3 relative to the body housing 10. The front bearing 411 is held by the front housing 13. The rear bearing 412 is held on a front surface side of the bearing support 15. Similarly, the second intermediate shaft 42 is supported via two bearings 421 and 422 so as to be rotatable around a rotation axis A4 relative to the body housing 10. The front bearing 421 is held by the front housing 13. The rear bearing 422 is held on the front surface side of the bearing support 15. As described above, the bearing 251 of the motor shaft 25 is also supported by the bearing support 15. Therefore, a precise positional relationship between the motor shaft 25, the first intermediate shaft 41 and the second intermediate shaft 42 can be realized.

The first intermediate shaft 41 is arranged on the right side of the reference plane VP. The second intermediate shaft 42 is arranged on the left side of the reference plane VP. With such a structure, the balance of weight in the left-right direction can be improved, compared with an embodiment in which the first intermediate shaft 41 and the second intermediate shaft 42 are both disposed on the same (right or left) side.

Further, in a plane orthogonal to the driving axis A1, an obtuse angle is formed by a first line segment connecting the rotation axis A2 of the motor shaft 25 and the rotation axis A3 of the first intermediate shaft 41 and a second line segment connecting the rotation axis A2 and the rotation axis A4 of the second intermediate shaft 42.

A first driven gear 414 is fixed to a rear end portion of the first intermediate shaft 41 adjacent to and in the front of the bearing 412. A gear member 423 having a second driven gear 424 is disposed adjacent to and in front of the bearing 422 on a rear end portion of the second intermediate shaft 42. The first driven gear 414 and the second driven gear 424 each mesh with the pinion gear 255 of the motor shaft 25. With the above-described positional relationship between the rotational axes A2, A3 and A4, the first driven gear 414 and the second driven gear 424 mesh with the pinion gear 255 from generally opposite directions. As a result, the pinion gear 255 is less likely to be subjected to a bending load in one specific direction. Further, as compared with an embodiment in which the first and second driven gears 414 and 424 are arranged on a straight line centering the pinion gear 255, the overall size of the driving mechanism 5 in the direction of the straight line can be reduced, while necessary components can be rationally provided on the first and second intermediate shafts 41 and 42.

The gear member 423 has a circular cylindrical shape. The gear member 423 is disposed on the outer peripheral side of the second intermediate shaft 42 (specifically, on the outer peripheral side of a drive-side member 74). A spline part 425 is provided on an outer periphery of a cylindrical front end portion of the gear member 423. The spline part 425 includes a plurality of splines (external teeth) extending in a direction of the rotation axis A4 (i.e. front-rear direction). Rotation of the second driven gear 424 (the gear member 423) may be transmitted to the second intermediate shaft 42 via a second transmitting member 72 and a torque limiter 73, which will be described in detail below.

As described above, in this embodiment, two power-transmission paths branch from the motor shaft 25 and respectively serve as a first power-transmission path that is exclusive for hammering operations and a second power-transmission path that is exclusive for drilling operations.

The spindle 31 is now described. The spindle 31 is a final output shaft of the rotary hammer 101. As shown in FIG. 2, the spindle 31 is arranged along the driving axis A1 within the front housing 13, and supported to be rotatable around the driving axis A1 relative to the body housing 10. The spindle 31 is configured as an elongate, stepped circular cylindrical member.

A front half of the spindle 31 forms the tool holder 32, to or in which the tool accessory 91 can be removably coupled (mounted). The tool accessory 91 is inserted into an insertion hole 330 formed in a front end portion of the tool holder 32 and held in the insertion hole 330, such that a longitudinal axis of the tool accessory 91 coincides with the driving axis A1, and the tool accessory 91 is movable relative to the tool holder 32 in the direction of the longitudinal axis of the tool holder 32, while its rotation around the longitudinal axis is restricted (blocked). A rear half of the spindle 31 forms a cylinder 33 which slidably holds a piston 65 described below. In this embodiment, the spindle 31 is a single (integral) member that includes the tool holder 32 and the cylinder 33. The spindle 31, however, may be formed by connecting a plurality of members. The spindle 31 is formed of iron (or iron-based alloy, e.g. a steel, for example). The spindle 31 is supported by a bearing 316 held within the barrel part 131 and a bearing 317 held by a movable support 18 described below.

Figure 7:
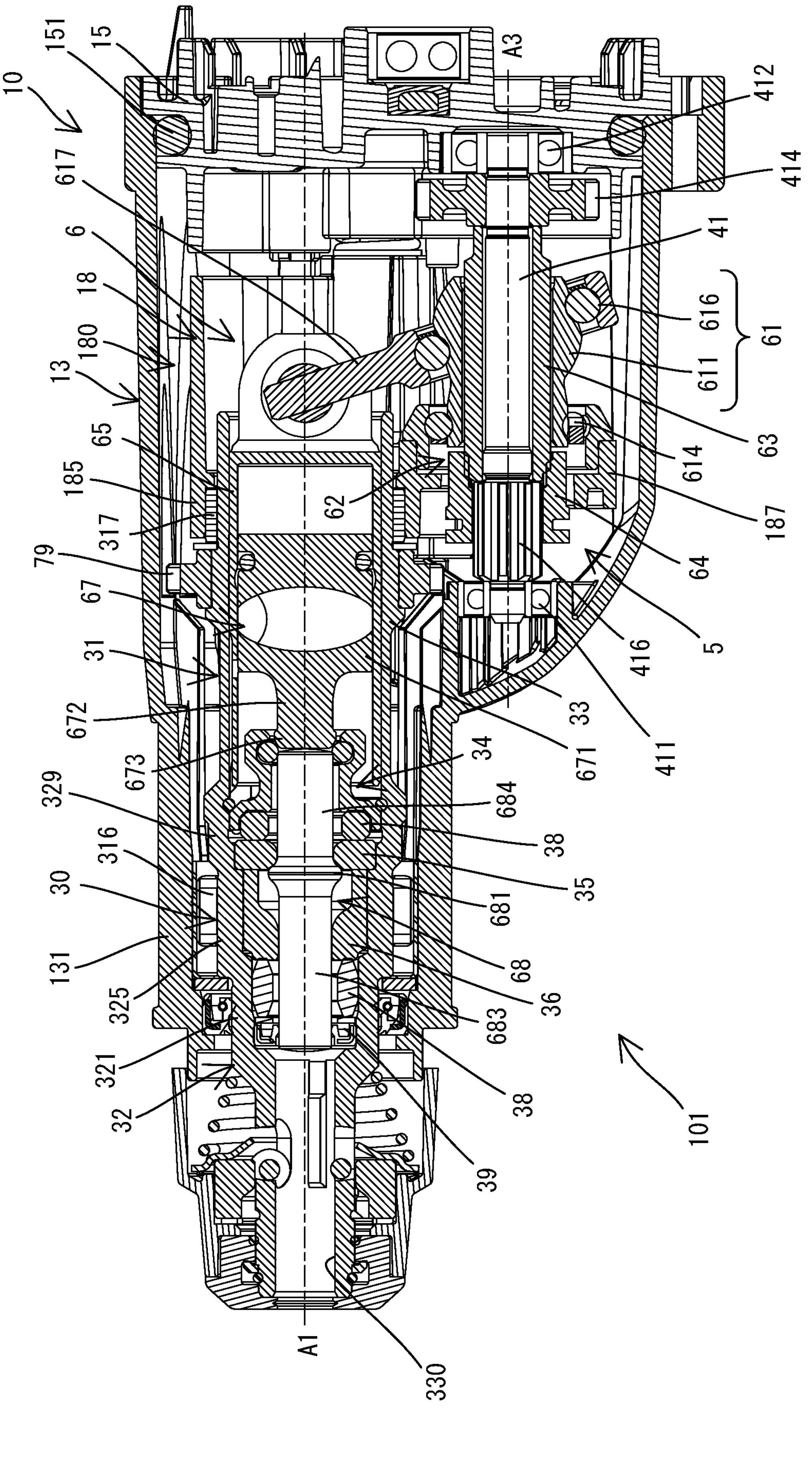
FIG. 7 is a sectional view taken along line VII-VII in FIG. 5.
Figure 8:
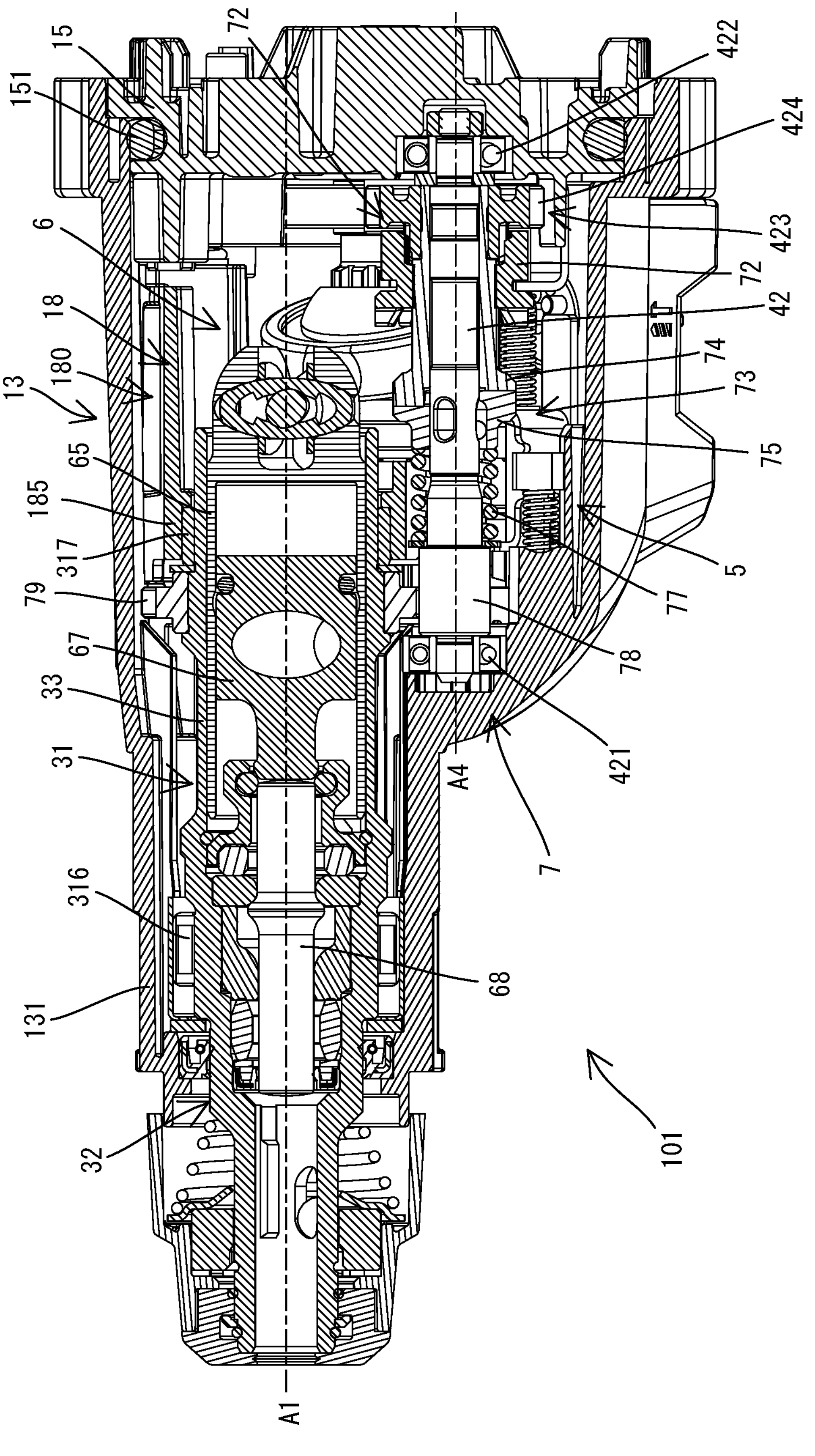
FIG. 8 is a sectional view taken along line VIII-VIII in FIG. 5.

The driving mechanism 5 is now described. As shown in FIGS. 6 to 8, in this embodiment, the driving mechanism 5 includes a striking mechanism 6 and a rotation-transmitting mechanism 7. The striking mechanism 6 is a mechanism for performing the hammering operation, and is configured to convert rotation of the first intermediate shaft 41 into linear motion and linearly (reciprocally) drive the tool accessory 91 along the driving axis A1. The rotation-transmitting mechanism 7 is a mechanism for performing the drilling operation, and is configured to transmit rotation of the second intermediate shaft 42 to the spindle 31 and rotationally drive the tool accessory 91 around the driving axis A1. The structures of the striking mechanism 6 and the rotation-transmitting mechanism 7 are now described in detail in this order.

In this embodiment, as shown in FIGS. 6 and 7, the striking mechanism 6 includes a motion-converting member (mechanism) 61, a piston 65, a striker 67 and an impact bolt 68.

The motion-converting member 61 is disposed on (around) the first intermediate shaft 41. The motion-converting member 61 is configured to convert rotation of the first intermediate shaft 41 into linear reciprocating motion and transmit it to the piston 65. More specifically, the motion-converting member 61 includes a rotary body 611 and an oscillating member 616. The rotary body 611 is supported by a bearing 614 so as to be rotatable around the rotation axis A3 relative to the body housing 10. The oscillating member 616 is mounted on (around) the rotary body 611 and is configured to oscillate (pivot or rock back and forth) in the extension direction of the rotation axis A3 (i.e. front-rear direction) while the rotary body 611 is rotating. To achieve this oscillating (linear reciprocating) motion, a plurality of rolling elements (e.g., balls) is disposed on (in) an elliptical track defined by an outer surface of the rotary body 611 (which acts as an inner ring of a roller bearing) and an inner surface of the oscillating member 616 (which acts as an outer ring of the roller bearing), whereby rotation of the rotary body 611 (inner ring) causes the oscillating member 616 (outer ring) to reciprocally pivot within a predetermined angular range about a horizontal line that intersects and is perpendicular to the rotational axis of the first intermediate shaft 41. The oscillating member 616 has an arm 617 extending upward away from the rotary body 611, which arm 617 moves back and forth in a direction parallel to the rotational axis of the first intermediate shaft 41 while the rotary body 611 is rotating, owing to the connection of the arm 617 to the piston 65. The oscillating member 616 may alternatively be called a rocking member or a pivoting member and refers to a structure having a function of oscillating or pivoting within a predetermined angular range about a line intersecting the rotational axis of the first intermediate shaft 41. It is noted that the motion-converting member/mechanism (also known as a rotation-to-linear reciprocating motion converting mechanism) 61 may be implemented as a swash bearing in the present embodiment, or in alternate embodiments, with a barrel cam follower, a wobble plate assembly, etc.

The piston 65 is a bottomed circular cylindrical member. The piston 65 is disposed within the cylinder 33 of the spindle 31 so as to be slidable along the driving axis A1. The piston 65 is connected to the arm 617 of the oscillating member 616 via a connecting pin and reciprocally moves in the front-rear direction while the oscillating member 616 is oscillating (pivoting or rocking back-and-forth in the front-rear direction).

The striker 67 is a striking element for applying a striking force to the tool accessory 91. The striker 67 is disposed within the piston 65 so as to be slidable along the driving axis A1. An internal space of the piston 65 behind the striker 67 is defined as an air chamber which serves as an air spring. The impact bolt 68 is an intermediate element for transmitting kinetic energy of the striker 67 to the tool accessory 91. The impact bolt 68 is disposed within the tool holder 32 in front of the striker 67 so as to be movable along the driving axis A1. In this embodiment, the impact bolt 68 is held to be slidable in the front-rear direction by a guide sleeve 36 and a restriction ring (blocking ring) 35 which are disposed within the tool holder 32.

When the piston 65 is moved in the front-rear direction along with oscillating movement of the oscillating member 616, the air pressure within the air chamber fluctuates and the striker 67 slides in the front-rear direction within the piston 65 by the action of the air spring. More specifically, when the piston 65 is moved forward, the air within the air chamber is compressed and its internal pressure increases. Thus, the striker 67 is pushed forward at high speed by the action of the air spring and strikes the impact bolt 68. The impact bolt 68 transmits the kinetic energy of the striker 67 to the tool accessory 91. Thus, the tool accessory 91 is linearly driven along the driving axis A1. On the other hand, when the piston 65 is moved rearward, the air within the air chamber expands and its internal pressure decreases, so that the striker 67 is retracted (moves) rearward. The tool accessory 91 moves rearward with the impact bolt 68 by being pressed against a workpiece. In this manner, the striking mechanism 6 repetitively performs the hammering operation.

In this embodiment, rotation of the first intermediate shaft 41 is transmitted to the motion-converting member 61 (specifically, the rotary body 611) via a first transmitting member 64 and an intervening member 63. The intervening member 63 and the first transmitting member 64 are now described in this order.

Figure 9:
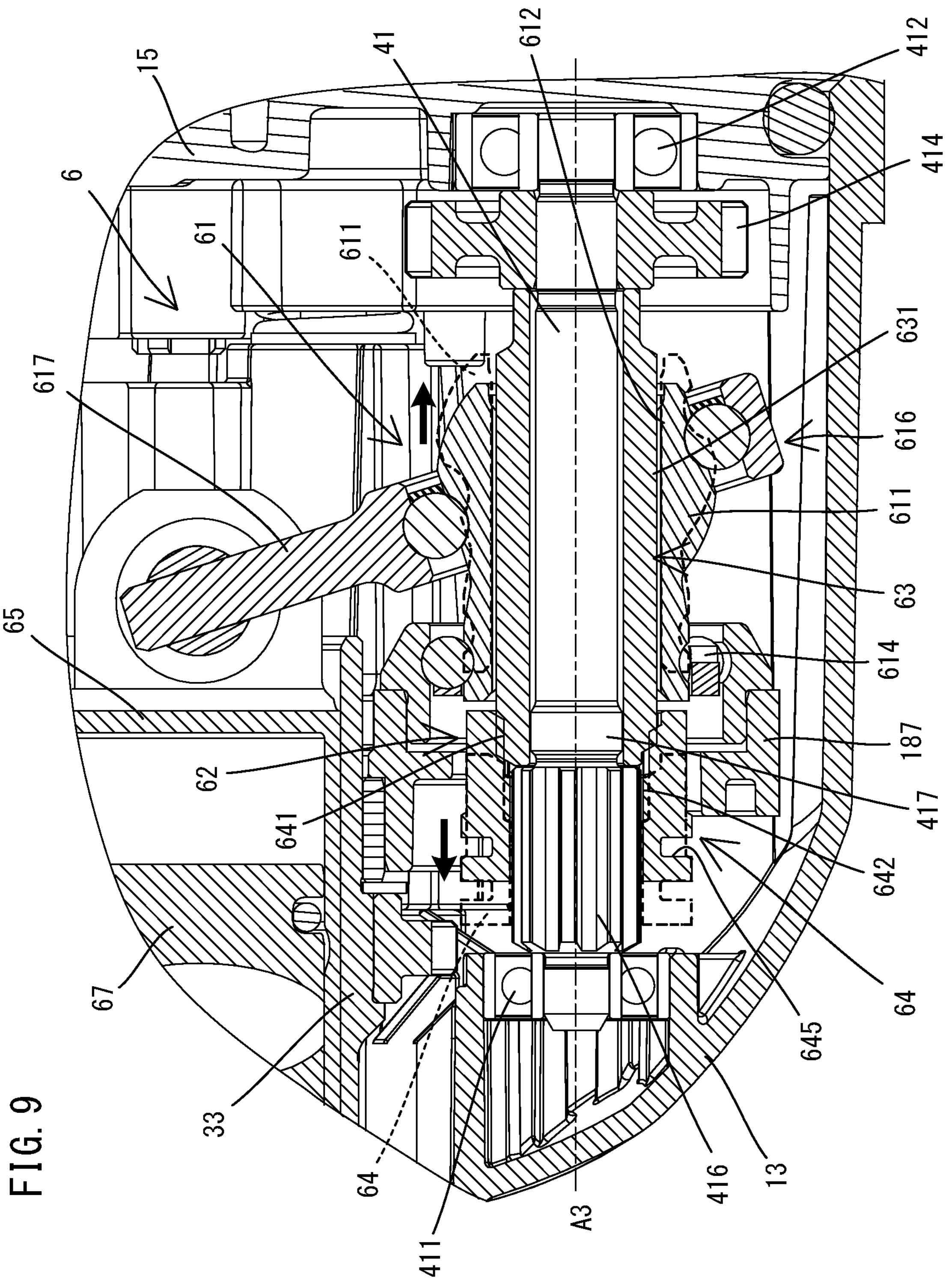
FIG. 9 is a partial, enlarged view of FIG. 7.

As shown in FIGS. 6 and 9, the intervening member 63 is a circular cylindrical member. The intervening member 63 is coaxially disposed around the first intermediate shaft 41, between the first intermediate shaft 41 and the motion-converting member 61 (specifically, the rotary body 611). The intervening member 63 is immovable in the front-rear direction relative to the first intermediate shaft 41. As will be further described below, when the intervening member 63 is not coupled to the first intermediate shaft 41, the intervening member 63 is rotatable around the rotation axis A3 relative to the first intermediate shaft 41.

More specifically, a front end portion (a portion adjacent to the rear of the front bearing 411) of the first intermediate shaft 41 is configured as a maximum-diameter part having a maximum outer diameter. A spline part 416 is provided on an outer periphery of the maximum-diameter part. The spline part 416 includes a plurality of splines (external teeth) extending in the rotation axis A3 direction (i.e. front-rear direction). The intervening member 63 is held to be immovable in the front-rear direction between the spline part 416 and the first driven gear 414 fixed to the rear end portion of the first intermediate shaft 41. Further, a portion of the first intermediate shaft 41 that is adjacent to the rear of the spline part 416 is configured as a large-diameter part 417, which has a slightly larger outer diameter than the portion of the first intermediate shaft 41 that extends rearward from the large-diameter part 417.

A spline part 631 is provided on an outer periphery of the intervening member 63. The spline part 631 extends substantially over the entire length of the intervening member 63. The spline part 631 includes a plurality of splines (external teeth) extending in the rotation axis A3 direction (i.e. front-rear direction). Further, the diameter of the spline part 631 of the intervening member 63 is larger than the diameter of the spline part 416 of the first intermediate shaft 41.

A spline part 612 is formed on an inner periphery of the rotary body 611. The spline part 612 includes splines (internal teeth) which are engaged (meshed) with the spline part 631. The intervening member 63 is always spline-engaged with the rotary body 611, and held by the rotary body 611. With such a structure, the rotary body 611 can move in the rotation axis A3 direction (i.e. front-rear direction) relative to the intervening member 63 and the first intermediate shaft 41, and rotate together with the intervening member 63.

The first transmitting member 64 is disposed on the first intermediate shaft 41. The first transmitting member 64 is configured to be rotatable together with the first intermediate shaft 41. The first transmitting member 64 is also configured to be movable in the rotation axis A3 direction (i.e. front-rear direction) relative to the first intermediate shaft 41 and the intervening member 63.

More specifically, the first transmitting member 64 is a generally circular cylindrical member disposed around the first intermediate shaft 41. A first spline part 641 and a second spline part 642 are provided on an inner periphery of the first transmitting member 64.

The first spline part 641 is provided on a rear end portion of the first transmitting member 64. The first spline part 641 includes a plurality of splines (internal teeth) configured to be engaged (meshed) with the spline part 631 of the intervening member 63. As described above, the spline part 631 of the intervening member 63 is also engaged (meshed) with the spline part 612 of the rotary body 611. Thus, the spline part 631 is effectively utilized for engagement with the two members, that is, the rotary body 611 and the first transmitting member 64. The second spline part 642 is provided on a front half of the first transmitting member 64. The second spline part 642 includes a plurality of splines (internal teeth) which are always engaged (meshed) with the spline part 416 of the first intermediate shaft 41.

With such a structure, when the first spline part 641 is placed in a position (hereinafter referred to as an engagement position) to be engaged with the spline part 631 of the intervening member 63, as shown by solid lines in FIG. 9, the first transmitting member 64 is rotatable together with the intervening member 63 and transmits power (rotational force) from the first intermediate shaft 41 to the intervening member 63. In this embodiment, the first spline part 641 has a larger diameter than the second spline part 642. By such provision of the first spline part 641 having a larger diameter, torque can be efficiently transmitted.

On the other hand, when the first spline part 641 is placed in a position (hereinafter referred to as a spaced apart position) to be spaced apart (separated) from (incapable of being engaged with) the spline part 631, as shown by dotted lines in FIG. 9, the first transmitting member 64 disables (interrupts, disconnects) power transmission from the first intermediate shaft 41 to the intervening member 63.

The diameter of the large-diameter part 417 of the first intermediate shaft 41 is set to be slightly smaller than the inner diameter of the intervening member 63. Therefore, the gap between an inner periphery of the intervening member 63 and an outer periphery of the large-diameter part 417 of the first intermediate shaft 41 is extremely small. This setting can realize smooth engagement between the first spline part 641 and the spline part 631 when the first transmitting member 64 moves from the spaced apart (disengaged) position to the engagement position. Further, a larger gap is secured between the inner periphery of the intervening member 63 and an outer periphery of a portion of the first intermediate shaft 41 other than the large-diameter part 417. This setting can reliably prevent co-rotation of the first intermediate shaft 41 and the intervening member 63 when power transmission from the first intermediate shaft 41 to the intervening member 63 is interrupted.

As described above, in this embodiment, the first transmitting member 64 and the intervening member 63 function as a first clutch mechanism 62 which transmits power for the hammering operation or interrupts the power transmission. In this embodiment, the first transmitting member 64 is connected to a mode-changing mechanism 80 (see FIG. 12). The first transmitting member 64 is movable between the engagement position and the spaced apart position in response to manual operation (rotation) of a mode-changing dial (action mode changing knob) 800 (see FIG. 2). Thus, the first clutch mechanism 62 is switchable between a power-transmission state and a power-interruption state, according to operation of the mode-changing dial 800. The mode-changing mechanism 80 will be described in detail below.

As shown in FIG. 8, in this embodiment, the rotation-transmitting mechanism 7 includes a driving gear 78 and a driven gear 79. The driving gear 78 is fixed to a front end portion (a portion adjacent to the rear of the front bearing 421) of the second intermediate shaft 42. The driven gear 79 is fixed to an outer periphery of the cylinder 33 of the spindle 31 and meshes with the driving gear 78. The driving gear 78 and the driven gear 79 form a speed-reducing (torque-increasing) gear mechanism. The spindle 31 is rotated together with the driven gear 79 while the driving gear 78 rotates together with the second intermediate shaft 42. In this manner, the drilling operation is performed in which the tool accessory 91 held by the tool holder 32 is rotationally driven around the driving axis A1.

As described above, in this embodiment, rotation of the second driven gear 424, which is rotated by the motor shaft 25, is transmitted to the second intermediate shaft 42 via the second transmitting member 72 and the torque limiter 73. The torque limiter 73 and the second transmitting member 72 are now described in this order.

Figure 10:
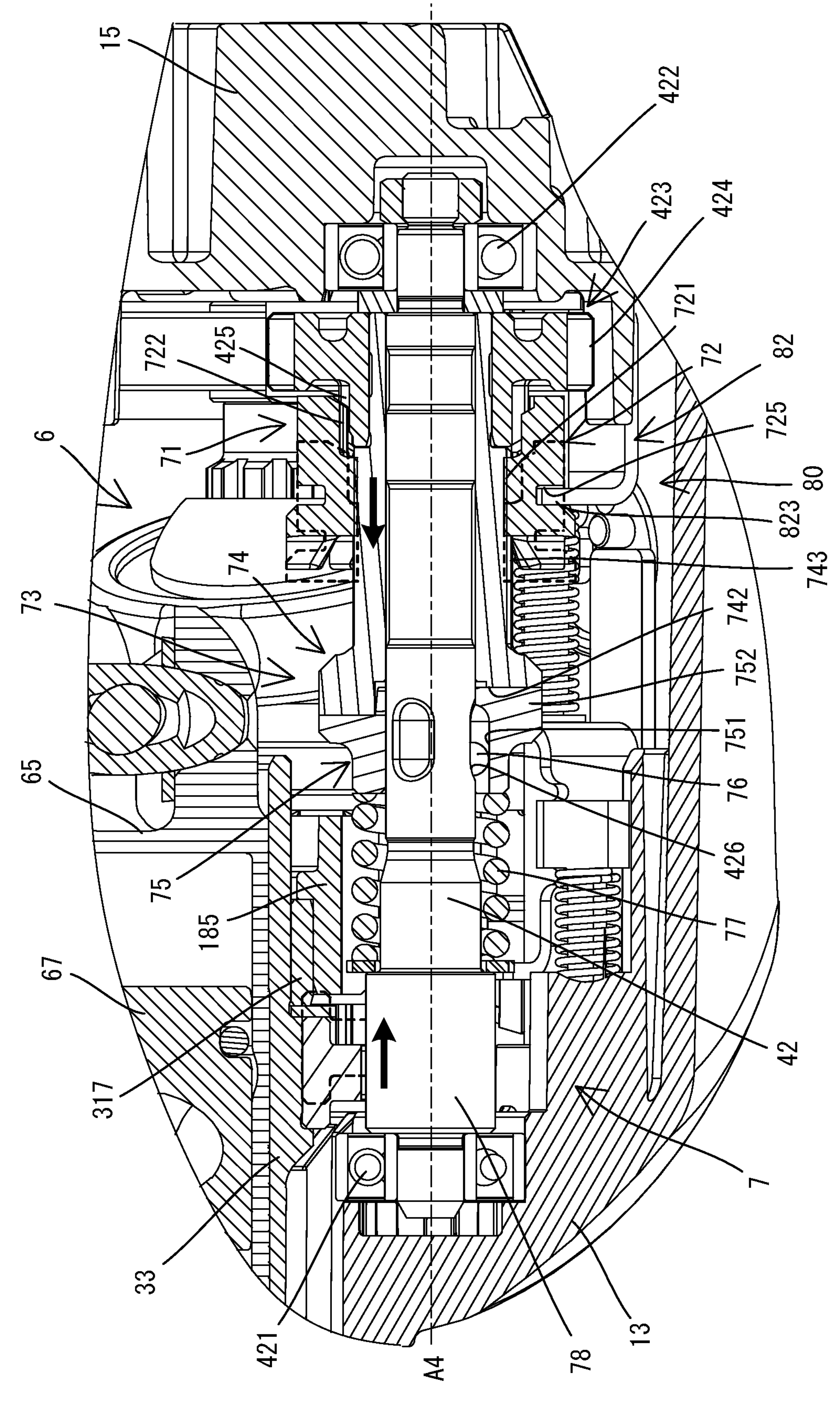
FIG. 10 is a partial, enlarged view of FIG. 8.

As shown in FIGS. 6 and 10, the torque limiter 73 is disposed on the second intermediate shaft 42. The torque limiter 73 is a safety clutch mechanism which is configured to interrupt power transmission when torque acting on the second intermediate shaft 42 exceeds a threshold. In this embodiment, the torque limiter 73 includes a drive-side member 74, a driven-side member 75, balls 76 and a biasing spring 77.

The drive-side member 74 is a circular cylindrical member. The drive-side member 74 is rotatably supported by a rear half of the second intermediate shaft 42. The second driven gear 424 is rotatably supported by a rear end portion of the drive-side member 74. Therefore, the drive-side member 74 can rotate around the rotation axis A4 relative to the second intermediate shaft 42 and the second driven gear 424.

The drive-side member 74 includes cam recesses 742 (see FIG. 11) and a spline part 743. The cam recesses 742 are formed on a front end of the drive-side member 74. The cam recesses 742 each have a cam face inclined in a circumferential direction. The spline part 743 is provided on an outer periphery of the drive-side member 74 behind the cam recesses 742. The spline part 743 includes a plurality of splines (external teeth) extending in a rotation axis A4 direction (i.e. front-rear direction).

The driven-side member 75 is a circular cylindrical member. The driven-side member 75 is disposed around the second intermediate shaft 42 in front of the drive-side member 74. On an inner periphery of the driven-side member 75, a plurality of grooves 751 are arranged in (around) a circumferential direction of the driven-side member 75. The grooves 751 each extend in the rotation axis A4 direction (i.e. front-rear direction). Further, on an outer periphery of the second intermediate shaft 42, a plurality of grooves 426 are arranged in (around) a circumferential direction of the second intermediate shaft 42. The grooves 751 each extend in the rotation axis A4 direction (i.e. front-rear direction). The balls 76 are respectively accommodated within tracks defined by the corresponding grooves 426 and grooves 751 so as to be rollable along the respective tracks that each extend in the front-rear direction, i.e. in parallel to the driving axis A1. Thus, the driven-side member 75 is engaged with the second intermediate shaft 42 via the balls 76 in a radial direction and the circumferential direction, and is rotatable together with the second intermediate shaft 42. Further, the driven-side member 75 is movable in the front-rear direction relative to the second intermediate shaft 42 within a range in which the balls 76 can roll within the tracks.

The driven-side member 75 has cam projections 752 (see FIG. 11) provided on its rear end. The cam projections 752 are shaped to substantially conform to the cam recesses 742 of the drive-side member 74. The cam projections 752 each have a cam face inclined in the circumferential direction of the driven-side member 75. The biasing spring 77 is a compression coil spring. The biasing spring 77 is disposed in a compressed state between the driving gear 78 and the driven-side member 75. Therefore, the biasing spring 77 always biases the driven-side member 75 in a direction toward the drive-side member 74 (i.e. rearward), that is, in a direction that causes the cam projections 752 to respectively engage with the cam recesses 742. When the cam projections 752 are engaged with the cam recesses 742, torque can be transmitted from the drive-side member 74 to the driven-side member 75 and thus the second intermediate shaft 42 is rotated. The drive-side member 74 and the gear member 423 are biased rearward via the driven-side member 75 and are held in their rearmost positions relative to the second intermediate shaft 42.

Figure 11:
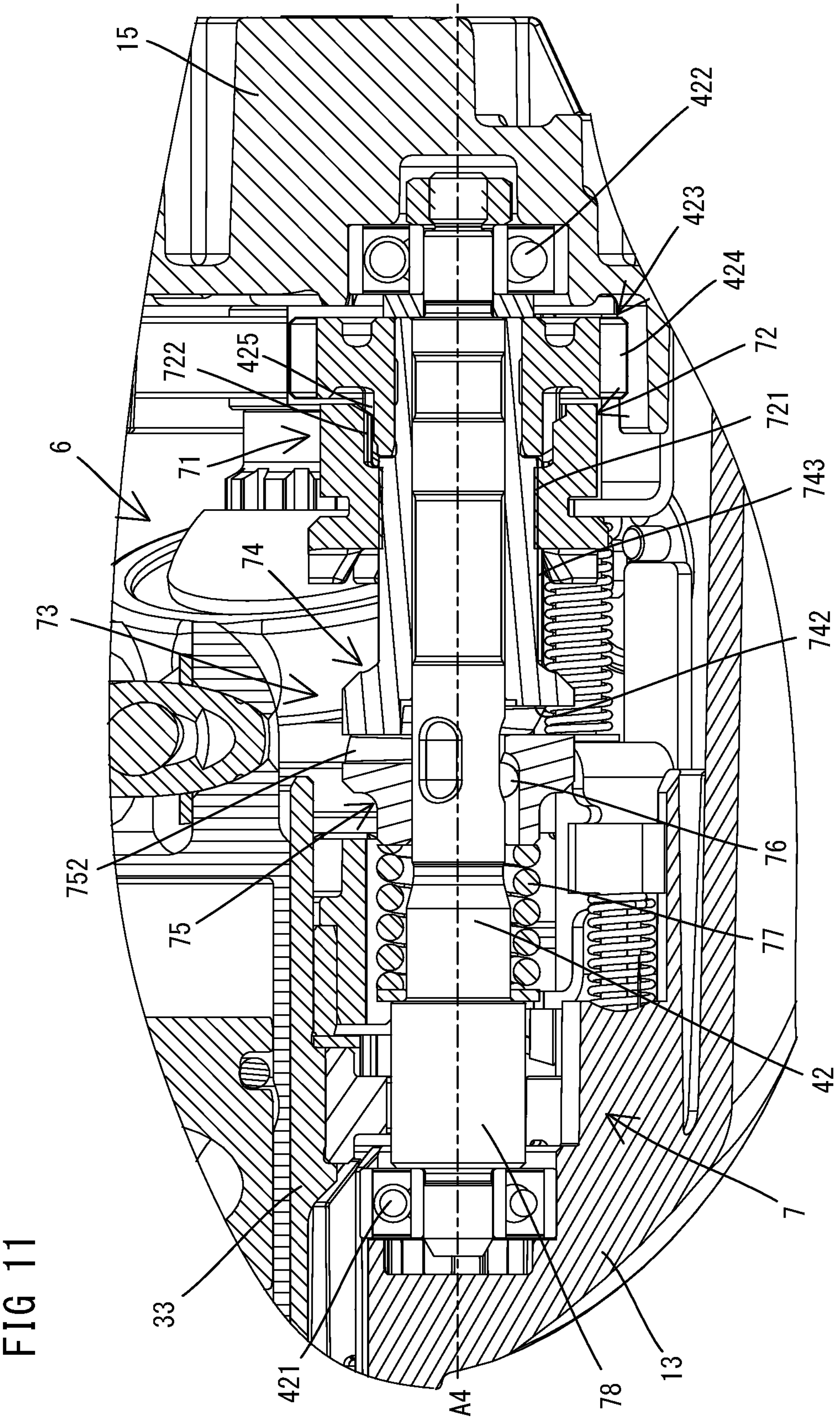
FIG. 11 is an explanatory drawing, corresponding to FIG. 10, for illustrating operation of a torque limiter.

When the second intermediate shaft 42 is rotating and a load exceeding the threshold is applied to the second intermediate shaft 42 via the tool holder 32 (the spindle 31) due to jamming or binding of the tool accessory 91 or other causes, the cam projections 752 disengage from the cam recesses 742, as shown in FIG. 11. More specifically, owing to the interaction of the cam faces (inclined surfaces) of the cam projections 752 and the cam recesses 742, the cam projections 752 disengage from the cam recesses 742, against the biasing force of the biasing spring 77, and abut on a front end surface of the drive-side member 74. Thus, the driven-side member 75 moves in a direction away from the drive-side member 74 (i.e. forward). At this time, the driven-side member 75 can smoothly move forward, while being guided by the balls 76 that can roll between (in the tracks defined by) the driven-side member 75 and the second intermediate shaft 42. As a result, torque transmission from the drive-side member 74 to the driven-side member 75 is interrupted and thus rotation of the second intermediate shaft 42 is interrupted.

As shown in FIGS. 6 and 10, the second transmitting member 72 is disposed on the second intermediate shaft 42. The second transmitting member 72 is configured to be rotatable together with the drive-side member 74 of the torque limiter 73 and to be movable in the rotation axis A4 direction (i.e. front-rear direction) relative to the drive-side member 74 and the gear member 423.

More specifically, the second transmitting member 72 is a generally circular cylindrical member. The second transmitting member 72 is disposed around the drive-side member 74. A first spline part 721 and a second spline part 722 are provided on an inner periphery of the second transmitting member 72. The first spline part 721 is provided on a front half of the second transmitting member 72. The first spline part 721 includes a plurality of splines (internal teeth) which are always engaged (meshed) with the spline part 743 of the drive-side member 74. The second spline part 722 is provided on a rear end portion of the second transmitting member 72, and has a larger inner diameter than the first spline part 721. The second spline part 722 includes a plurality of splines (internal teeth) configured to be engaged (meshed) with the spline part 425 of the gear member 423.

With such a structure, when the second spline part 722 is placed in a position (hereinafter referred to as an engagement position) to be engaged with the spline part 425 of the gear member 423 in the front-rear direction, as shown by solid lines in FIG. 10, the second transmitting member 72 is rotatable together with the gear member 423. Therefore, the drive-side member 74, which is spline-engaged with the second transmitting member 72, also is rotatable together with the gear member 423. On the other hand, when the second spline part 722 is placed in a position (hereinafter referred to as a spaced apart position) to be spaced apart (separated) from (incapable of being engaged with) the spline part 425, as shown by dotted lines in FIG. 10, the second transmitting member 72 disables (interrupts) power transmission from the gear member 423 to the drive-side member 74.

As described above, in this embodiment, the second transmitting member 72 and the gear member 423 function as a second clutch mechanism 71 which transmits power for the drilling operation (tool holder rotation) or interrupts this power transmission. In this embodiment, like the first transmitting member 64, the second transmitting member 72 is connected to the mode-changing mechanism 80 (see FIG. 12), and is moved between the engagement position and the spaced apart position in response to manual operation (rotation) of the mode-changing dial 800 (see FIG. 2). Thus, like the first clutch mechanism 62, the second clutch mechanism 71 also is switched between the power-transmission state and the power-interruption state in response to manipulation of the mode-changing dial 800.

The mode-changing dial 800 and the mode-changing mechanism 80 are now described.

Figure 12:
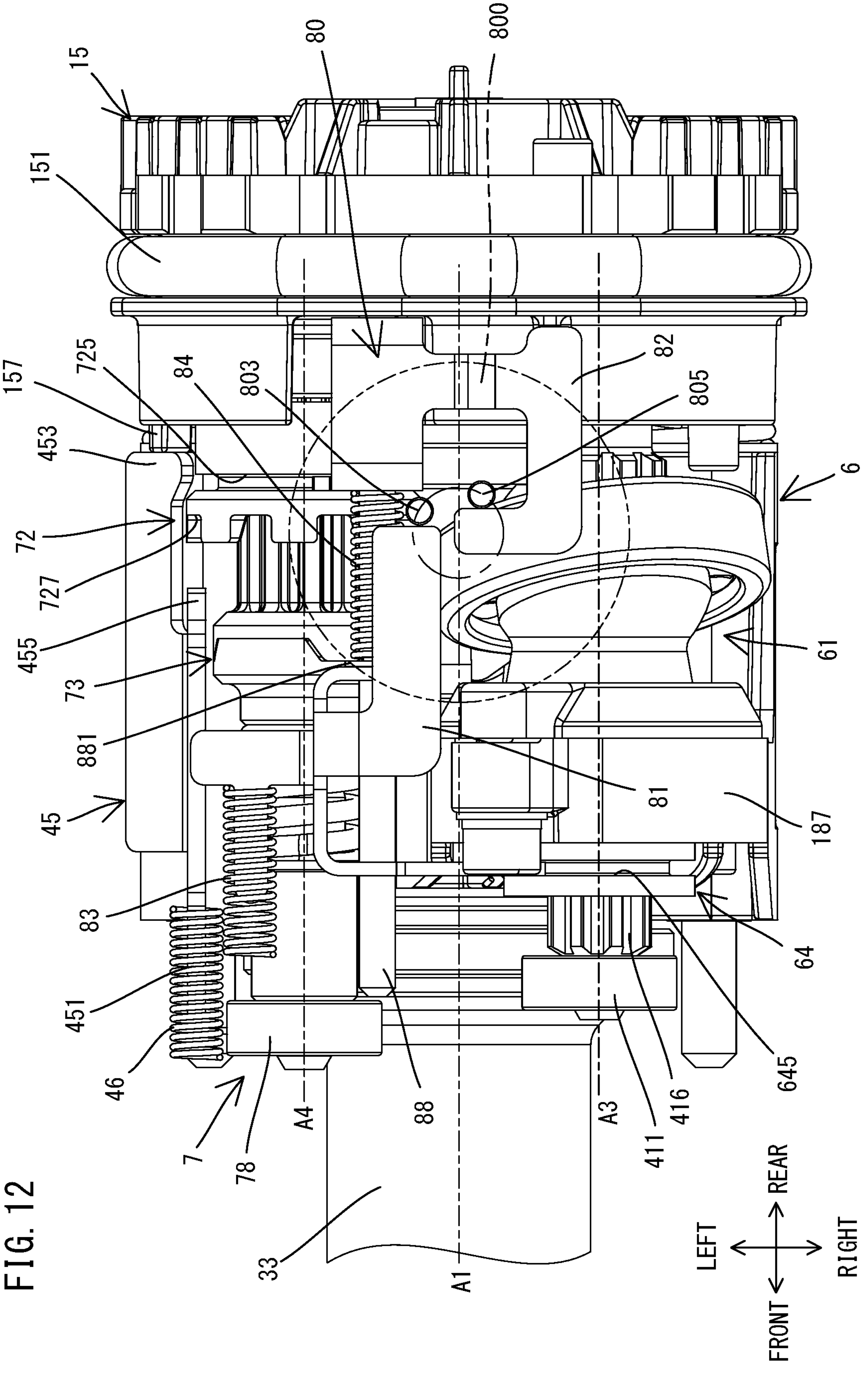
FIG. 12 is a partial bottom view of the rotary hammer with a front housing removed therefrom, showing a mode-changing mechanism, wherein a hammer-drill mode has been selected.
Figure 13:
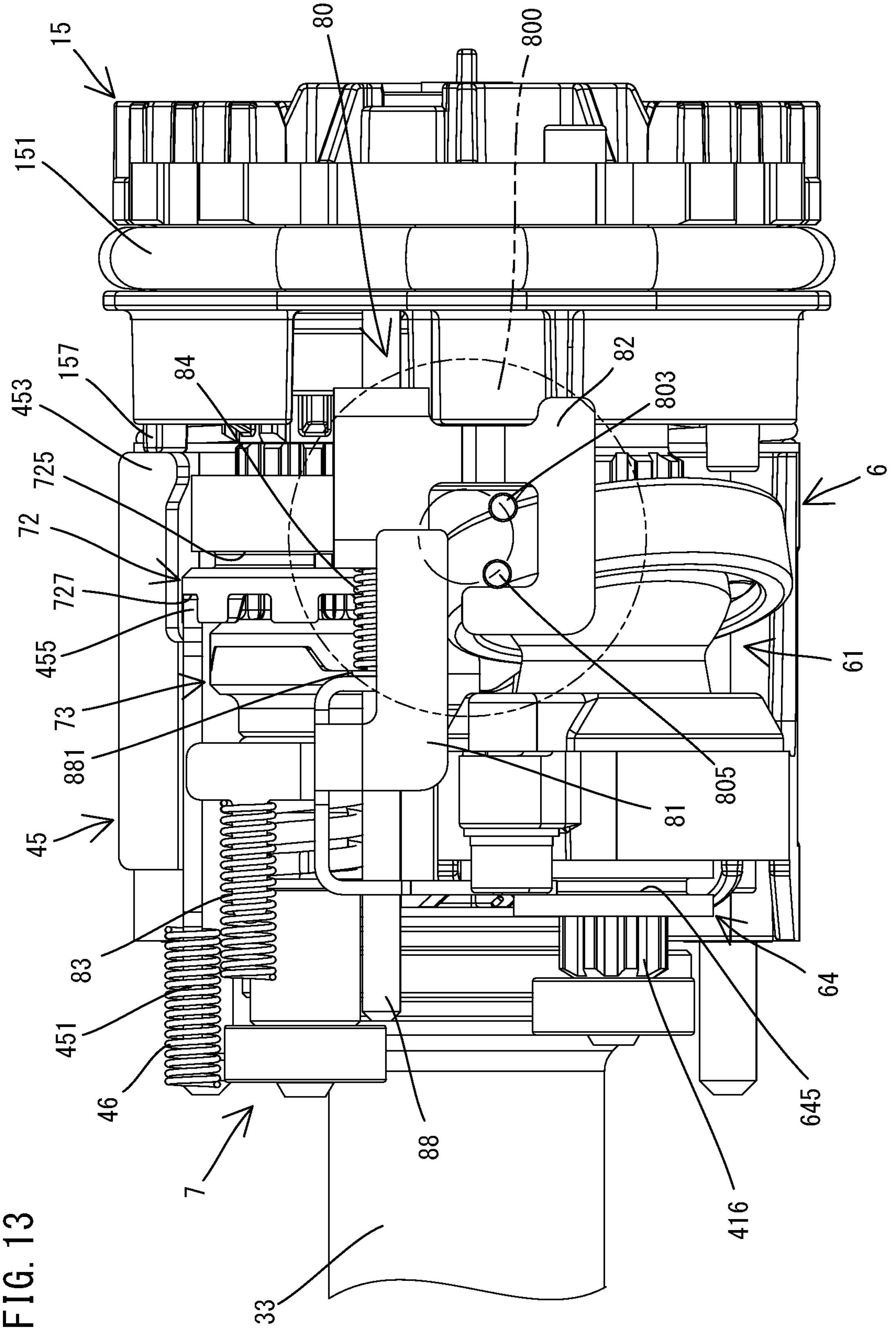
FIG. 13 is a view showing the mode-changing mechanism similar to FIG. 12, wherein a hammer mode has been selected.
Figure 14:
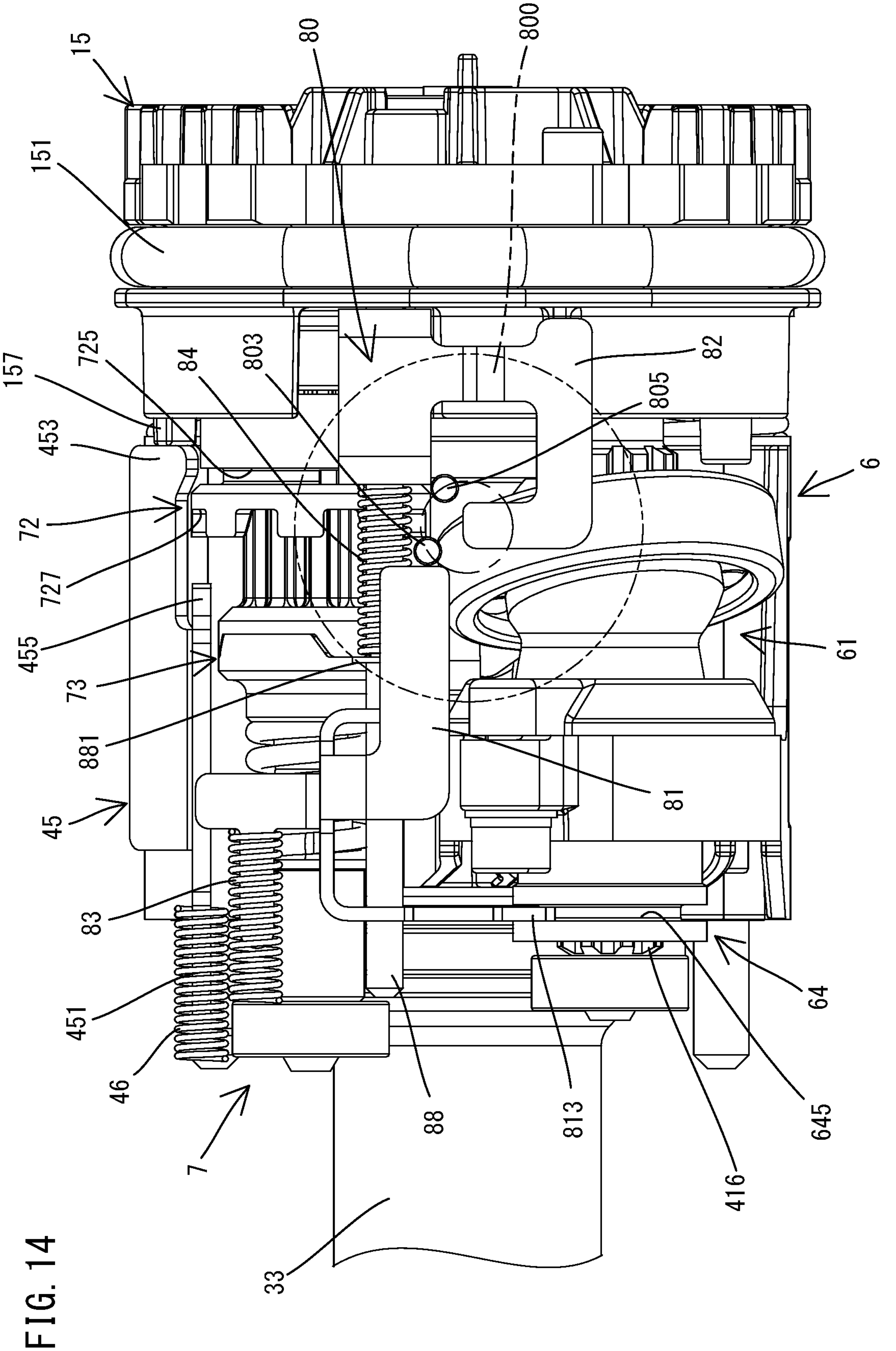
FIG. 14 is a view showing the mode-changing mechanism similar to FIG. 12, wherein a drill mode has been selected.

As shown in FIGS. 12 to 14, the mode-changing mechanism 80 is configured to change the action mode of the rotary hammer 101 in accordance with (in response to) movement (rotation) of the mode-changing dial 800. In this embodiment, the rotary hammer 101 has three action modes, namely a hammer-drill mode (rotation with hammering), a hammer mode (hammering only) and a drill mode (rotation only). In the hammer-drill mode, the striking mechanism 6 and the rotation-transmitting mechanism 7 are both driven, so that the hammering operation and the drilling operation are both performed, i.e. the tool accessory 91 is simultaneously rotated and axially hammered. In the hammer mode, power transmission for the drilling operation is interrupted by the second clutch mechanism 71 and only the striking mechanism 6 is driven, so that only the hammering operation is performed, i.e. the tool accessory 91 is only hammered (without rotation). In the drill mode, power transmission for the hammering operation is interrupted by the first clutch mechanism 62 and only the rotation-transmitting mechanism 7 is driven, so that only the drilling operation is performed, i.e. the tool accessory 91 is only rotated (without hammering).

As shown in FIGS. 2 and 12 to 14, the mode-changing dial 800 is provided on a lower portion of the body housing 10 (specifically, the front housing 13) so that the mode-changing dial 800 can be externally operated (manipulated) by a user. The mode-changing dial 800 includes a disc-like operation part 801 having a knob, a first pin 803 and a second pin 805. The first pin 803 and the second pin 805 protrude from the operation part 801 toward the interior of the body housing 10.

The operation part 801 is held by the body housing 10 so as to be rotatable around a rotation axis extending in the up-down direction. A portion of the operation part 801 is exposed to the outside through an opening formed in a lower wall of the body housing 10 (the front housing 13) so as to be turnable by the user. It is noted that rotational positions corresponding to the hammer-drill mode, the hammer mode and the drill mode, respectively, are defined on the mode-changing dial 800. The user can set a desired action mode by turning the mode-changing dial 800 to the rotational position that corresponds to the desired action mode. The first and second pins 803 and 805 protrude upward from an upper surface of the operation part 801. When the mode-changing dial 800 is turned, the first and second pins 803 and 805 move along (trace) a circumference of a circle centered on the rotation axis of the operation part 801.

The mode-changing mechanism 80 includes a first switching member 81, a second switching member 82, a first spring 83 and a second spring 84.

The first switching member 81 has a pair of support holes (not shown). The first switching member 81 is supported to be movable in the front-rear direction by a support shaft 88 which is inserted through the support holes. The support shaft 88 is fixed to the bearing support 15 and protrudes forward from the bearing support 15. The support shaft 88 extends in parallel to the first and second intermediate shafts 41 and 42. A retaining ring 881 is fixed to a central portion of the support shaft 88 in an axial direction of the support shaft 88. The first switching member 81 is supported in front of the retaining ring 881. The second switching member 82 has a pair of support holes (not shown). The second switching member 82 is supported to be movable in the front-rear direction by the support shaft 88, which is inserted through the support holes. The second switching member 82 is disposed behind the retaining ring 881.

The first and second switching members 81 and 82 are respectively engaged with the first and second transmitting members 64 and 72. More specifically, annular grooves 645 and 725 are formed on (in) the outer peripheries of the first and second transmitting members 64 and 72, respectively. The first switching member 81 is engaged with the first transmitting member 64 via a plate-like first engagement part 813 (see FIG. 14) disposed in the groove 645. Similarly, the second switching member 82 is engaged with the second transmitting member 72 via a plate-like second engagement part 823 (see FIG. 10) disposed in the groove 725. The first transmitting member 64 is rotatable relative to the first switching member 81 in a state in which the first engagement part 813 is engaged with the groove 645. Similarly, the second transmitting member 72 is rotatable relative to the second switching member 82 in a state in which the second engagement part 813 is engaged with the groove 725.

The first spring 83 is a compression coil spring. The first spring 83 is disposed in a compressed state between the front housing 13 and the first switching member 81, and always biases the first switching member 81 rearward. Thus, the first transmitting member 64 engaged with the first switching member 81 is also always biased rearward toward the engagement position. The second spring 84 is a compression coil spring. The second spring 84 is disposed in a compressed state between the retaining ring 881 fixed to the support shaft 88 and the second switching member 82, and always biases the second switching member 82 rearward. Thus, the second transmitting member 72 engaged with the second switching member 82 is also always biased rearward toward the engagement position. A rearmost position of the first switching member 81 is a position where the first switching member 81 abuts on the retaining ring 881. A rearmost position of the second switching member 82 is a position where the second switching member 82 abuts on a front surface of the bearing support 15.

When the mode-changing dial 800 is set to the rotational position that corresponds to the hammer-drill mode (hereinafter referred to as the hammer-drill position) shown in FIG. 12, the first pin 803 is positioned adjacent to the rear of the first switching member 81 located in the rearmost position, and the second pin 805 is positioned adjacent to the rear of the second switching member 82 located in the rearmost position. At this time, the first transmitting member 64 is located in the engagement position where the second spline part 642 is engaged with the spline part 631 of the intervening member 63 (see FIG. 9), so that the first clutch mechanism 62 is in the power-transmission state. Further, the second transmitting member 72 is located in the engagement position where the second spline part 722 is engaged with the spline part 425 of the gear member 423 (see FIG. 10), so that the second clutch mechanism 71 is also in the power-transmission state.

When the motor 2 is energized, power (rotational motion) is transmitted from the motor shaft 25 to the striking mechanism 6 via the first intermediate shaft 41 and the hammering operation is performed. At the same time, power (rotational motion) is transmitted from the motor shaft 25 to the rotation-transmitting mechanism 7 via the second intermediate shaft 42 and the drilling operation is also performed.

When the mode-changing dial 800 is manually turned from the hammer-drill position shown in FIG. 12 to the rotational position that corresponds to the hammer mode (hereinafter referred to as the hammer position) shown in FIG. 13, the second pin 805 moves in the clockwise direction (when viewed from below) while abutting the rear side of the second switching member 82 and thereby the second switching member 82 moves forward against the biasing force of the second spring 84. When the mode-changing dial 800 is placed in the hammer position, the second switching member 82 is positioned at its foremost position. At the same time, the movement of the second switching member 82 causes the second transmitting member 72 to move from the engagement position to the spaced apart (disengaged) position (see FIG. 10). Thus, the second clutch mechanism 71 is switched to the power-interruption state, which may also be called the power disconnection state or the rotation disengagement state.

Furthermore, at the same time, the first pin 803 moves in the clockwise direction (when viewed from below) without interfering with (contacting) the first and second switching members 81 and 82, and is moved to a position spaced apart (separated) from the first and second switching members 81 and 82. Therefore, at this time, the first switching member 81 and the first transmitting member 64 do not move, and thus the first clutch mechanism 62 remains in the power-transmission state.

In this state, when the motor 2 is energized, power (rotational motion) is not transmitted from the motor shaft 25 to the second intermediate shaft 42, so that a drilling operation is not performed. On the other hand, power (rotational motion) is transmitted from the motor shaft 25 to the striking mechanism 6 via the first intermediate shaft 41, so that only the hammering operation is performed.

When the mode-changing dial 800 is manually turned from the hammer-drill position shown in FIG. 12 to the rotational position that corresponds to the drill mode (hereinafter referred to as the drill position) shown in FIG. 14, the first pin 803 moves in a counterclockwise direction (when viewed from below) around the rotation axis of the operation part 801 and abuts on the first switching member 81 from the rear, whereby the first pin 803 moves the first switching member 81 forward against the biasing force of the first spring 83. When the mode-changing dial 800 is placed in the drill position, the first switching member 81 has been moved to its foremost position. At the same time, the movement of the first switching member 81 causes the first transmitting member 64 to move from the engagement position to the spaced apart (disengaged) position (see FIG. 9). Thus, the first clutch mechanism 62 is switched to the power-interruption state.

At the same time, the second pin 805 moves in the counterclockwise direction (when viewed from below) around the rotation axis of the operation part 801 without interfering with (contacting) the first and second switching members 81 and 82 and is placed in (at) a position adjacent to the second switching member 82. Therefore, during this time, the second switching member 82 and the second transmitting member 72 do not move, and thus the second clutch mechanism 71 remains in the power-transmission state.

In this state, when the motor 2 is energized, power (rotational motion) is not transmitted from the first intermediate shaft 41 to the motion-converting member 61, so that a hammering operation is not performed. On the other hand, power (rotational motion) is transmitted from the motor shaft 25 to the rotation-transmitting mechanism 7 via the second intermediate shaft 42, so that only the drilling operation is performed.

As described above, the rotary hammer 101 of this embodiment includes two separate (discrete) intermediate shafts (i.e. the first intermediate shaft 41 and the second intermediate shaft 42) which extend in parallel to the driving axis A1 and transmit power for the hammering operation and the drilling operation, respectively. Therefore, the first intermediate shaft 41 and the second intermediate shaft 42 can be shortened, compared with an embodiment in which one common intermediate shaft is shared for power transmission for both the hammering operation and the drilling operation. Thus, the overall length of the rotary hammer 101 can be reduced in the driving-axis direction. Further, by shortening the first intermediate shaft 41 and the second intermediate shaft 42, the center of gravity of the rotary hammer 101 can be located closer to the handle 17, which is connected to the rear end portion of the body housing 10, thereby improving ease of operation.

Further, the first intermediate shaft 41 and the second intermediate shaft 42 are respectively dedicated for power transmission for the hammering operation and power transmission for the drilling operation. In other words, a power-transmission path exclusively for the hammering operation and a (separate) power-transmission path exclusively for the drilling operation (rotation of the spindle 31) are provided, not in series, but in parallel. Therefore, power transmission from the first intermediate shaft 41 to the striking mechanism 6 and power transmission from the second intermediate shaft 42 to the rotation-transmitting mechanism 7 and thus to the spindle 31, which is a final output shaft, can be separately optimized.

The first intermediate shaft 41 exclusively for the hammering operation requires a certain (longer) length because the motion-converting member 61 is mounted on the first intermediate shaft 41. On the other hand, the driving gear 78 which is mounted on the second intermediate shaft 42 exclusively for the drilling operation is not required to be as long. Therefore, in this embodiment, a free space (section) on the second intermediate shaft 42 is effectively utilized to arrange (place) the torque limiter 73 in a space-saving manner. The torque transmitted by the second intermediate shaft 42 is less than the torque on the spindle 31, which serves as the final output shaft. Therefore, the torque limiter 73 can be smaller and lighter in the present embodiment than in an embodiment in which a torque limiter is mounted on the spindle 31. Further, during operation of the torque limiter 73, the rolling balls 76 can guide movement of the driven-side member 75 in the direction of the rotation axis A4. This structure can reduce friction between the driven-side member 75 and the second intermediate shaft 42, and thus stabilize operating torque.

Further, in this embodiment, the first clutch mechanism 62 and the second clutch mechanism 71 are respectively provided on the first intermediate shaft 41 and the second intermediate shaft 42. Therefore, power for the hammering operation and power for the drilling operation can be separately (independently) interrupted as needed. Further, both the first clutch mechanism 62 and the second clutch mechanism 71 may be switched between the power-transmission state and the power-interruption state, in response to operation (manipulation) of the same operation member (i.e. the mode-changing dial 800). Therefore, a user can cause the first clutch mechanism 62 and the second clutch mechanism 71 to operate, by simply operating (turning) the mode-changing dial 800 to change the action mode, depending on the desired processing (work) operation.

As shown in FIGS. 6 and 12 to 14, a lock plate 45 is provided in the rotary hammer 101. The lock plate 45 is configured to restrict (block) rotation of the second intermediate shaft 42 in the hammer mode, in order to prevent the tool accessory 91 (which is held by the tool holder 32) from freely rotating during a hammering operation.

The lock plate 45 is configured to be engaged with the second transmitting member 72, when it is placed in the spaced apart position, to thereby restrict (block) rotation of the second transmitting member 72. The lock plate 45 is an elongate metal member. The lock plate 45 is biased rearward by a biasing spring 46 and held by ribs 137 (only partially shown in FIGS. 5 and 19 to 21), which are provided in the front housing 13 so as to be slidable in the front-rear direction. The biasing spring 46 is a compression coil spring. A front end portion of the biasing spring 46 is fitted into a recess 138 (see FIGS. 19 to 21) provided in the front housing 13.

The lock plate 45 includes a spring-receiving (spring holding) part 451, a contact part 453 and a locking part 455. The spring-receiving part 451 is a projection provided on a front end portion of the lock plate 45. The spring-receiving part 451 is inserted into a rear end portion of the biasing spring 46. The contact part 453 is disposed radially outward of the torque limiter 73 and the second transmitting member 72. The contact part 453 extends rearward along an inner peripheral surface of the front housing 13. The lock plate 45 is biased rearward by the biasing spring 46 and is held at a position (initial position) where a rear end surface of the contact part 453 abuts on a front end surface of a projection 157, which protrudes forward from the front surface of the bearing support 15. The locking part 455 is a generally rectangular portion arranged in front of the second transmitting member 72. A plurality of recesses 727 are formed in a front end portion of the second transmitting member 72. The recesses 727 are arranged at equal intervals in a circumferential direction. The recesses 727 each have a generally rectangular shape recessed rearward from a front end of the second transmitting member 72.

As described above, in the hammer-drill mode and the drill mode, the second transmitting member 72 is placed in the engagement position. At this time, as shown in FIGS. 12 and 14, the locking part 455 of the lock plate 45 is located at a position spaced apart forward from the second transmitting member 72. Therefore, the second transmitting member 72 can rotate together with the first driven gear 414, without interfering with the lock plate 45.

In the hammer mode, as shown in FIG. 13, the second transmitting member 72 is placed at the spaced apart position forward of the engagement position, and the locking part 455 of the lock plate 45 is engaged with (in) one of the recesses 727 of the second transmitting member 72. Thus, rotation of the second transmitting member 72 is restricted (blocked), so that rotation of the drive-side member 74, the driven-side member 75 and the second intermediate shaft 42 are also restricted (blocked). Accordingly, rotation of the spindle 31 via the driving gear 78 and the driven gear 79 is also restricted (blocked).

When the locking part 455 does not face (oppose) one of the recesses 727 and the second transmitting member 72 moves forward from the engagement position to the spaced apart position, a front end surface of the second transmitting member 72 abuts on the locking part 455 and moves the lock plate 45 forward against the biasing force of the biasing spring 46. Thereafter, when the tool accessory 91 is rotated and the second transmitting member 72 is rotated via the spindle 31 and the second intermediate shaft 42 to a position where the locking part 455 faces (opposes) one of the recesses 727, the lock plate 45 is urged by the biasing spring 46 to move rearward and the locking part 455 engages with (in) the opposing one of the recesses 727.

In this embodiment, the rotary hammer 101 also has a vibration-isolating structure that reduces (attenuates) the transmission of vibration (in particular, vibration in the driving-axis direction (front-rear direction)), which is caused by driving of the driving mechanism 5, to the body housing 10 and the handle 17. The vibration-isolating structure of the rotary hammer 101 is now described.

In this embodiment, as shown in FIG. 2, the spindle 31 and the striking mechanism 6 (specifically, the motion-converting member 61, the piston 65, the striker 67, and the impact bolt 68) are disposed within the body housing 10 so as to be movable in the driving-axis direction (i.e. front-rear direction) relative to the body housing 10. More specifically, a movable support 18 is disposed within the body housing 10. The movable support 18 is movable in the front-rear direction relative to the body housing 10, in a state in which the movable support 18 is biased forward relative to the body housing 10. The spindle 31 and the striking mechanism 6 are supported by the movable support 18, and thus the spindle 31 and the striking mechanism 6 are movable together with the movable support 18 relative to the body housing 10.

As shown in FIGS. 5, 7, 15 and 16, the movable support 18 includes a spindle-support part 185, a rotary-body-support part 187, a first-shaft-insertion part 181 and a second-shaft-insertion part 182. In this embodiment, the movable support 18 is a single (integral) metal member.

The spindle-support part 185 has a generally circular cylindrical shape. The spindle-support part 185 is configured as a portion for supporting the spindle 31. The bearing 317 is held inside the spindle-support part 185. The spindle-support part 185 supports a rear portion of the cylinder 33 via the bearing 317 so that the cylinder 33 is rotatable around the driving axis A1. As described above, the spindle 31 is supported by the two bearings 316 and 317 so as to be rotatable around the driving axis A1 relative to the body housing 10. The other bearing 316 is held within the barrel part 131 and supports a rear portion of the tool holder 32 so that the tool holder 32 is rotatable around the driving axis A1 and is also movable in the front-rear direction.

The rotary-body-support part 187 is a generally circular cylindrical portion which is integrally connected to a right lower end portion of the spindle-support part 185. The bearing 614 is fixed to the rotary-body-support part 187 by screws. The rotary-body-support part 187 supports the rotary body 611 via the bearing 614 so that the rotary body 611 is rotatable around the rotation axis A3.

As described above, the spindle 31 and the rotary body 611 are supported by the movable support 18. Therefore, the oscillating member 616, which is mounted on the rotary body 611, and the piston 65, the striker 67 and the impact bolt 68, which are disposed within the spindle 31, are also supported by the movable support 18. Thus, the movable support 18, the spindle 31 and the striking mechanism 6 form a movable unit 180 as an assembly which can integrally move in the front-rear direction relative to the body housing 10.

The first-shaft-insertion part 181 and the second-shaft-insertion part 182 are respectively arranged on the right and left sides of the spindle-support part 185, symmetrically to the reference plane VP. The first-shaft-insertion part 181 has a pair of cylindrical parts 183. The cylindrical parts 183 are coaxially disposed, spaced apart from each other in the front-rear direction. A bearing 184 is respectively fitted in each of the cylindrical parts 183. In this embodiment, plain bearings or journal bearings having a circular cylindrical shape are employed as the bearings 184. The second-shaft-insertion part 182 has the same structure as the first-shaft-insertion part 181. That is, the second-shaft-insertion part 182 also has a pair of cylindrical parts 183 each having a bearing 184 fixed inside.

Figure 15:
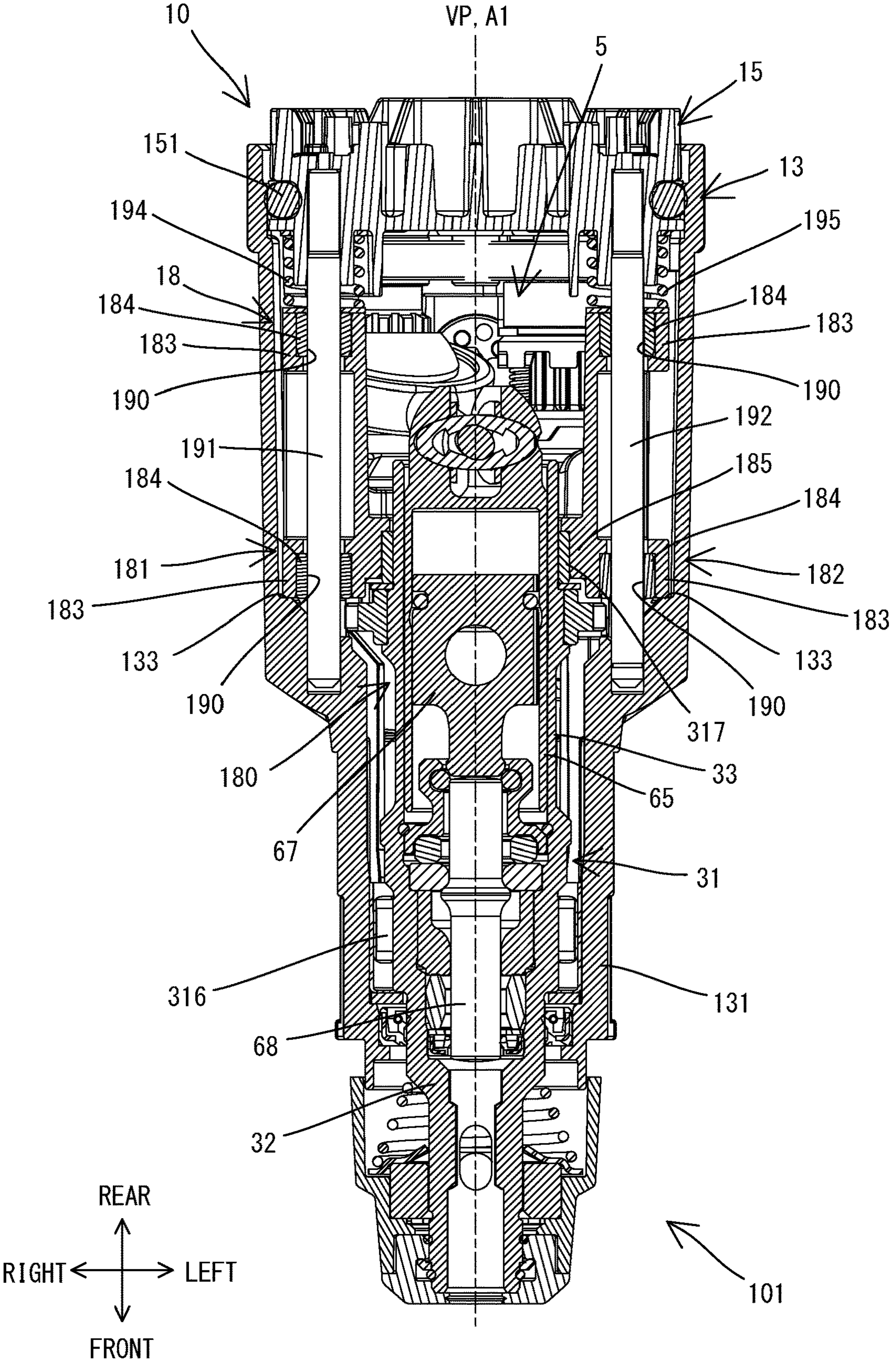
FIG. 15 is a sectional view taken along line XV-XV in FIG. 5.
Figure 16:
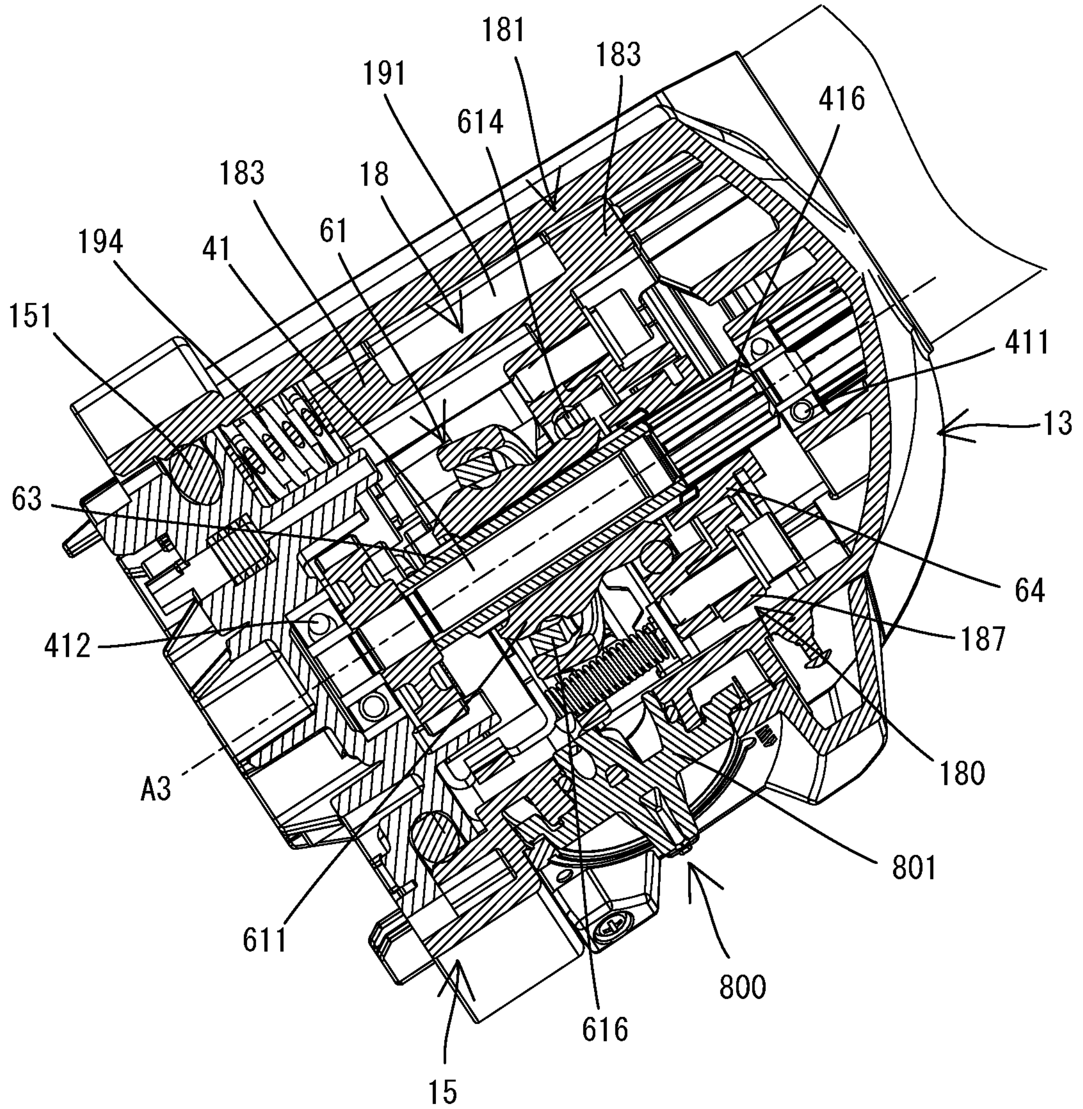
FIG. 16 is a sectional view taken along line XVI-XVI in FIG. 5.

As shown in FIGS. 5 and 15, the movable support 18 (the movable unit 180) is supported by a first guide shaft 191 and a second guide shaft 192 so as to be movable in the front-rear direction relative to the body housing 10. The first and second guide shafts 191 and 192 are arranged symmetrically to the reference plane VP. The first and second guide shafts 191 and 192 extend in parallel to the driving axis A1 (in the front-rear direction) within an upper portion of the front housing 13. A front end portion of each of the first and second guide shafts 191 and 192 is fixedly held by the front housing 13. A rear end portion of each of the first and second guide shafts 191 and 192 is fixedly held by the bearing support 15. Therefore, the first and second guide shafts 191 and 192 cannot move relative to the body housing 10.

In this embodiment, the first and second guide shafts 191 and 192 are both formed of iron (or iron-based alloy, e.g. steel). The first and second guide shafts 191 and 192 are slidably inserted through the front and rear bearings 184 of the first-shaft-insertion part 181 and the front and rear bearings 184 of the second-shaft-insertion part 182, respectively. Thus, inner peripheral surfaces of the bearings 184 define a support hole 190 for each of the first and second guide shafts 191 and 192. With such a structure, the movable support 18 (the movable unit 180) is movable in the front-rear direction relative to the body housing 10 while being guided by the first and second guide shafts 191 and 192.

As described above, the first intermediate shaft 41 for hammering operations and the second intermediate shaft 42 for drilling operations are respectively supported by the bearings 411 and 421 held by the front housing 13 and the bearings 412 and 422 held by the bearing support 15 so as to be immovable in the front-rear direction relative to the body housing 10. Therefore, the movable support 18 (the movable unit 180) is also movable in the front-rear direction relative to the first intermediate shaft 41 and the second intermediate shaft 42.

In this embodiment, the movable support 18, which supports the spindle 31 and the striking mechanism 6 and is thus subjected to loads during hammering operations, is formed of aluminum alloy or magnesium alloy, in order to provide sufficient strength while reducing the weight. The bearings 184, which are in sliding contact with the first and second guide shafts 191 and 192, are formed of a material having a greater lubricity than the movable support 18. It is noted, however, that the portions of the movable support 18 that define the support holes 190 for the first and second guide shafts 191 and 192 (i.e. the portions that are in sliding contact with the first and second guide shafts 191 and 192) do not have to be the bearings 184. For example, only the cylindrical portions of the movable support 18 that define the support holes 190 may be made of a different material (such as iron or iron-based alloy, e.g. steel) than the other portion of the movable support 18, and the cylindrical portions may be integrally formed with the other portion.

A first biasing spring 194 and a second biasing spring 195 are disposed behind the first-shaft-insertion part 181 and the second-shaft-insertion part 182, respectively. Each of the first and second biasing springs 194 and 195 is a compression coil spring. The first and second biasing springs 194 and 195 are respectively mounted on (around) the first and second guide shafts 191 and 192 and are disposed in a compressed state between the movable support 18 and the bearing support 15. More specifically, a front end of the first biasing spring 194 abuts a rear end of the rear cylindrical part 183 of the first-shaft-insertion part 181 via a washer. A rear end of the first biasing spring 194 is fitted into (on) a spring-receiving part (spring seat) formed on the front surface of the bearing support 15. Similarly, a front end of the second biasing spring 195 abuts a rear end of the rear cylindrical part 183 of the second-shaft-insertion part 182 via a washer. A rear end of the second biasing spring 195 is fitted into (on) a spring-receiving part (spring seat) formed on the front surface of the bearing support 15.

With such a structure, the first and second biasing springs 194 and 195 always bias the movable support 18 (the movable unit 180) forward. Therefore, when a rearward external force is not being applied to the movable support 18 (the movable unit 180), the movable support 18 is held in (biased to) its foremost position (initial position) where the front cylindrical parts 183 of the first-shaft-insertion part 181 and the second-shaft-insertion part 182 respectively abut on shoulder parts 133 formed in the front housing 13. Thus, the shoulder parts 133 each serve as a stopper for blocking further forward movement of the movable support 18 (the movable unit 180).

Figure 17:
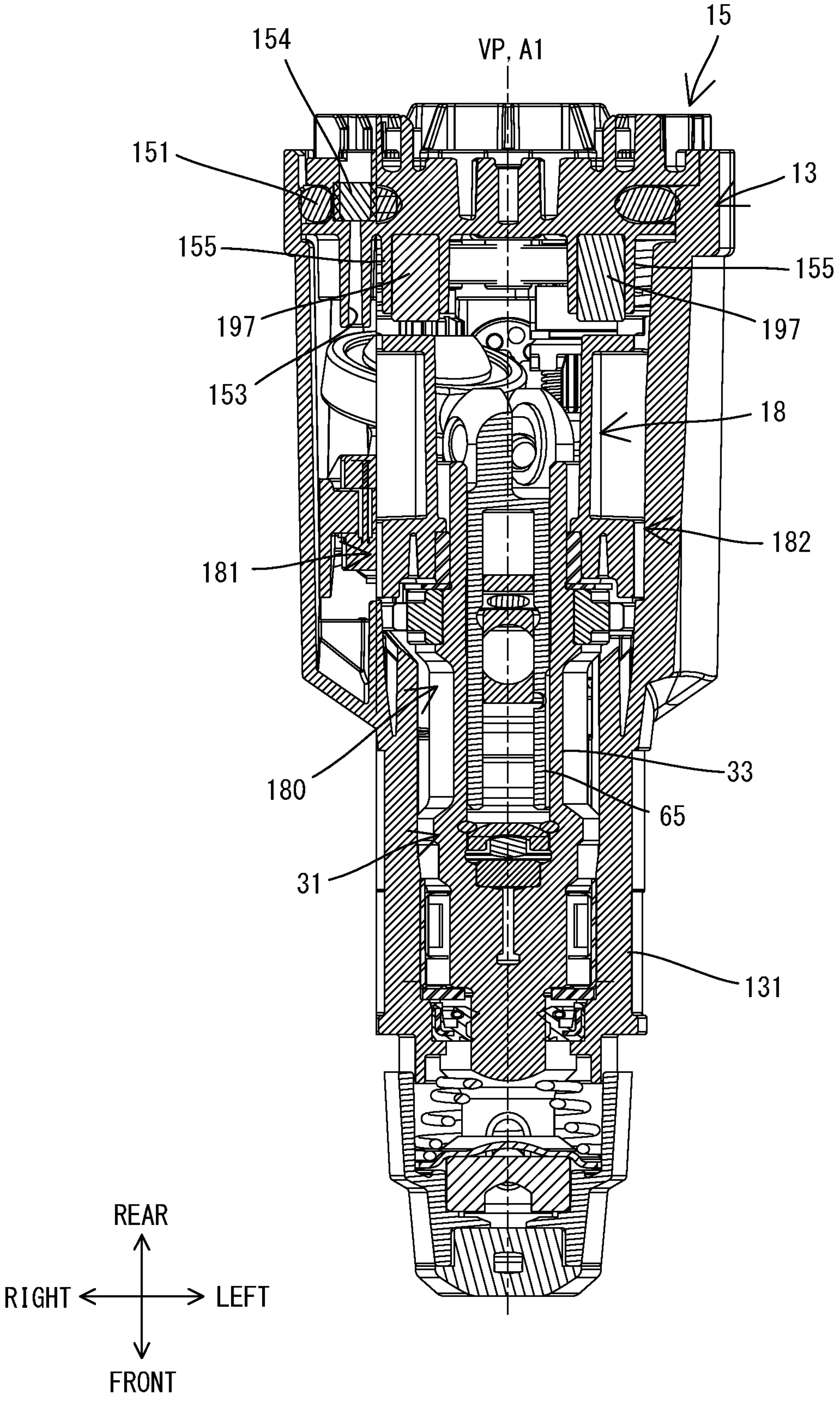
FIG. 17 is a sectional view taken along line XVII-XVII in FIG. 5.

As shown in FIGS. 5 and 17, a pair of (left and right) cushioning members 197 is provided on the front surface side of the bearing support 15. The cushioning members 197 each serve as a stopper for restricting (impeding) further rearward movement of the movable support 18 (the movable unit 180). More specifically, a pair of (left and right) cylindrical projections 155 are provided symmetrically to the reference plane VP on the front surface of the bearing support 15. The projections 155 protrude forward to face an upper end portion of the movable support 18 (specifically, portions adjacent to the first-shaft-insertion part 181 and the second-shaft-insertion part 182 on their reference plane VP side). The cushioning members 197 are each formed of a cylindrical-shaped rubber piece and are respectively fitted in the projections 155.

The cushioning members 197 each protrude forward from a front end of the projections 155 when no external force is applied. When the movable support 18 (the movable unit 180) is located in its foremost position (shown in FIG. 17), the cushioning members 197 are spaced apart rearward from the movable support 18. The cushioning members 197 are configured to abut the movable support 18 from the rear when the movable support 18 (the movable unit 180) moves rearward relative to the body housing 10 and the first and second biasing springs 194 and 195 (see FIG. 15) are compressed by a predetermined length.

In this embodiment, the first and second guide shafts 191 and 192 shown in FIGS. 5 and 15 both have a circular section, but have different diameters. More specifically, the diameter of the second guide shaft 192, which is disposed on the left side of the reference plane VP, is slightly smaller (less) than the diameter of the first guide shaft 191, which is disposed on the right side of the reference plane VP. All of the four cylindrical parts 183 as well as the four bearings 184 of the first-shaft-insertion part 181 and the second-shaft-insertion part 182 respectively have the same structures. Thus, the support hole 190 of the first guide shaft 191 has the same diameter as the support hole 190 of the second guide shaft 192.

Therefore, a gap formed between an outer peripheral surface of the second guide shaft 192 on the left side of the reference plane VP and an inner peripheral surface of the bearing 184 of the second-shaft-insertion part 182 is slightly larger than a gap formed between an outer peripheral surface of the first guide shaft 191 on the right side and an inner peripheral surface of the bearing 184 of the first-shaft-insertion part 181. In other words, a clearance for the second guide shaft 192 is slightly larger than a clearance for the first guide shaft 191. The first guide shaft 191 and the bearings 184 of the first-shaft-insertion part 181 are configured to have higher dimensional accuracy, so that the first guide shaft 191 and the bearings 184 fit with each other substantially without a gap therebetween.

The reason for providing the different sized clearances is as follows. In a hypothetical embodiment in which both of the first and second guide shafts 191 and 192 are fitted into the respective support holes 190 with the smallest possible gap, assembly may be difficult due to dimensional errors of the first and second guide shafts 191 and 192 and/or the respective support holes 190. On the other hand, according to the above-described structure of this embodiment, by forming only the gap between the first guide shaft 191 and the bearing 184 with higher accuracy, assembly of the first and second guide shafts 191 and 192 can be facilitated, while their function of guiding the movable support 18 is satisfactorily maintained.

In order to select which one of the first and second guide shafts 191 and 192 should be the guide shaft (hereinafter referred to as the reference guide shaft) for which a smaller clearance (higher dimensional accuracy) is provided, it is preferable to consider the effects of rotation of the movable unit 180 on the engagement between the driving gear 78 and the driven gear 79 (see FIG. 8). More specifically, two cases will be hypothesized to explain this point. In the first case, the movable unit 180 is rotated around the axis of the first guide shaft 191 by a certain angle. In the second case, the movable unit 180 is rotated around the axis of the second guide shaft 192 by the same angle. Furthermore, the reference guide shaft is preferably selected as the one of the two guide shafts 191, 192 that causes a smaller change in a center distance between the driving axis A1 of the spindle 31 and the rotation axis A4 of the second intermediate shaft 42 (i.e. the shortest distance between the driving axis A1 and the rotation axis A4). This selection can reduce the effects of rotation of the movable unit 180 on the engagement between the driving gear 78 and the driven gear 79.

Figure 18:
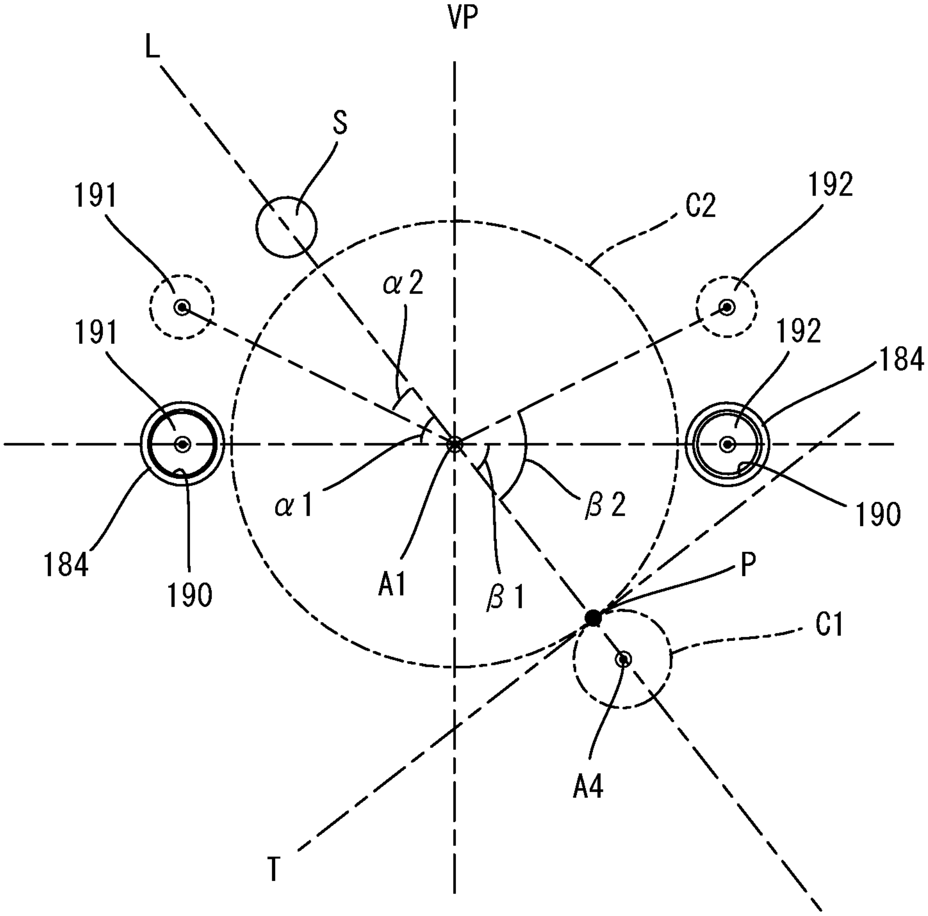
FIG. 18 is an explanatory drawing for illustrating a method for selecting a reference guide shaft.

A method for selecting the reference guide shaft is now described in more detail with reference to FIG. 18. FIG. 18 shows pitch circles C1 and C2 and a common tangent line T to the pitch circles C1 and C2 in a plane that is orthogonal to the driving axis A1 and the rotation axis A4. The pitch circles C1 and C2 are the pitch circles of the driving gear 78 and the driven gear 79 (see FIG. 8), respectively, in the state in which the driving gear 78 and the driven gear 79 are properly engaged with each other. Point P is a point on the driven gear 79 that coincides with a pitch point that is common to (between) the driving gear 78 and the driven gear 79 at this time.

As described above, the driven gear 78 is provided on the second intermediate shaft 42 which cannot move relative to the body housing 10 in either the axial direction or the radial direction. On the other hand, the driven gear 79 provided on the spindle 31 is a portion of the movable unit 180. Therefore, the driven gear 79 may move around an axis of the reference guide shaft relative to the driving gear 78 along with rotation of the movable unit 180. At this time, if the point P on the driven gear 79 moves relative to the driving gear 78 substantially in an extension direction of the common tangent line T, the change in the center distance is relatively small and the engagement is less easily affected by the movement. On the contrary, if the point P moves substantially in a direction orthogonal to the common tangent line T, the center distance may more significantly change, as the amount of the movement of the point P increases. As a result, the engagement may be released or become too deep.

In view of these circumstances, it is considered to be optimal that the reference guide shaft is located at a position, as denoted by reference sign S in FIG. 18, on the side opposite to the driving gear 78 with respect to the driving axis A1, on a line L that passes through the rotation axis A4 of the driving gear 78 and the driving axis A1, which is the rotation axis of the driven gear 79. Further, if neither of the first and second guide shafts 191 and 192 is located on the line L, it is preferable that the one of the first and second guide shafts 191 and 192 that is closer to the line L is selected as the reference guide shaft. Specifically, a comparison is made between angle $\alpha$, which is formed between the line L and a line segment connecting the axis of the first guide shaft 191 and the driving axis A1, and angle $\beta$, which is formed between the line L and a line segment connecting the axis of the second guide shaft 192 and the driving axis A1, in a plane that is orthogonal to the driving axis A1 and the rotation axis A4. Then, the guide shaft that corresponds to the smaller one of the angle $\alpha$ and the angle $\beta$ may be selected as the reference guide shaft.

In this embodiment, the driving axis A1, the first guide shaft 191 and the second guide shaft 192 are arranged on a straight line in a plane that is orthogonal to the driving axis A1 and the rotation axis A4, so that the angle $\alpha$1 is equal to the angle $\beta$1. Therefore, whichever of the first and second guide shafts 191 and 192 is selected as the reference guide shaft, the change in the center distance is the same. Therefore, the second guide shaft 192 may be selected as the reference guide shaft in place of the first guide shaft 191. On the other hand, if the positions of the first and second guide shafts 191 and 192 are respectively changed, for example, to the positions shown by dotted lines in FIG. 18, angle $\alpha$2 is smaller than angle β2. Therefore, in this case, the first guide shaft 191 is preferably selected as the reference guide shaft.

In this embodiment, the first and second guide shafts 191 and 192 have different diameters; however, in a modified embodiment of the present teachings, the first and second guide shafts 191 and 192 may have the same diameter. In such a modified embodiment, the inner diameter of the bearings 184 of the first-shaft-insertion part 181 may differ from the inner diameter of the bearings 184 of the second-shaft-insertion part 182, so that the gaps (clearances) for the first and second guide shafts 191 and 192 differ from each other. Alternatively, the diameter of the first guide shaft 191 may differ from the diameter of the second guide shaft 192 and the inner diameter of the bearings 184 of the first-shaft-insertion part 181 may differ from the inner diameter of the bearings 184 of the second-shaft-insertion part 182.

This embodiment also provides measures for facilitating the mounting of the lock plate 45 when assembling the internal structures in the front housing 13. A method for mounting the lock plate 45 is now described with reference to FIGS. 19 to 21. In this embodiment, the front housing 13 including the barrel part 131 is formed as a single cylindrical member. Further, the lock plate 45 is positioned in the initial position by the bearing support 15 being fitted into the rear end portion of the front housing 13. Therefore, if an assembler (a person who assembles the tool) simply fits the biasing spring 46 in the recess 138, and then engages the lock plate 45 with the ribs 137 while inserting the spring-receiving part 451 into the biasing spring 46, the lock plate 45 and the biasing spring 46 may slip off when the assembler turns an open rear end of the front housing 13 downward before fitting the bearing support 15 into the front housing 13.

Figure 19:
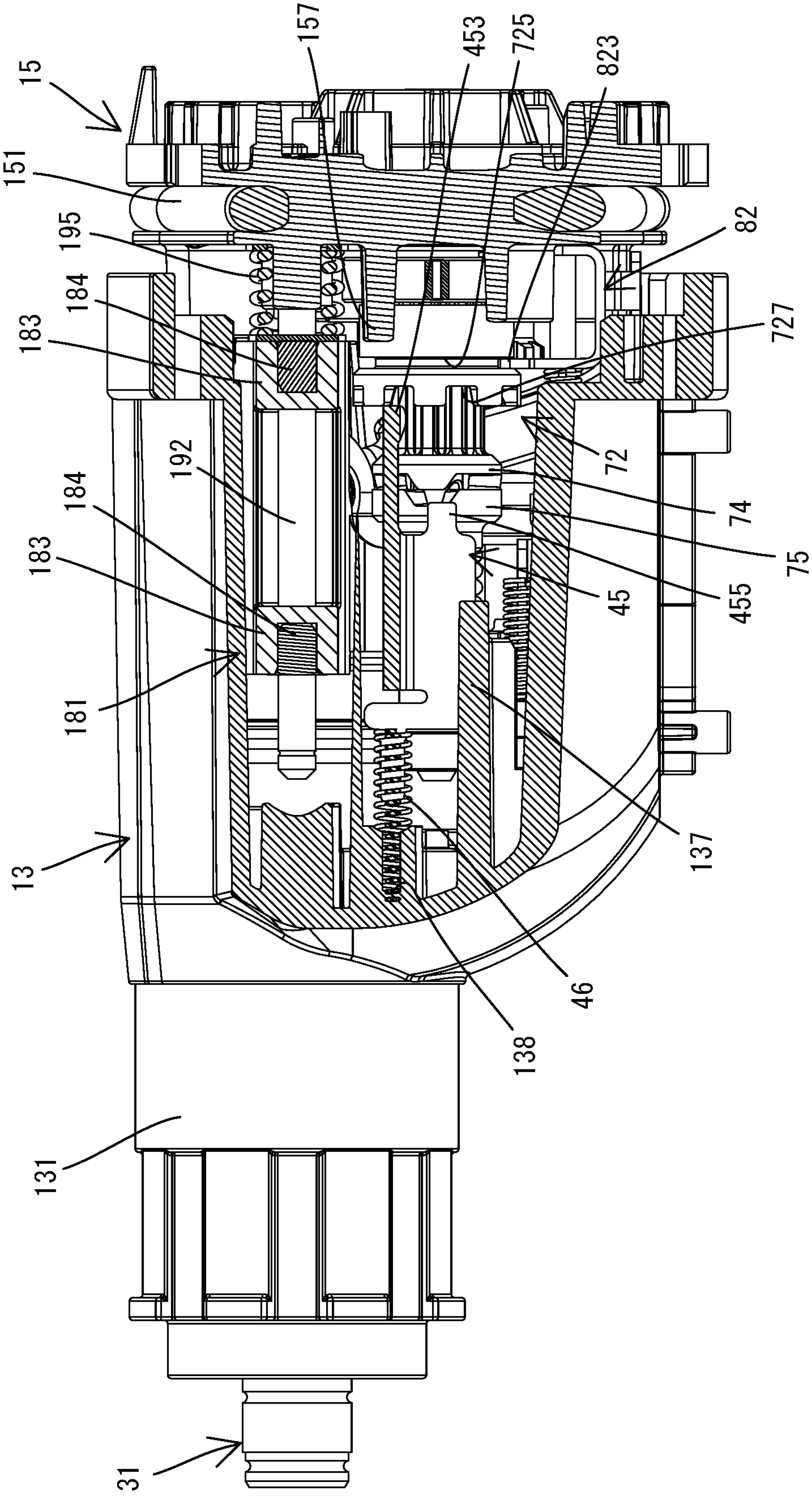
FIG. 19 is an explanatory drawing for assembling a lock plate.

Therefore, in this embodiment, as shown in FIG. 19, first, the assembler fixes the spring-receiving part 451 within the rear end portion of the biasing spring 46 by press fitting. Then, the assembler slides the lock plate 45 forward along the ribs 137 and fixes the front end portion of the biasing spring 46 in the recess 138 of the front housing 13 by press fitting. Thus, the lock plate 45 is temporarily fixed to the front housing 13 via the biasing spring 46. Therefore, even if the assembler turns the rear end of the front housing 13 downward, the lock plate 45 and the biasing spring 46 do not slip off.

Figure 20:
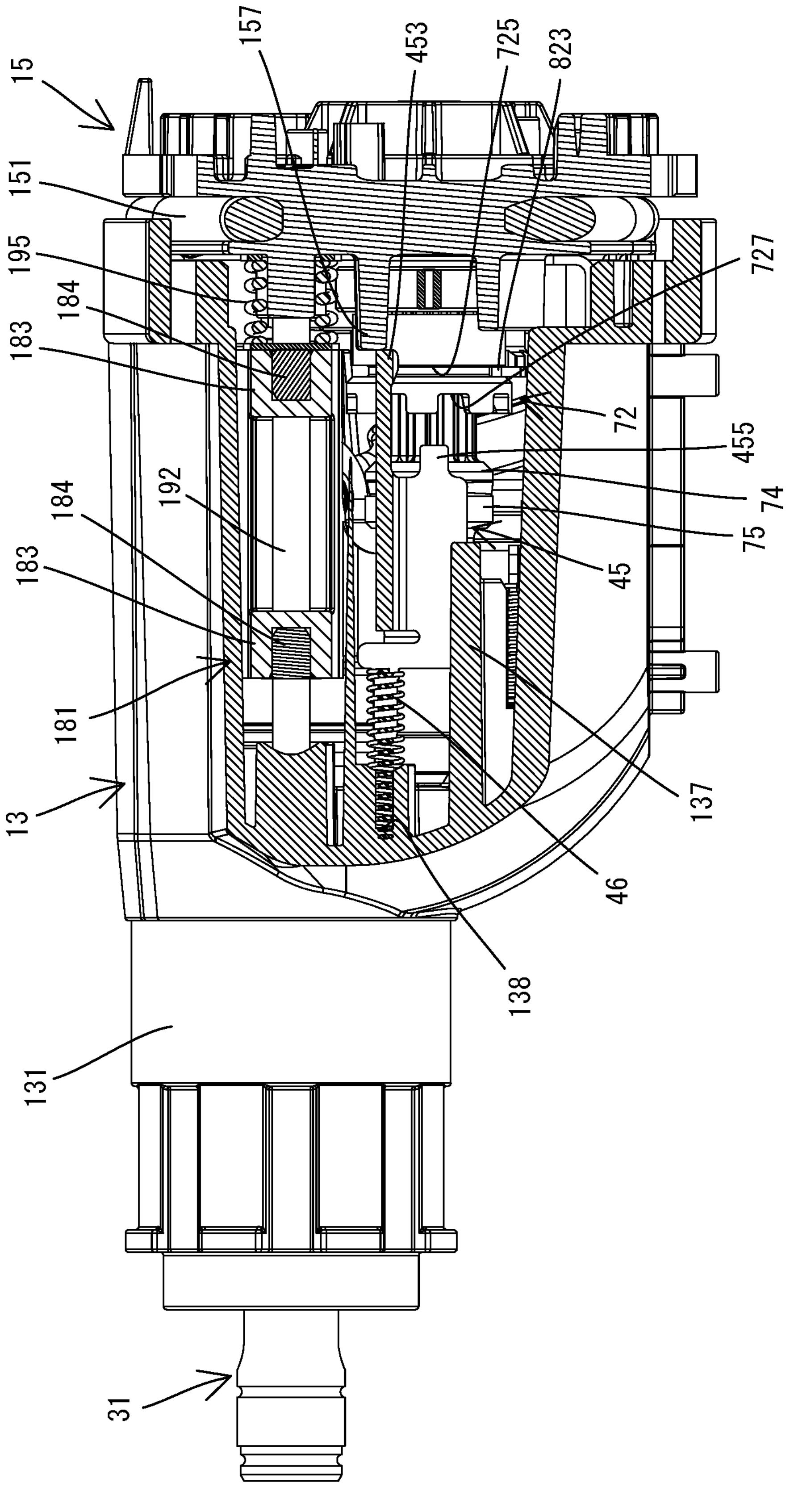
FIG. 20 is an explanatory drawing for assembling the lock plate.

Further, as shown in FIG. 20, the assembler inserts the first and second guide shafts 191 and 192 through the first-shaft-insertion part 181 and the second-shaft-insertion part 182, respectively, so that the first and second guide shafts 191 and 192 support the movable unit 180. The assembler then fits the front end portions of the first and second guide shafts 191 and 192 into the respective recesses (see FIG. 15) of the front housing 13, and fits the bearing support 15 into the rear end portion of the front housing 13 while compressing the O-ring 151.

Figure 21:
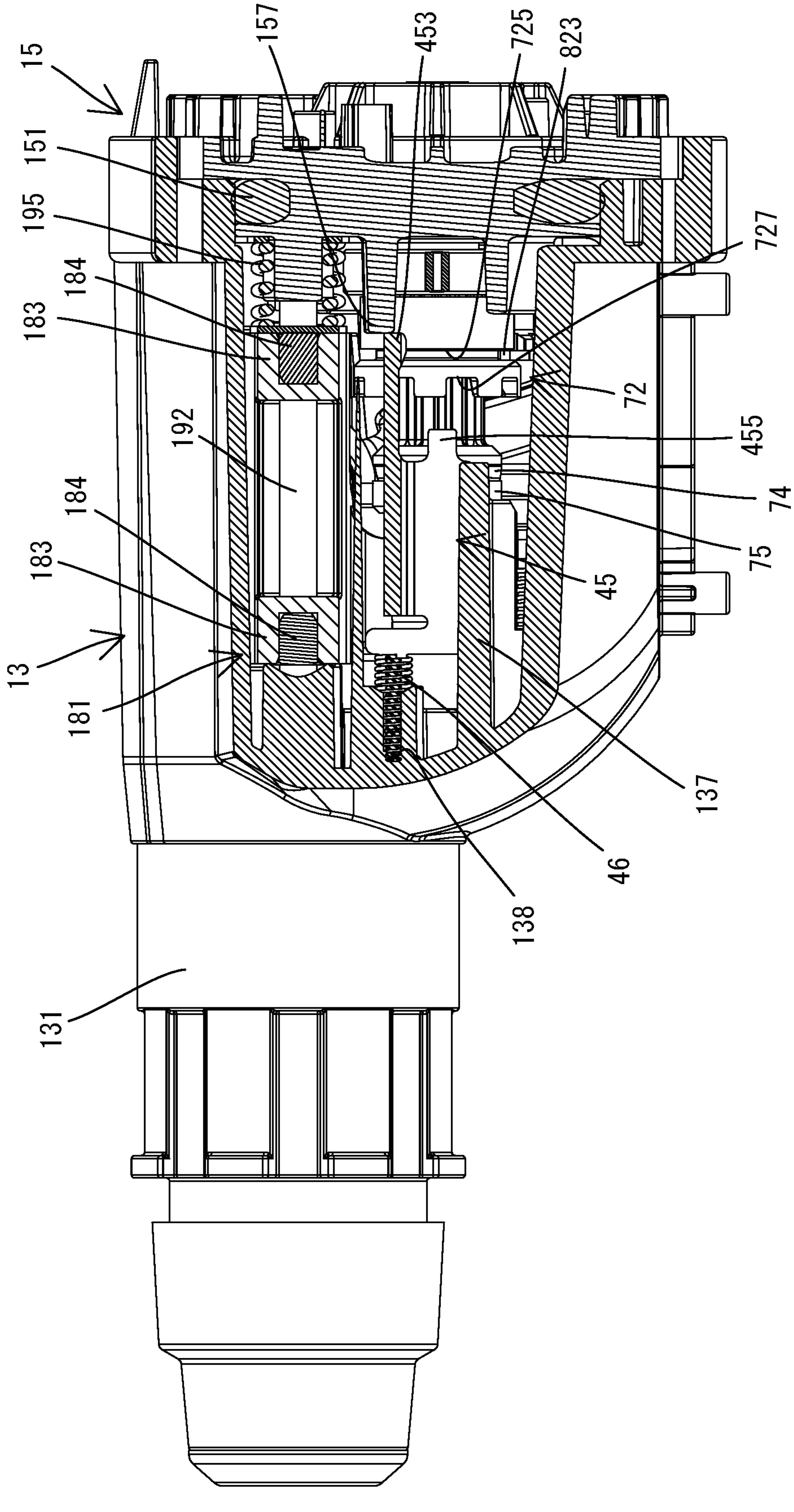
FIG. 21 is an explanatory drawing for assembling the lock plate.

In this process, the contact part 453 of the lock plate 45 abuts on the projection 157 of the bearing support 15. At this point in time, the biasing spring 46 is not yet compressed. Thereafter, the bearing support 15 presses the lock plate 45 via the projection 157 and moves the lock plate 45 forward along the ribs 137 while compressing the biasing spring 46. When the bearing support 15 reaches a specified position as shown in FIG. 21, mounting of the lock plate 45 is completed. By using such a method, the assembler can easily mount the lock plate 45 in the front housing 13 and the bearing support 15.

Methods for temporarily fixing the lock plate 45 are not limited to the above-described method. Although not shown in detail, for example, the lock plate 45 may be configured to hold the biasing spring 46 in a compressed state. In order to temporarily fix the lock plate 45 to the front housing 13, the front end portion of the biasing spring 46 may be fixed by press fitting to a locking piece provided in the front housing 13.

For example, a rubber pin may be used as the locking piece to temporarily fix the lock plate 45. In such an embodiment, a holding recess for the rubber pin is formed on the inside of the rear end portion of the front housing 13. The holding recess is provided such that the rubber pin abuts on a rear end of the lock plate 45 at a position rearward from the initial position. The assembler fits the front end portion of the biasing spring 46 into the recess 138 and further fits the spring-receiving part 451 of the lock plate 45 into the rear end portion of the biasing spring 46. Thereafter, the assembler fits the rubber pin into the holding recess to temporarily fix the lock plate 45. Further, when the assembler fits the bearing support 15 at a specified position of the front housing 13, the lock plate 45 is pressed forward from the position of abutment with the rubber pin and placed in the initial position.

Operation of the rotary hammer 101 of this embodiment is now described.

When the trigger 171 is depressed by a user and the switch 172 is turned on, the motor 2 is energized and the driving mechanism 5 is driven. More specifically, as described above, the striking mechanism 6 and/or the rotation-transmitting mechanism 7 is (are) driven according to the action mode that was set (selected) by the mode-changing dial 800, so that the hammering operation and/or the drilling operation is (are) performed.

In the hammer-drill mode and the hammer mode in which the hammering operation is performed, when the tool accessory 91 is pressed against a workpiece and the processing operation is performed, vibration is caused mainly in the driving-axis direction (i.e. front-rear direction) in the striking mechanism 6, due to the force of the striking mechanism 6 driving the tool accessory 91 and a reaction force from the workpiece against the striking force of the tool accessory 91. Owing to this vibration, the movable unit 180 may move in the front-rear direction along the first and second guide shafts 191 and 192 relative to the body housing 10, and the first and second biasing springs 194 and 195 expand and contract (elastically deform). This absorbs (attenuates) vibration from the movable unit 180 and thereby reduces the amount of vibration transmitted to the body housing 10 and the handle 17.

When vibration causes the movable unit 180 to move rearward and the first and second biasing springs 194 and 195 are compressed by a specified amount, the cushioning members 197 held by the bearing support 15 collide with the movable support 18, and restrict further rearward movement of the movable unit 180. Thus, collision between the bearing support 15 and the movable support 180 can be prevented. Since the cushioning members 197 are each formed of rubber, the impact (force) of the collision between the movable support 180 and the cushioning members 197 can be reduced (attenuated, dampened) by elastic deformation of the rubber.

During the processing operation, the user continues to press the handle 17 and the body housing 10 forward toward the workpiece, in order to hold the tool accessory 91 pressed against the workpiece. Therefore, because the movable unit 180 tends to be positioned rearward from the foremost position shown in FIG. 15 in this embodiment, cushioning members need not be disposed on the shoulder parts 133 for restricting forward movement of the movable support 18.

However, in a modified embodiment, cushioning members similar to the cushioning members 197 may also be disposed on the shoulder parts 133.

As shown in FIG. 9, in the hammer-drill mode and the hammer mode, the first transmitting member 64 is placed in the engagement position (shown by solid lines) and spline-engaged with the intervening member 63, so that rotation of the first intermediate shaft 41 is transmitted to the intervening member 63. The rotary body 611, which is a part of the movable unit 180, may move relative to the body housing 10 within a range between the foremost position shown by solid lines and the rearmost position shown by dotted lines when vibration is caused. As described above, the rotary body 611 is spline-engaged with the intervening member 63, which is held immovably in the front-rear direction. Therefore, the rotary body 611 may move along the splines in the front-rear direction relative to the intervening member 63, while rotating together with the intervening member 63. Meanwhile, the intervening member 63 and the first transmitting member 64 do not move relative to each other in the front-rear direction, so that the relative movement of the movable unit 180 in the front-rear direction does not affect the engagement between the intervening member 63 and the first transmitting member 64. Therefore, the state of power transmission from the first intermediate shaft 41 to the motion-converting member 61 (specifically, the rotary body 611) can be stably maintained.

In the hammer-drill mode in which both the drilling operation and the hammering operation are performed, vibration causes the spindle 31, which is a part of the movable unit 180, to also move in the front-rear direction relative to the body housing 10. Thus, as shown in FIG. 10, the driven gear 79 provided on the outer periphery of the cylinder 33 may move in the front-rear direction relative to the driving gear 78, which cannot move in the front-rear direction relative to the body housing 10, between the position shown by solid lines and the position shown by dotted lines. In this embodiment, the driving gear 78 has a sufficient length in the front-rear direction to cover (span) the movable range of the driven gear 79. Therefore, even when the spindle 31 is moving relative to the body housing 10 in the front-rear direction, the driven gear 79 is always engaged with the rotating driving gear 78.

Similarly, in the drill mode in which only the drilling operation is performed, when the movable unit 180 moves in the front-rear direction relative to the body housing 10, as described above, transmission of vibration to the body housing 10 and the handle 17 can be reduced (attenuated) by expansion and contraction of the first and second biasing springs 194 and 195. Furthermore, similar to the hammer-drill mode, rotation is transmitted from the second intermediate shaft 42 to the spindle 31 via the driving gear 78 and the driven gear 79, without being affected by relative movement of the movable unit 180 in the front-rear direction.

In both the hammer-drill mode and the drill mode in which the drilling operation is performed, when a load exceeding a threshold is applied to the second intermediate shaft 42 during the drilling operation, as described above, the torque limiter 73 operates (acts) to interrupt torque transmission in the torque transmission path that is exclusive for the drilling operation, so that the drilling operation is stopped.

In both the hammer-drill mode and the hammer mode in which the hammering operation is performed, when the tool accessory 91 is not coupled to the tool holder 32 or when the tool accessory 91 is not being pressed against the workpiece, namely, in a state in which no load is applied (hereinafter referred to as a no-load state), it is preferred that the striker 67 does not strike the impact bolt 68. Therefore, in the rotary hammer 101 of this embodiment, an idle-striking prevention mechanism 30 is provided to promptly stop the striker 67 from striking the impact bolt 68 when the rotary hammer 101 shifts to the no-load state. The idle-striking prevention mechanism 30 is now described.

The idle-striking prevention mechanism 30 of this embodiment is configured to catch the striker 67 by shifting the timing of the displacement of the impact bolt 68 while the piston 65 continues reciprocating in the no-load state. First, the structures of the striker 67 and the impact bolt 68 are described in detail.

As shown in FIG. 7, the striker 67 includes a solid circular cylindrical body 671 and a small-diameter part 672, which has a smaller diameter than the body 671 and protrudes forward from the body 671. The body 671 has substantially the same diameter as the inner diameter of the piston 65. An O-ring is mounted on an outer peripheral portion of the body 671, in order to hermetically seal a gap between the piston 65 and the striker 67. A flange part 673 is provided on a front end of the small-diameter part 672. The impact bolt 68 is formed as a solid circular cylindrical member. The impact bolt 68 includes a large-diameter part 681, which is located substantially in a center of the impact bolt 68 in the axial (front-rear) direction, and small-diameter parts 683 and 684, which respectively extend forward and rearward from the large-diameter part 681.

Figure 22:
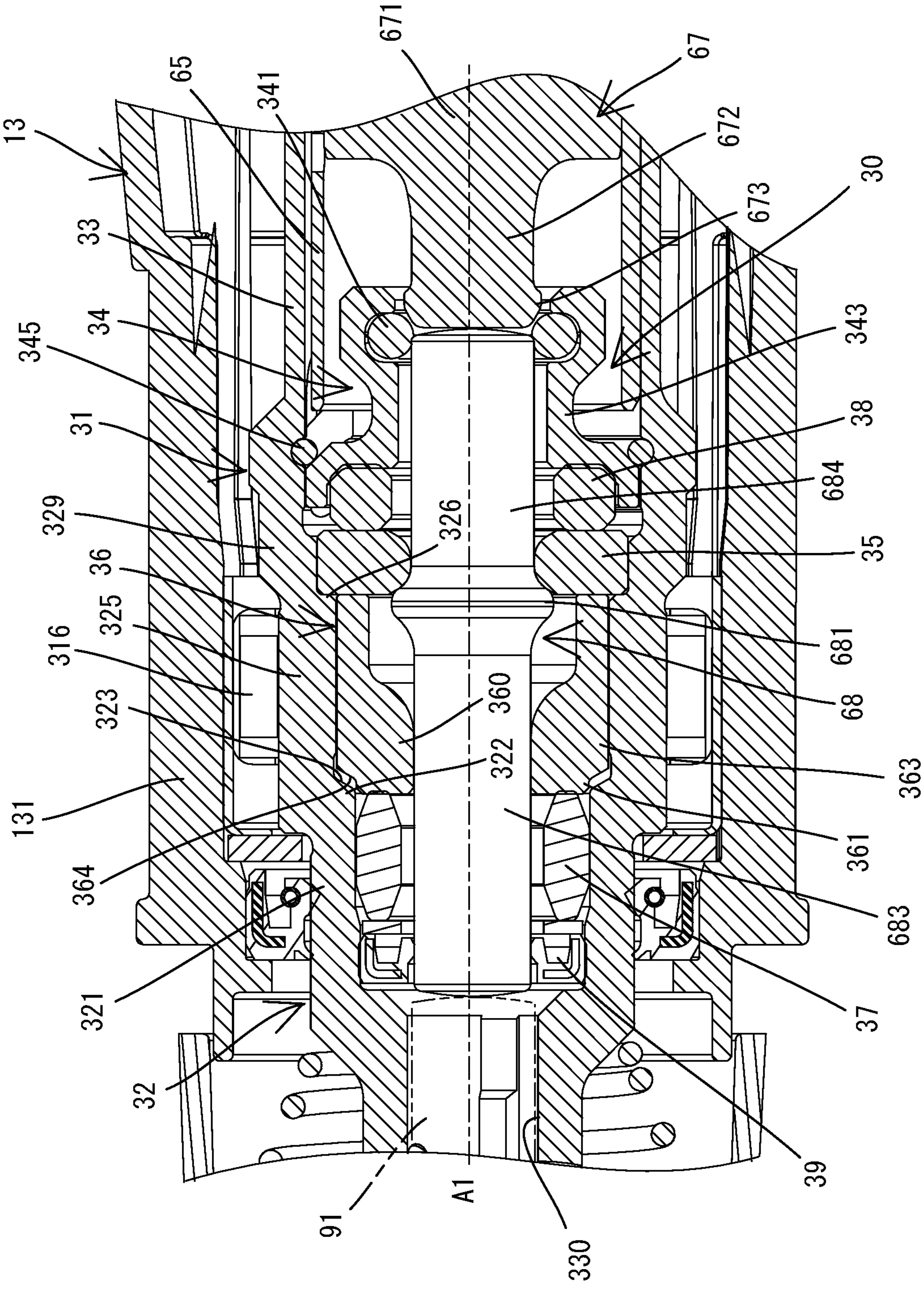
FIG. 22 is a partial, enlarged view of FIG. 7.

As shown in FIG. 22, the idle-striking prevention mechanism 30 includes a catcher 34, the tool holder 32, a restriction ring 35, a guide sleeve 36 and a cushioning ring 37. The catcher 34 is disposed inside the cylinder 33, while the restriction ring 35, the guide sleeve 36 and the cushioning ring 37 are disposed within the tool holder 32.

The catcher 34 is configured to catch and hold the striker 67 in the no-load state. The catcher 34 includes a catch ring 341 and a ring-holding part 343. The ring-holding part 343 is a metal cylindrical member. The ring-holding part 343 is fitted in a front end portion of the cylinder 33 and held to be slidable in the front-rear direction. The rearmost position of the catcher 34 is defined by a stopper ring 345 fixed inside the cylinder 33. The catch ring 341 is an O-ring. The catch ring 341 is mounted within a rear end portion of the ring-holding part 343. The catch ring 341 of this embodiment is formed of rubber.

In this embodiment, the tool holder 32 has a stepped circular cylindrical shape. The inner diameter of the tool holder 32 is the smallest in the front portion having the insertion hole 330, and increases stepwise toward the rear. In the following description, the portion of the tool holder 32 that extends rearward from a rear end of the front portion and has an inner diameter larger than the diameter of the insertion hole 330 is referred to as a small-diameter part 321. Further, the portion of the tool holder 32 that extends rearward from a rear end of the small-diameter part 321 and has a larger inner diameter than the small-diameter part 321 is referred to as a large-diameter part 325. Furthermore, the portion of the tool holder 32 that extends rearward from a rear end of the large-diameter part 325 and has a larger inner diameter than the large-diameter part 325 is referred to as a maximum-diameter part 329. The maximum-diameter part 329 forms a rear end portion of the tool holder 32. The cylinder 33 extends rearward from a rear end of the maximum-diameter part 329.

A first shoulder part 322 is provided at a boundary between the small-diameter part 321 and the larger diameter part 325 on the inside of the tool holder 32. A rear surface 323 of the first shoulder part 323 is a conical surface (tapered surface) having a diameter that slightly increases toward the rear. Further, a second shoulder part 326 is provided at a boundary between the large-diameter part 325 and the maximum-diameter part 329. A rear surface of the second shoulder part 326 is a flat surface that is orthogonal to the driving axis A1.

The restriction ring 35 is an annular metal member. The restriction ring 35 is fitted in the maximum-diameter part 329 of the tool holder 32, and held to be slidable in the front-rear direction. The restriction ring 35 serves as a restriction part for restricting (blocking) further rearward movement of the impact bolt 68 by abutting on the large-diameter part 681 of the impact bolt 68 from the rear. Further, the restriction ring 35 is disposed around the small-diameter part 684 of the impact bolt 68, and also serves as a guide part for guiding the sliding movement of the small-diameter part 684. The inner diameter of the restriction ring 35 is substantially equal to the diameter of the small-diameter part 684. Further, an inner peripheral surface of the restriction ring 35 has a shape conforming to a rear portion of the large-diameter part 681.

A cushioning ring 38, which is an annular elastic element, is disposed between the restriction ring 35 and the ring-holding part 343 of the catcher 34 in the front-rear direction. The cushioning ring 38 of this embodiment is formed of rubber. The cushioning ring 38 is disposed coaxially with the tool holder 32 between the restriction ring 35 and the ring-holding part 343 in a compressed state. Thus, because the restriction ring 35 and the ring-holding part 343 are biased away from each other by the cushioning ring 38, the restriction ring 35 is normally held at a foremost position to abut on the rear surface of the second shoulder part 326 and the ring-holding part 343 is normally held at a rearmost position to abut on the stopper ring 345.

The guide sleeve 36 is a cylindrical metal member. The guide sleeve 36 is configured to hold the impact bolt 68 so as to be slidable along the driving axis A1. More specifically, a front half of the guide sleeve 36 is disposed around the front small-diameter part 683 of the impact bolt 68, and forms a guide part 360 for guiding the sliding movement of the small-diameter part 683. The guide part 360 also serves as a restriction (blocking) part that restricts (blocks) further forward movement of the impact bolt 68 by abutting on the large-diameter part 681 of the impact bolt 68 from the front. The inner diameter of the guide part 360 is substantially equal to the diameter of the small-diameter part 683. Further, an inner peripheral surface of a rear end portion of the guide part 360 has a shape conforming to a front portion of the large-diameter part 681. A rear half of the guide sleeve 36 has a larger inner diameter than the diameter of the large-diameter part 681.

The guide sleeve 36 is disposed within the large-diameter part 325 of the tool holder 32 and is held to be slidable in the front-rear direction. The guide sleeve 36 has a substantially uniform outer diameter, except for its front end portion having a smaller outer diameter. In the following description, the front end portion of the guide sleeve 36 is referred to as a small-diameter part 361 and the other portion of the guide sleeve 36, which extends rearward from the small-diameter part 361 and has a substantially uniform outer diameter, is referred to as a large-diameter part 363. A front surface 364 of the large-diameter part 363 is a conical surface (tapered surface) having a diameter that slightly increases toward the rear.

The cushioning ring 37 is an annular elastic element. The cushioning ring 37 is disposed coaxially with the tool holder 32 between a front end surface of the guide sleeve 36 (i.e. a front end surface of the small-diameter part 361) and the tool holder 32 (specifically, a surface defining a front end of the small-diameter part 321) in the front-rear direction. The outer diameter of the cushioning ring 37 is substantially equal to the inner diameter of the small-diameter part 321 of the tool holder 32. The inner diameter of the cushioning ring 37 is larger than the outer diameter of the small-diameter part 683 of the impact bold bolt 68. Therefore, the cushioning ring 37 is held within the small-diameter part 321 spaced apart radially outward from the impact bolt 68.

In this embodiment, an oil seal 39 is disposed within a front end portion of the small-diameter part 321 of the tool holder 32, in order to prevent leakage of lubricant out of the spindle 31 and to prevent ingress of foreign matter into the spindle 31. A front end of the cushioning ring 37 abuts on a washer disposed behind the oil seal 39, and a rear end of the cushioning ring 37 abuts on the guide sleeve 36. However, in a modified embodiment, the front end of the cushioning ring 37 may directly abut on an inner peripheral surface of the tool holder 32. Further, a washer may be disposed in front of the guide sleeve 36, and a rear end of the cushioning ring 37 may abut on this washer.

The cushioning ring 37 of this embodiment is formed of rubber. The cushioning ring 37 is disposed in a slightly compressed state between the front end surface of the guide sleeve 36 and the washer. Thus, the guide sleeve 36 is biased rearward relative to the tool holder 32 and normally held at a position (hereinafter referred to as an initial position) where a rear end surface of the guide sleeve 36 abuts on a front end surface of the restriction ring 35 located at the foremost position. At this time, the front surface 364 (conical surface) of the large-diameter part 363 of the guide sleeve 36 is spaced apart rearward from the rear surface 323 (conical surface) of the first shoulder part 322 of the tool holder 32. Thus, a gap (clearance) exists between the front surface 364 of the large-diameter part 363 and the rear surface 323 of the first shoulder part 322.

The sectional shape of the cushioning ring 37 along a plane that contains the driving axis A1 is substantially an octagon that is elongated in the driving-axis direction (i.e. front-rear direction). Thus, the cushioning ring 37 has a dimension in the front-rear direction (maximum length) that is larger than a dimension in its thickness direction (maximum thickness). Further, the sectional shape of the cushioning ring 37 along a plane orthogonal to the driving axis A1 is not uniform (varies) in the front-rear direction. Therefore, the area of contact between the cushioning ring 37 and the guide sleeve 36 changes as the cushioning ring 37 expands and contracts (elastically deforms) in the front-rear direction. More specifically, the area of contact of the cushioning ring 37 with the guide sleeve 36 is relatively small at the beginning of compression of the cushioning ring 37, and increases as the compression progresses. Because the cushioning ring 37 has such a shape, it is prone to deform more at the beginning of compression, and then deform less as the compression progresses. Further, as compared to a cushioning ring having a uniform section in the front-rear direction, the cushioning ring 37 of the present embodiment is more prone to deformation in the front-rear direction. Therefore, with such a structure according to the present embodiment, the cushioning ring 37 is capable of undergoing a relatively large amount of deformation in the front-rear direction, and thus a relatively large amount of movement of the guide sleeve 36.

Operation of the idle-striking prevention mechanism 30 is now described.

In a state (hereinafter referred to as a loaded state) in which the tool accessory 91 is being pressed against a workpiece and a load is being applied to the tool accessory 91, as shown in FIG. 22, the tool accessory 91 pushes the impact bolt 68 to a position where the large-diameter part 681 abuts on the restriction ring 35 from the front. A rear end of the impact bolt 68 is located within the rear end portion of the ring-holding part 343. In this state, when the motor 2 is driven, as described above, the striker 67 strikes the impact bolt 68. The impact bolt 68 transmits the kinetic energy of the striker 67 to the tool accessory 91 and linearly drives the tool accessory 91. During this process, the large-diameter part 681 does not collide with the guide sleeve 36 (the guide part 360). Further, when the impact bolt 68 rebounds rearward, the cushioning ring 38 cushions the impact of the impact bolt 68.

Figure 23:
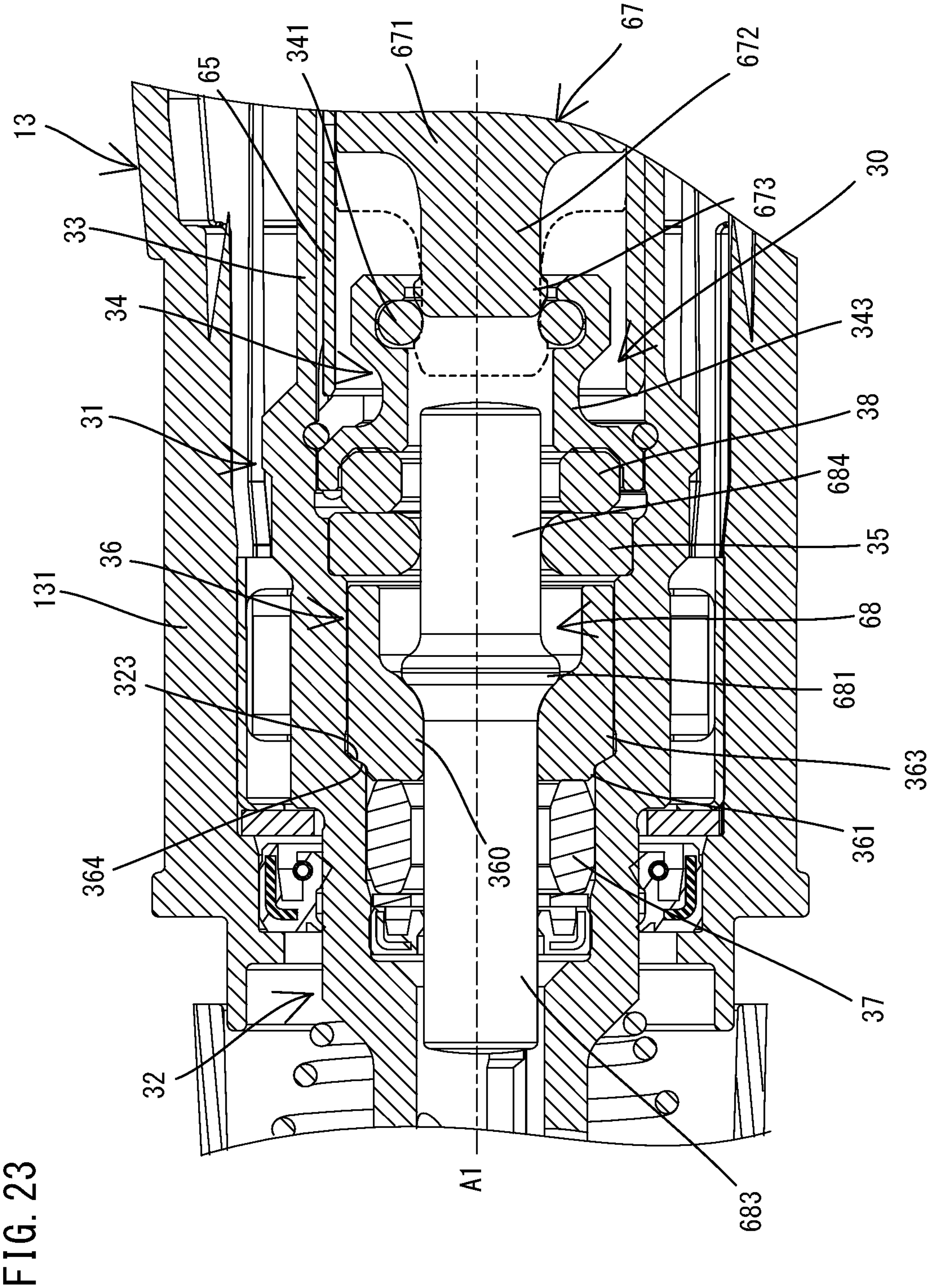
FIG. 23 is an explanatory drawing, corresponding to FIG. 22, for illustrating operation of an idle-striking prevention mechanism.

When the user no longer presses the tool accessory 91 against the workpiece, the tool accessory 91 may move forward from the rearmost position shown in FIG. 22. In this state, when the piston 65 is continued to be driven, as shown in FIG. 23, the impact bolt 28 is struck by the striker 67 and thereby moves forward relative to the guide sleeve 36. The large-diameter part 681 collides with the guide part 360 from the rear. Thus, the guide sleeve 36 moves forward relative to the tool holder 32 while compressing the cushioning ring 37. The front surface 364 of the large-diameter part 363 collides with the rear surface 323 of the first shoulder part 322.

The impact bolt 68 then rebounds owing to a reaction force from the guide sleeve 36 and is struck again by the striker 67, which has been pushed forward owing to the reciprocating movement of the piston 65. However, the timing of the displacement (the cycle of rebounding movement) of the impact bolt 68 is shifted due to the impact absorption of the cushioning ring 37 and the movement of the guide sleeve 36 relative to the tool holder 32 Thus, the cycle of the rebounding movement of the impact bolt 68 deviates from the cycle of the reciprocating movement of the striker 67. As a result, as shown by a dotted line in FIG. 23, when the small-diameter part 672 of the striker 67 enters the catcher 34, the flange part 673 is caught by the catch ring 341 so that the reciprocating movement of the striker 67 is stopped.

In the idle-striking prevention mechanism 30 of this embodiment, the cushioning ring 37 is disposed between the tool holder 32 and the front end surface of the guide sleeve 36 in the front-rear direction (driving-axis direction). With this structure, as compared to a structure in which an elastic element is disposed between the tool holder 32 and the guide sleeve 36 in the radial direction, the diameter of the tool holder 32 can be made smaller, so that the idle-striking prevention mechanism 30 can be made relatively small (narrow) in the radial direction. By employing such an idle-striking prevention mechanism 30, the distance (a so-called center height) between the driving axis A1 and an outer surface (an upper surface, in particular) of the body housing 10 (specifically, the barrel part 131) may be shortened, so that the rotary hammer 101 can be shaped in a manner that is more easily usable in confined spaces (for example, in a corner between walls). Further, as described above, the barrel part 131 may be held by the user during the processing operation. Therefore, because the barrel part 131 may have a reduced (smaller) diameter, it is easier for the user to hold the barrel part 131.

Further, the guide sleeve 36 is biased rearward by the cushioning ring 37, and abuts on the restriction ring 35 disposed behind the guide sleeve 36. Therefore, the guide sleeve 36 can be stably held between the cushioning ring 37 and the restriction ring 35, and the cushioning ring 37 can elastically deform to absorb the impact at the same time when the guide sleeve 36 moves forward.

Figure 24:
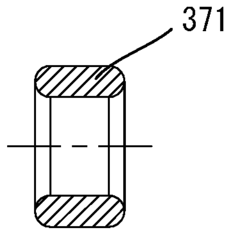
FIG. 24 is an explanatory drawing for illustrating a first modification of a cushioning ring.
Figure 25:
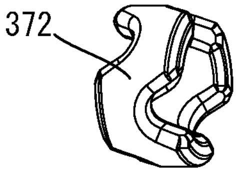
FIG. 25 is an explanatory drawing for illustrating a second modification of the cushioning ring.
Figure 26:
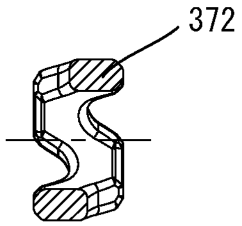
FIG. 26 is an explanatory drawing for illustrating the second modification of the cushioning ring.

In the idle-striking prevention mechanism 30, the structure of the cushioning ring 37 may be appropriately changed. For example, a cushioning ring 371 shown in FIG. 24 or a cushioning ring 372 shown in FIGS. 25 and 26 may be employed, in place of the cushioning ring 37. The cushioning ring 371 shown in FIG. 24 is a circular cylindrical elastic element. Like the cushioning ring 37, a dimension of the cushioning ring 371 in the front-rear direction is larger than a dimension of the cushioning ring 371 in its thickness direction. Front and rear end portions of the cushioning ring 371 each have a chamfered outer edge. Thus, the outer edges of the front and rear end portions are less prone to be caught and damaged between the washer and the tool holder 32 and between the guide sleeve 36 and the tool holder 32, respectively. The cushioning ring 372 shown in FIGS. 25 and 26 is an annular member having the shape of a waveform as a whole. The cushioning ring 372 has recesses and protrusions extending in the front-rear direction. Like the cushioning ring 37, the cushioning ring 372 is an elastic element, in which a dimension in the front-rear direction is larger than a dimension in its thickness direction, and in which a sectional shape along a plane orthogonal to the driving axis A1 is not uniform (varies) in the front-rear direction. The cushioning ring 372 is thus easily deformable in the front-rear direction.

Figure 27:
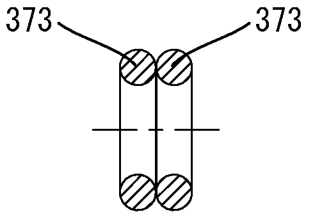
FIG. 27 is an explanatory drawing for illustrating a third modification of the cushioning ring.

Further, in place of the single cushioning ring 37, for example, as shown in FIG. 27, a plurality of O-rings 373 may be arranged side by side in the front-rear direction. In FIG. 27, two O-rings 373 are shown as an example, but three or more O-rings 373 may be employed, depending on the amount of space for the O-rings 373 within the small-diameter part 321. The O-ring 373 itself is an elastic element in which an amount of deformation in the front-rear direction is relatively small. However, by providing a plurality of O-rings 373, the amount of deformation of the O-rings 373 as a whole in the front-rear direction can be increased as compared to the single O-ring 373. In this example, the O-rings 373 may all have the same structure, or they may have different sectional diameters.

Correspondences between the features of the above-described embodiment and the features of the present disclosure are as follows. The features of the above-described embodiment are, however, merely exemplary and do not limit the features of the present disclosure or of the present invention. The rotary hammer 101 is an example of the "power tool". The motor 2 and the motor shaft 25 are examples of the "motor" and the "motor shaft", respectively. The spindle 31 is an example of the "final output shaft". The driving axis A1 is an example of the "driving axis". The driving mechanism 5 and the motion converting member 61 are examples of the "driving mechanism" and the "motion converting member", respectively. The body housing 10 is an example of the "housing". The movable support 18 is an example of the "movable support". The first biasing spring 194 and the second biasing spring 195 are an example of the "at least one elastic member". The first intermediate shaft 41 is an example of the "first intermediate shaft". The intervening member 63 is an example of the "intervening member". The first transmitting member 64 is an example of the "transmitting member".

The spline part 416 is an example of the "spline part" of the "first intermediate shaft". The spline part 631 is an example of the "spline part" of the "intervening member". The first spline part 641 and the second spline part 642 are examples of the "first spline part" and the "second spline part" of the "transmitting member", respectively. The rotary body 611 and the oscillating member 616 are examples of the "rotary body" and the "oscillating member", respectively. The first clutch mechanism 62 and the second clutch mechanism 71 are examples of the "first clutch mechanism" and the "second clutch mechanism", respectively. The second intermediate shaft 42 is an example of the "second intermediate shaft". The mode-change dial 800 (the operation part 801) is an example of the "operation member". Each of the first and second guide shafts 191 and 192 is an example of the "guide shaft". The support hole 190 is an example of the "support hole". The intervening member 63 is an example of the "hollow shaft". The first transmitting member 64 is an example of the "engagement member".

The above-described embodiment is merely an exemplary embodiment of the present disclosure, and power tools according to the present disclosure are not limited to the structure of the rotary hammer 101 of the above-described embodiment. For example, the following modifications may be made. One or more of these modifications may be employed in combination with the rotary hammer 101 of the above-described embodiment or any one of the claimed features.

The rotary hammer 101 may be configured to be operated using power supplied from a rechargeable battery, instead from an external AC power source. In such an embodiment, in place of the power cable (power cord) 179, one, two or more battery-mounting parts, on which a battery (or respective batteries) can be removably mounted, may be provided, for example, in a lower end portion of the handle 17. Further, the motor 2 may be a DC motor, instead of an AC motor. The motor 2 may be a brushless motor, instead of a motor with a brush.

The structures (such as shapes, components and materials) of the body housing 10 and the handle 17 may be appropriately changed. For example, the body housing 10 may be formed by left and right halves connected together, instead of the front and rear halves.

Further, the vibration-isolating structure provided in the body housing 10 is not limited to that of the above-described embodiment. For example, the number of the guide shafts for supporting the movable unit 180 is not limited to two, and may be one or three or more. The position and the support structure of the guide shafts and the structures (such as shapes and materials) of the movable support 18 and the bearing support 15 may also be appropriately changed. For example, in the above-described embodiment, the first guide shaft 191 is inserted through the front and rear bearings 184 of the first-shaft-insertion-part 181 and supports the movable support 18 at two positions. Similarly, the second guide shaft 192 is inserted through the front and rear bearings 184 of the second-shaft-insertion part 182 and supports the movable support 18 at two positions. However, each of the first guide shaft 191 and the second guide shaft 192 may support the movable support 18 at one position.

Each of the first and second biasing springs 194 and 195 may be changed to other kinds of spring (such as a tensile coil spring and a torsion spring) or an elastic member (such as rubber and elastic synthetic resin/polymer (e.g. urethane foam)) other than a spring. Further, the cushioning member 197 which is disposed between the movable support 18 (the movable unit 180) and the body housing 10 or the bearing support 15 may be formed, for example, of elastic synthetic resin/polymer (such as urethane foam) in place of rubber, or it may be omitted. The numbers of the biasing springs and the cushioning members of the movable support 18 may be one or three or more.

The positions of the first intermediate shaft 41 (the rotation axis A3) and the second intermediate shaft 42 (the rotation axis A4) relative to the motor shaft 25 (the rotation axis A2), and the positions of the first intermediate shaft 41 (the rotation axis A3) and the second intermediate shaft 42 (the rotation axis A4) relative to the spindle 31 (the driving axis A1) are not limited to those of the above-described embodiment. For example, the rotation axis A3 and the rotation axis A4 may be arranged on a straight line across the rotation axis A2 in a plane orthogonal to the driving axis A1. Further, conversely to the above-described embodiment, the first and second intermediate shafts 41 and 42 may be arranged on the left and right sides of the driving axis A1 (or the reference plane VP), respectively.

In another modification of the above-described embodiment, power for the hammering operation and power for the drilling operation may be transmitted from one (i.e. the same) intermediate shaft to the intervening member 63 and to the driven gear 79 on the spindle 31, instead of from separate intermediate shafts 41, 42. In other words, a single intermediate shaft may be shared for power transmission both for the hammering operation and the drilling operation. In such an embodiment, both the first clutch mechanism 62 and the second clutch mechanism 71 may be provided on the single intermediate shaft to transmit/interrupt power for the hammering operation and to transmit/interrupt power for the drilling operation, respectively. In this case, the intermediate shaft and the second clutch mechanism 71 may be configured, for example, like those disclosed in US Patent Publication No. 2017/0106517, which is incorporated herein by reference.

The driven side member 75 of the torque limiter 73 and the second intermediate shaft 42 may be spline-engaged with each other, for example, instead of being engaged via the balls 76. Not the driven side member 75 but the drive side member 74 may be movable on the second intermediate shaft 42. Further, the torque limiter 73 may be omitted, or may be provided on the spindle 31.

In the mode-change mechanism 80, the shapes and positions of the first and second switching members 81 and 82, and the first and second springs 83 and 84, as well as their manner of movement along with the mode-change dial 800 may be appropriately changed. For example, the first switching member 81 for switching the first clutch mechanism 62 and the second switching member 82 for switching the second clutch mechanism 71 may be configured to be moved by separate (discrete) operation members, respectively. Further, the operation member that is configured to operate the mode-change mechanism 80 is not limited to a rotary dial, and may be, for example, a slide lever. The first and second springs 83 and 84 may be other kinds of spring (such as a tensile coil spring or a torsion spring). The first and second switching members 81 and 82 need not necessarily be biased. Further, a larger free space exists on the left side of the reference plane VP where the second intermediate shaft 42 and the rotation-transmitting mechanism 7 are disposed, than on the right side where the first intermediate shaft 41 and the striking mechanism 6 are disposed. Therefore, the mode-change mechanism 80 may be disposed on the left side portion of the body housing 10, utilizing this space.

The idle-striking prevention mechanism 30 may be omitted, or a different type of idle-striking prevention mechanism may be provided.

Further, in view of the nature of the present disclosure and the above-described embodiment, the following aspects can be provided. Any one of the following aspects can be employed in combination with any one of the rotary hammer 101 of the above-described embodiment, its modifications and the claimed features.

(Aspect 1)

The power tool further includes a biasing member which biases the transmitting member toward the engagement position.

The first spring 83 is an example of the "biasing member" in this aspect.

(Aspect 2)

The power tool further comprises:

a switching mechanism configured to switch the action mode in conjunction with movement of the operation member, wherein:

the switching mechanism includes:

a first switching member configured to move in response to manual operation of the operation member and to switch the first clutch mechanism between the power-transmission state and the power-interruption state; and a second switching member configured to move in response to manual operation and to switch the second clutch mechanism between the power-transmission state and the power-interruption state.

The mode-change mechanism 80, the first switching member 81 and the second switching member 82 are examples of the "switching mechanism", the "first switching member" and the "second switching member", respectively, in this aspect.

(Aspect 3)

The first switching member is configured to move the transmitting member between the engagement position and the spaced apart position by moving in response to manual operation.

(Aspect 4)

The operation member has a first contact part configured to come into contact with the first switching member and to move the first switching member, and a second contact part configured to come into contact with the second switching member and to move the second switching member.

The first pin 803 and the second pin 805 are examples of the "first contact part" and the "second contact part", respectively, in this aspect.

(Aspect 5)

The first switching member and the second switching member are movably supported by an integral support member.

The support shaft 88 is an example of the "support member" in this aspect.

(Aspect 6)

The power tool further comprises at least one cushioning member disposed between the housing and the movable support.

The following Aspects 7 to 22 are provided with the aim to provide techniques that may aid in realizing a compact idle-striking prevention mechanism in a power tool having a hammer mechanism. Each one of the following Aspects 7 to 22 may be employed individually or in combination with any one or more of the other aspects. Alternatively, at least one of the following Aspects 7 to 22 may be employed in combination with at least one of the rotary hammer 101 of the above-described embodiment, the above-described modifications and aspects, and the claimed features.

(Aspect 7)

A power tool configured to linearly (reciprocally) drive a tool accessory, the power tool comprising:

a piston configured to be linearly reciprocated along a driving axis, the driving axis defining a front-rear direction of the power tool;

a cylindrical tool holder disposed in a front end portion of the power tool and configured to hold the tool accessory to be slidable along the driving axis;

a striking element configured to reciprocate along the driving axis in response to an air spring generated by reciprocating movement of the piston;

an intermediate element disposed between the tool accessory held by the tool holder and the striking element in the front-rear direction, the intermediate element being configured to transmit kinetic energy of the striking element to the tool accessory;

a cylindrical sleeve disposed within the tool holder so as to be slidable in the front-rear direction; and at least one elastic element disposed between the tool holder and a front end surface of the sleeve in the front-rear direction;

wherein:

the intermediate element includes a small-diameter part and a large-diameter part having a larger diameter than the small-diameter part, the sleeve is configured to hold the small-diameter part of the intermediate element so as to be slidable along the driving axis and to abut on the large-diameter part from the front, the tool holder and the sleeve respectively have a first abutment part and a second abutment part which are configured to abut against each other, and the first abutment part and the second abutment part are configured to be separated (spaced apart) from each other in the front-rear direction when a forward force is not being applied to the sleeve, and to abut against each other when a forward force is being applied to the sleeve via the intermediate element.

In the power tool of Aspect 7, if the piston continues to reciprocate while the tool accessory is not coupled to the tool holder or while the tool accessory is not being pressed against the workpiece, the intermediate element receives the kinetic energy of the striking element and the large-diameter part of the intermediate element collides with the sleeve from the rear. Thus, the sleeve moves forward relative to the tool holder while compressing the at least one elastic element, and the second abutment part of the sleeve collides with the first abutment part of the tool holder. At this time, the timing of the displacement (the cycle of the rebounding movement) of the intermediate element is shifted by the impact absorption of the at least one elastic element, which is disposed between the tool holder and the front end surface of the sleeve, and also by movement of the sleeve relative to the tool holder. Thus, the cycle of the rebounding movement of the intermediate element deviates from the cycle of the reciprocating movement of the striking element. As a result, the striking element stops striking the intermediate element. Thus, in the power tool of Aspect 7, the tool holder, the sleeve and the at least one elastic element form (constitute) an idle-striking prevention mechanism.

In Aspect 7, the at least one elastic element is disposed between the tool holder and the front end surface of the sleeve in the front-rear direction (in the direction of the driving axis). With this structure, as compared with a structure in which an elastic element is disposed between the tool holder and the sleeve in the radial direction, the diameter of the tool holder can be made smaller, so that the idle-striking prevention mechanism can be formed more compactly in the radial direction. In addition, with this structure, the distance (so-called center height) between the driving axis and an outer surface of the housing is shortened, so that the power tool can be designed to be more readily used in confined spaces (for example, a corner between walls).

(Aspect 8)

The power tool as defined in Aspect 7, wherein the sleeve includes a small-diameter part having the front end surface and a large-diameter part extending rearward from the small-diameter part and having a larger diameter than the small-diameter part.

Thus, the at least one elastic element may be disposed between the tool holder and the front end surface of the small-diameter part.

(Aspect 9)

The power tool as defined in Aspect 8, wherein:

a shoulder part is provided on an inside of the tool holder, the first abutment part is a rear surface of the shoulder part, and the second abutment part is a front surface of the large-diameter part.

According to Aspects 8 and 9, the at least one elastic element and the first and second abutment parts can be rationally arranged.

(Aspect 10)

The power tool as defined in any one of Aspects 7 to 9, further comprising:

a stopper disposed behind the sleeve and configured to restrict (block) rearward movement of the intermediate element by abutting on the large-diameter part of the intermediate element from rear;

wherein the sleeve is biased by the at least one elastic element and abuts on the stopper.

According to Aspect 10, the sleeve can be stably held between the at least one elastic element and the stopper, and the at least one elastic element is elastically deformable to absorb (dampen) impact at the same time when the sleeve moves forward.

(Aspect 11)

The power tool as defined in any one of Aspects 7 to 10, wherein the at least one elastic element has a dimension in the front-rear direction that is larger than a dimension in a thickness direction.

According to Aspect 11, the amount of deformation of the at least one elastic element in the front-rear direction can be made larger than the amount of deformation in the thickness direction.

(Aspect 12)

The power tool as defined in any one of Aspects 7 to 11, wherein the at least one elastic element has a sectional shape in a plane orthogonal to the driving axis that is not uniform in the front-rear direction.

According to Aspect 12, the at least one elastic element may include a portion that is more easily deformable in the front-rear direction.

(Aspect 13)

The power tool as defined in Aspect 12, wherein the at least one elastic element has an annular shape and has recesses and protrusions each extending in the front-rear direction.

(Aspect 14)

The power tool as defined in Aspect 12 or 13, wherein the at least one elastic element is configured such that an area of contact with the sleeve changes as the at least one elastic element elastically deforms.

(Aspect 15)

The power tool as defined in any one of Aspects 7 to 14, wherein at least one of a front end portion and a rear end portion of the at least one elastic element is chamfered.

According to Aspect 15, it is possible to prevent or reduce the likelihood that the at least one elastic element is caught and damaged between the tool holder and the sleeve or between the tool holder and a member disposed within the tool holder.

(Aspect 16)

The power tool as defined in Aspects 7 to 15, wherein the at least one elastic element includes a plurality of elastic elements arranged side by side in the front-rear direction.

According to Aspect 16, the amount of deformation of the elastic elements as a whole in the front-rear direction can be increased.

(Aspect 17)

A front end portion of the tool holder is a minimum-diameter part having an insertion hole into which the tool accessory is to be inserted, and the at least one elastic element is disposed between a shoulder part on a rear end of the minimum-diameter part and the sleeve.

(Aspect 18)

The at least one elastic element is spaced apart from the intermediate element in a radial direction of the tool holder.

(Aspect 19)

The power tool further includes:

an oil seal disposed within the tool holder, wherein the at least one elastic element is disposed between the oil seal and the front end surface of the sleeve.

(Aspect 20)

The power tool further includes a catcher disposed behind the stopper and configured to catch a front end portion of the striking element.

(Aspect 21)

The catcher includes an annular elastic element configured to catch the front end portion of the striking element, and a holding part for holding the annular elastic element.

(Aspect 22)

A power tool, such as a rotary hammer, includes a housing, an output shaft for mounting a tool accessary and a motor having a motor shaft that generates a rotational output for rotating and linearly hammering the output shaft. The rotational output of the motor shaft is coupled to the output shaft via a driving mechanism that includes a hammer mechanism. An intervening member is axially movable relative to the motor shaft and is operably coupled between the motor shaft and the hammer mechanism. The hammer mechanism and the output shaft are supported by a movable support that is axially movable relative to the housing. Therefore, because the output shaft and hammer mechanism are movable relative to the motor and the housing, which preferably includes handle, via the intervening member and the movable support during a hammering operation, vibration generated during the hammering operation can be dampened before reaching the housing and thus the handle held by the user.

Correspondences between the features of the above-described embodiment and the features of Aspects 7 to 22 are as follows. The features of the above-described embodiment are, however, merely exemplary and do not limit the features of Aspects 7 to 22. The rotary hammer 101 is an example of the "power tool". The piston 65 is an example of the "piston". The driving axis A1 is an example of the "driving axis". The tool holder 32 is an example of the "tool holder". The striker 67 is an example of the "striking element". The impact bolt 68 is an example of the "intermediate element". The guide sleeve 36 is an example of the "sleeve". Each of the cushioning rings 37, 371, and 372 is an example of the "at least one elastic element". The O-rings 373 are an example of the "plurality of elastic elements". The first shoulder part 322 of the tool holder 32 and the rear surface 323 of the first shoulder part 322 are examples of the "shoulder part" and the "first abutment part", respectively. The small-diameter part 361 and the large-diameter part 363 of the guide sleeve 36 are examples of the "small-diameter part" and the "large-diameter part", respectively. The front surface 364 of the large-diameter part 363 is an example of the "second abutment part". The restriction ring 35 is an example of the "stopper". The oil seal 39 is an example of the "oil seal". The catcher 34 is an example of the "catcher". The catch ring 341 and the ring-holding part 343 are examples of the "annular elastic element" and the "holding member", respectively.

The power tool as defined in Aspects 7 to 22 is not limited to the rotary hammer 101 of the above-described embodiment. For example, the following modifications may be made. At least one of these modifications may be adopted in combination with at least one of the rotary hammer 101 of the above-described embodiment, the above-described modifications and aspects, and the claimed features.

For example, in the above-described embodiment, as an example of the power tool, the rotary hammer 101 is described as being capable of performing both the hammering operation and the drilling operation. However, Aspects 7 to 22 may be applied to any power tool that is configured to reciprocate the striker 67 along the driving axis A1 in response to an air spring generated by reciprocating movement of the piston 65 and to transmit the kinetic energy of the striker 67 to the tool accessory. Therefore, for example, the power tool may be an electric hammer capable of performing only hammering operations, or a rotary hammer having only a hammer-drill mode and a hammer mode.

The body housing 10 and its internal structures and the vibration-isolating structure may be appropriately changed or omitted. Examples of adoptable modifications include, but are not limited to, the following.

For example, the body housing 10 may be L-shaped in a side view and house the spindle 31 (the tool holder 32), the motor 2 and the driving mechanism 5. In such embodiments, typically, the motor 2 may be arranged such that the rotation axis 2 of the motor shaft 2 extends to cross the driving axis A1. In the striking mechanism 6, a crank mechanism that includes a crank shaft may be employed as the motion converting member (motion converting mechanism), in place of the oscillating member 616. Further, power may be transmitted from one common intermediate shaft to both the striking mechanism 6 and the rotation-transmitting mechanism 7.

The rotary hammer 101 may be configured to be operated by power supplied from a rechargeable battery, instead of an external AC power source. In this case, in place of the power cable 179, a battery-mounting part, to which a battery can be removably mounted, may be provided, for example, in a lower end portion of the handle 17. Further, the motor 2 may be a DC motor, instead of an AC motor. The motor 2 may be a brushless motor, instead of a motor with a brush.

The structures of the tool holder 32 and the guide sleeve 36 of the idle-striking prevention mechanism 30 may be appropriately changed, as long as the rear surface 323 of the first shoulder part 322 and the front surface 364 of the large-diameter part 363 are separated (spaced apart) from each other in the front-rear direction when a forward force is not being applied to the guide sleeve 36, and abut against each other when a forward force is being applied to the guide sleeve 36 via the impact bolt 68. For example, the front surface 364 of the large-diameter part 363 of the guide sleeve 36 may be provided (disposed) further rearward. The rear half of the guide sleeve 36 that extends rearward from the guide part 360 may be configured to guide the sliding movement of the large-diameter part 681 of the impact bolt 68.

The material and shape of the elastic element disposed between the tool holder 32 and the front end surface of the guide sleeve 36 may be different from those of the cushioning rings 37, 371, 372 and the O-rings 373. The elastic element may be formed, for example, of elastic synthetic resin/polymer (such as urethane foam) in place of rubber. Further, the elastic element need not necessarily have a cylindrical (annular) shape, and a plurality of elastic elements may be arranged around the impact bolt 68.

The structures and arrangement of the restriction ring 35 and the catcher 34 may be appropriately changed or omitted.

This application hereby incorporates by reference the entire disclosure of application Ser. No. 17/072,444, and the entire disclosure of application Ser. No. 17/072,462.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools having a hammer mechanism.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

DESCRIPTION OF THE REFERENCE NUMERALS

101: hammer drill, 10: body housing, 11: rear housing, 13: front housing, 131: barrel part, 133: shoulder part, 137: rib, 138: recess, 15: bearing support, 151: O-ring, 152: elastic element, 153: air vent hole, 154: filter, 155: projection, 157: projection, 17: handle, 171: trigger, 172: switch, 179: power cable, 18: movable support, 180: movable unit, 181: first-shaft-insertion part, 182: second-shaft-insertion part, 183: cylindrical part, 184: bearing, 185: spindle-support part, 187: rotary-body-support part, 190: support hole, 191: first guide shaft, 192: second guide shaft, 194: first biasing spring, 195: second biasing spring, 197: cushioning member, 2: motor, 20: body, 25: motor shaft, 251: bearing, 252: bearing, 255: pinion gear, 27: fan, 30: idle-striking prevention mechanism, 31: spindle, 316: bearing, 317: bearing, 32: tool holder, 321: small-diameter part, 322: first shoulder part, 323: rear surface, 325: large-diameter part, 326: second shoulder part, 329: maximum-diameter part, 33: cylinder, 330: insertion hole, 34: catcher, 341: catch ring, 343: ring-holding part, 345: stopper ring, 35: restriction ring, 36: guide sleeve, 360: guide part, 361: small-diameter part, 363: large-diameter part, 364: front surface, 37, 371, 372: cushioning ring, 373: O-ring, 38: cushioning ring, 39: oil seal, 41: first intermediate shaft, 411: bearing, 412: bearing, 414: first driven gear, 416: spline part, 417: large-diameter part, 42: second intermediate shaft, 421: bearing, 422: bearing, 423: gear member, 424: second driven gear, 425: spline part, 426: groove, 45: lock plate, 451: spring-receiving part, 453: contact part, 455: locking part, 46: biasing spring, 5: driving mechanism, 6: striking mechanism, 61: motion-converting member, 611: rotary body, 612: spline part, 614: bearing, 616: oscillating member, 617: arm, 62: first clutch mechanism, 63: intervening member, 631: spline part, 64: first transmitting member, 641: first spline part, 642: second spline part, 645: groove, 65: piston, 67: striker, 671: body, 672: small-diameter part, 673: flange part, 68: impact bolt, 681: large-diameter part, 683: small-diameter part, 684: small-diameter part, 7: rotation-transmitting mechanism, 71: second clutch mechanism, 72: second transmitting member, 721: first spline part, 722: second spline part, 725: groove, 727: recess, 73: torque limiter, 74: drive-side member, 742: cam recess, 743: spline part, 75: driven-side member, 751: groove, 752: cam projection, 76: ball, 77: biasing spring, 78: driving gear, 79: driven gear, 80: mode-change mechanism, 800: mode-change dial, 801: operation part, 803: first pin, 805: second pin, 81: first switching member, 813: first engagement part, 82: second switching member, 823: second engagement part, 83: first spring, 84: second spring, 88: support shaft, 881: retaining ring, 91: tool accessory, A1: driving axis, A2: rotation axis, A3: rotation axis, A4: rotation axis

What is claimed is:

1. A power tool configured to linearly drive a tool accessory, the power tool comprising:

a piston configured to be linearly reciprocated along a driving axis, the driving axis defining a front-rear direction of the power tool;

a cylindrical tool holder disposed in a front end portion of the power tool and configured to hold the tool accessory to be slidable along the driving axis;

a striking element configured to reciprocate along the driving axis in response to an air spring generated by reciprocating movement of the piston;

an intermediate element disposed between the tool accessory held by the tool holder and the striking element in the front-rear direction, the intermediate element being configured to transmit kinetic energy of the striking element to the tool accessory;

a cylindrical sleeve disposed within the tool holder so as to be slidable in the front-rear direction;

at least one elastic element disposed between the tool holder and a front end surface of the sleeve in the front-rear direction, the at least one elastic element being spaced apart from the intermediate element; and a stopper disposed behind the sleeve in the front-rear direction, wherein:

the intermediate element includes a first small-diameter part, a second small-diameter part and a large-diameter part disposed between the first and second small-diameter parts and having a larger diameter than the first and second small-diameter parts, the sleeve is configured to hold and slidably guide the first small-diameter part of the intermediate element so as to be slidable along the driving axis and to abut on the large-diameter part from the front, the stopper is configured to hold and slidably guide the second small-diameter part of the intermediate element so as to be slidable along the driving axis and to abut on the large-diameter part from the rear, an annular gap is defined between an outermost surface of the large-diameter part and the cylindrical sleeve, the tool holder and the sleeve respectively have a first abutment part and a second abutment part that are configured to abut against each other, the first abutment part and the second abutment part are configured to be spaced apart from each other in the front-rear direction when a forward force is not being applied to the sleeve, and to abut against each other when a forward force is being applied to the sleeve via the intermediate element, and at least one of a front end portion and a rear end portion of the at least one elastic element is chamfered.

2. The power tool as defined in claim 1, wherein:

the stopper further includes a forward facing surface configured to block rearward movement of the intermediate element by abutting on the large-diameter part of the intermediate element from the rear at a rearmost position of the intermediate element; and the sleeve is biased by the at least one elastic element and abuts on the stopper when a forward force is not being applied to the sleeve, and moves away from the stopper when a forward force is being applied to the sleeve via the intermediate element.

3. A power tool configured to linearly drive a tool accessory, the power tool comprising:

a piston configured to be linearly reciprocated along a driving axis, the driving axis defining a front-rear direction of the power tool;

a cylindrical tool holder disposed in a front end portion of the power tool and configured to hold the tool accessory to be slidable along the driving axis;

a striking element configured to reciprocate along the driving axis in response to an air spring generated by reciprocating movement of the piston;

an intermediate element disposed between the tool accessory held by the tool holder and the striking element in the front-rear direction, the intermediate element being configured to transmit kinetic energy of the striking element to the tool accessory;

a cylindrical sleeve disposed within the tool holder so as to be slidable in the front-rear direction; and at least one elastic element disposed between the tool holder and a front end surface of the sleeve in the front-rear direction, the at least one elastic element being spaced apart from the intermediate element;

wherein:

the intermediate element includes a small-diameter part and a large-diameter part having a larger diameter than the small-diameter part, the sleeve is configured to hold the small-diameter part of the intermediate element so as to be slidable along the driving axis and to abut on the large-diameter part from the front, the tool holder and the sleeve respectively have a first abutment part and a second abutment part that are configured to abut against each other, the first abutment part and the second abutment part are configured to be spaced apart from each other in the front-rear direction when a forward force is not being applied to the sleeve, and to abut against each other when a forward force is being applied to the sleeve via the intermediate element, and at least one of a front end portion and a rear end portion of the at least one elastic element is chamfered.

4. The power tool as defined in claim 3, wherein the sleeve includes:

a small-diameter part having the front end surface, and a large-diameter part extending rearward from the small-diameter part and having a larger outer diameter than the small-diameter part.

5. The power tool as defined in claim 4, wherein:

a shoulder part is provided on an inside of the tool holder, the first abutment part is a rear surface of the shoulder part, and the second abutment part is a front surface of the large-diameter part of the sleeve.

6. The power tool as defined in claim 5, wherein each of the rear surface of the shoulder part and the front surface of the large-diameter part of the sleeve is a conical surface having a diameter that increases toward the rear.

7. The power tool as defined in claim 6, further comprising:

a stopper disposed behind the sleeve and configured to block rearward movement of the intermediate element by abutting on the large-diameter part of the intermediate element from the rear;

wherein the sleeve is biased by the at least one elastic element and abuts on the stopper.

8. The power tool as defined in claim 7, wherein the at least one elastic element is spaced apart from the intermediate element in a radial direction of the tool holder.

9. The power tool as defined in claim 8, further comprising:

a catcher disposed behind the stopper and configured to catch a front end portion of the striking element.

10. The power tool as defined in claim 3, wherein the at least one elastic element has a dimension in the front-rear direction that is larger than a dimension in a thickness direction.

11. The power tool as defined in claim 3, wherein the at least one elastic element has a sectional shape in a plane orthogonal to the driving axis that is not uniform in the front-rear direction.

12. The power tool as defined in claim 11, wherein the at least one elastic element has an annular shape and has recesses and protrusions each extending in the front-rear direction.

13. The power tool as defined in claim 11, wherein the at least one elastic element is configured such that an area of contact with the sleeve changes as the at least one elastic element elastically deforms.

14. The power tool as defined in claim 3, wherein a radially outer surface of the at least one elastic member contacts an inner circumferential surface of the tool holder.

15. The power tool as defined in claim 3, wherein an inner diameter of the at least one elastic member is larger than the diameter of the small-diameter part of the intermediate element.

16. The power tool as defined in claim 3, wherein the at least one elastic element is disposed between the tool holder and a forwardmost end surface of the sleeve in the front-rear direction.

17. The power tool as defined in claim 3, further comprising an oil seal disposed between the tool holder and the at least one elastic element in the front-rear direction.

18. The power tool as defined in claim 3, wherein:

a stopper is disposed behind the sleeve in the front-rear direction, the stopper includes a forward facing surface configured to block rearward movement of the intermediate element by abutting on the large-diameter part of the intermediate element from the rear at a rearmost position of the intermediate element; and the sleeve is biased by the at least one elastic element and abuts on the stopper when a forward force is not being applied to the sleeve, and moves away from the stopper when a forward force is being applied to the sleeve via the intermediate element.

19. A power tool configured to linearly drive a tool accessory, the power tool comprising:

a piston configured to be linearly reciprocated along a driving axis, the driving axis defining a front-rear direction of the power tool;

a cylindrical tool holder disposed in a front end portion of the power tool and configured to hold the tool accessory to be slidable along the driving axis;

a striking element configured to reciprocate along the driving axis in response to an air spring generated by reciprocating movement of the piston;

an intermediate element disposed between the tool accessory held by the tool holder and the striking element in the front-rear direction, the intermediate element being configured to transmit kinetic energy of the striking element to the tool accessory;

a cylindrical sleeve disposed within the tool holder so as to be slidable in the front-rear direction;

at least one elastic element disposed between the tool holder and a front end surface of the sleeve in the front-rear direction; and a stopper disposed behind the sleeve in the front-rear direction, wherein:

the intermediate element includes a first small-diameter part, a second small-diameter part and a large-diameter part disposed between the first and second small-diameter parts and having a larger diameter than the first and second small-diameter parts, the sleeve is configured to hold and slidably guide the first small-diameter part of the intermediate element so as to be slidable along the driving axis and to abut on the large-diameter part from the front, the stopper is configured to hold and slidably guide the second small-diameter part of the intermediate element so as to be slidable along the driving axis and to abut on the large-diameter part from the rear, an annular gap is defined between an outermost surface of the large-diameter part and the cylindrical sleeve, the first abutment part and the second abutment part are configured to be spaced apart from each other in the front-rear direction when a forward force is not being applied to the sleeve, and to abut against each other when a forward force is being applied to the sleeve via the intermediate element, the at least one elastic member is configured to bias the sleeve rearward at least when the first abutment part of the tool holder is abutting the second abutment part of the sleeve, and at least one of a front end portion and a rear end portion of the at least one elastic element is chamfered.

20. The power tool as defined in claim 19, wherein the first abutment surface of the tool holder is rearward of the at least one elastic member.

* * * * *